(12) United States Patent
Van Dijk et al.

(10) Patent No.: US 12,508,113 B2
(45) Date of Patent: Dec. 30, 2025

(54) METHOD OF MANUFACTURING A PRESSURE CHAMBER OF A DENTAL MOUTHPIECE, METHOD OF MANUFACTURING A DENTAL MOUTHPIECE, PRESSURE CHAMBER AND MOUTHPIECE MANUFACTURED WITH THESE METHODS, PROVIDED WITH THESE METHODS, J-/U-SHAPED DENTAL MOUTHPIECE, AND SYSTEMS COMPRISING SAID MOUTHPIECES

(71) Applicant: Dental Robotics Group B.V., Delft (NL)

(72) Inventors: Joppe Gideon Van Dijk, Rotterdam (NL); Tim Anton Snijder, Rotterdam (NL); Thomas Van De Water, The Hague (NL)

(73) Assignee: DENTAL ROBOTICS GROUP B.V., Delft (NL)

( * ) Notice: Subject to any disclaimer, the term of this patent is extended or adjusted under 35 U.S.C. 154(b) by 365 days.

(21) Appl. No.: 18/004,079

(22) PCT Filed: Jul. 1, 2021

(86) PCT No.: PCT/EP2021/068160
§ 371 (c)(1),
(2) Date: Jan. 3, 2023

(87) PCT Pub. No.: WO2022/003098
PCT Pub. Date: Jan. 6, 2022

(65) Prior Publication Data
US 2023/0293279 A1 Sep. 21, 2023

(30) Foreign Application Priority Data

| Jul. 3, 2020 | (NL) | 2025996 |
| Jul. 3, 2020 | (NL) | 2025997 |
| Jul. 3, 2020 | (NL) | 2025998 |

(51) Int. Cl.
*A61C 17/22* (2006.01)
*A46B 9/04* (2006.01)

(52) U.S. Cl.
CPC ............ *A61C 17/227* (2013.01); *A46B 9/045* (2013.01); *A61C 17/222* (2013.01)

(58) Field of Classification Search
CPC ..... A61C 17/227; A61C 17/222; A46B 9/045; A46B 5/0012
See application file for complete search history.

(56) References Cited

U.S. PATENT DOCUMENTS

| 8,359,692 B2 | 1/2013 | Brewer |
| 2011/0104633 A1 | 5/2011 | Levine |
| 2013/0236849 A1 | 9/2013 | Jasper |

FOREIGN PATENT DOCUMENTS

| CN | 110650653 | 1/2020 |
| CN | 210672511 | 6/2020 |

(Continued)

OTHER PUBLICATIONS

International Search Report and the Written Opinion of the International Searching Authority issued in International Application PCT/EP2021/068160 mailed Oct. 11, 2021.

*Primary Examiner* — Shay Karls

(57) ABSTRACT

This application relates to method of manufacturing a pressure chamber of a dental mouthpiece; to a method of manufacturing a dental mouthpiece and pressure chamber; to a mouthpiece manufactured with these methods, provided with these methods; to J-/U-shaped dental mouthpiece; and to systems comprising said mouthpieces. The method of manufacturing a pressure chamber joins a frame part and a flexible wall part by over-moulding. The method of manufacturing a mouthpiece starts with an essentially flat member (Continued)

comprising pressure chambers, and is folded and bended into a J-shaped or U-shaped trough configuration. The J-/U-shaped mouthpiece may comprise a multiple of trough sections and be flexible to ride along a dental arch and has its handle coupling at the anterior end of the mouthpiece.

20 Claims, 33 Drawing Sheets

(56) References Cited

FOREIGN PATENT DOCUMENTS

| | | | |
|---|---|---|---|
| JP | 2009-072609 A2 | 4/2009 | |
| KR | 20200037135 | 4/2020 | |
| WO | WO-2018199760 A1 * | 11/2018 | ............. A46B 15/00 |
| WO | 2020/017963 | 1/2020 | |
| WO | 2020/097123 | 5/2020 | |

* cited by examiner

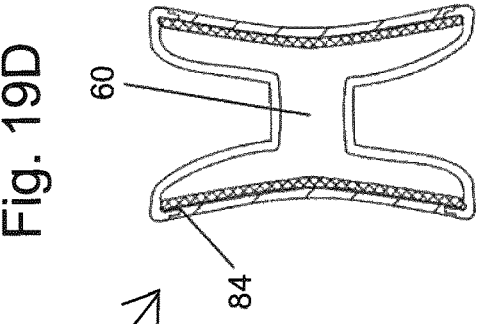
Fig. 19A
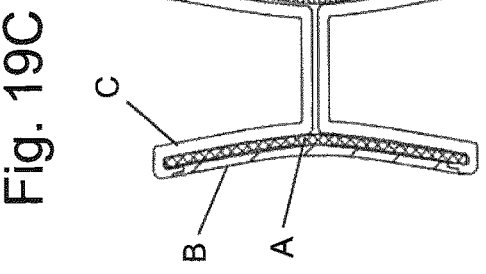
Fig. 19B
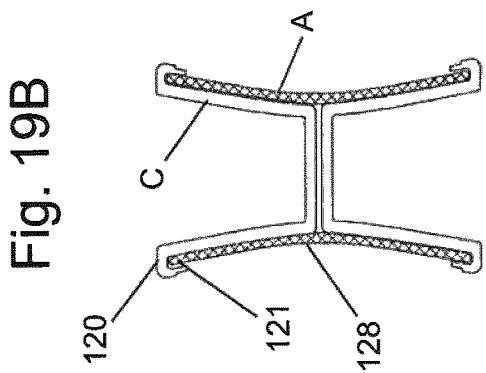
Fig. 19C
Fig. 19D
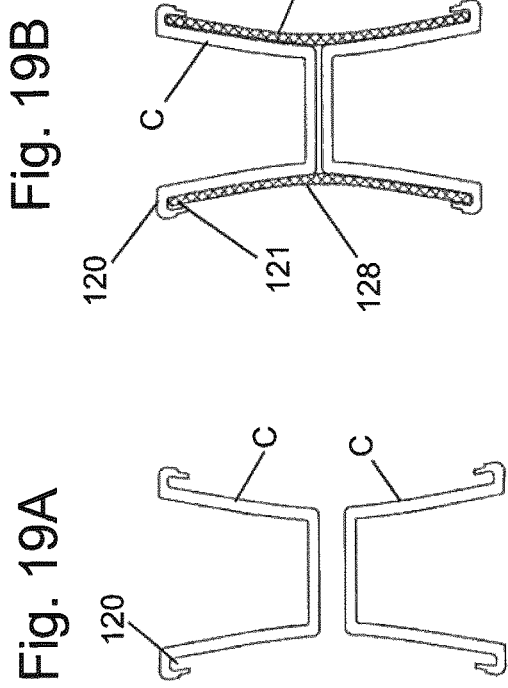
Fig. 20A
Fig. 20B
Fig. 20C
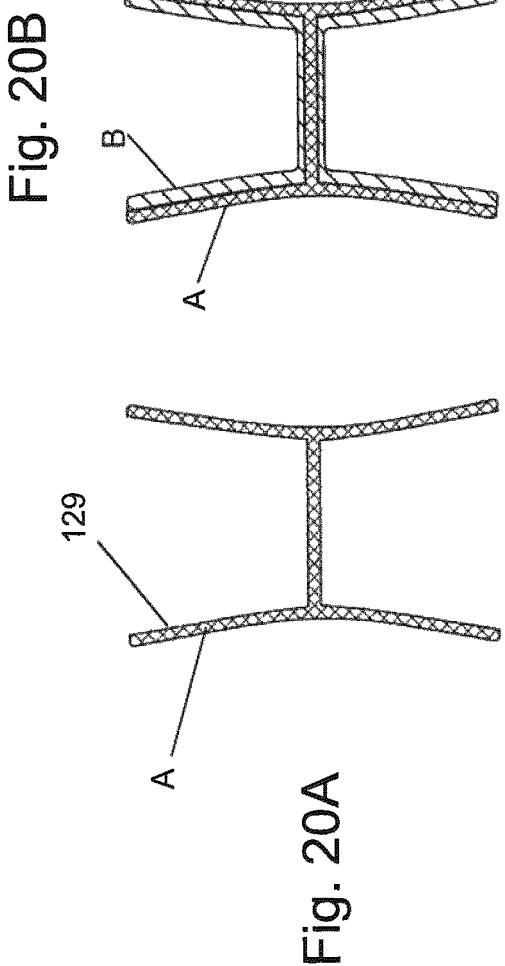

Fig. 21A
Fig. 21B
Fig. 21C
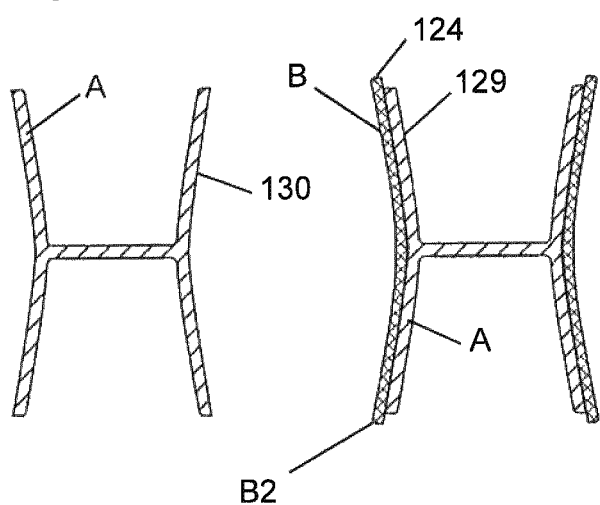
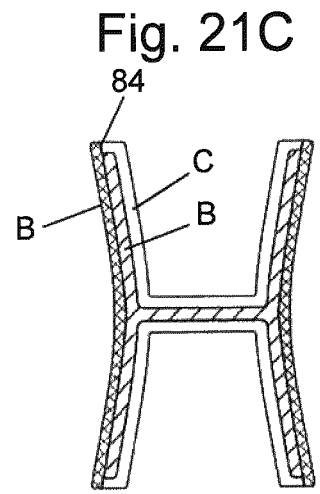
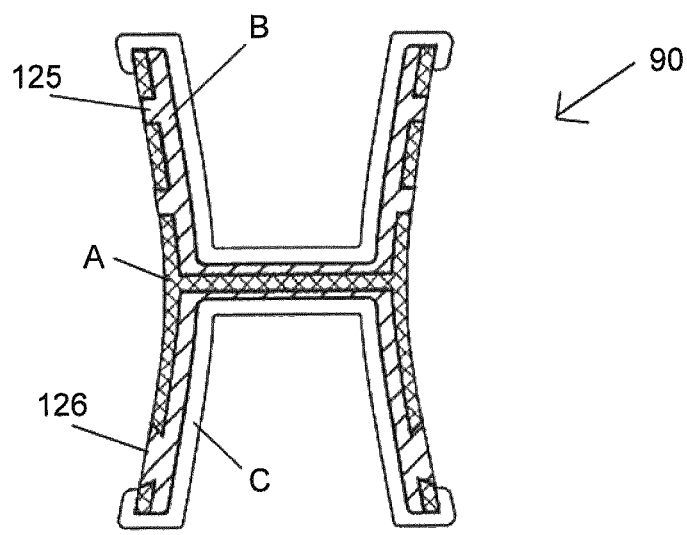
Fig. 22

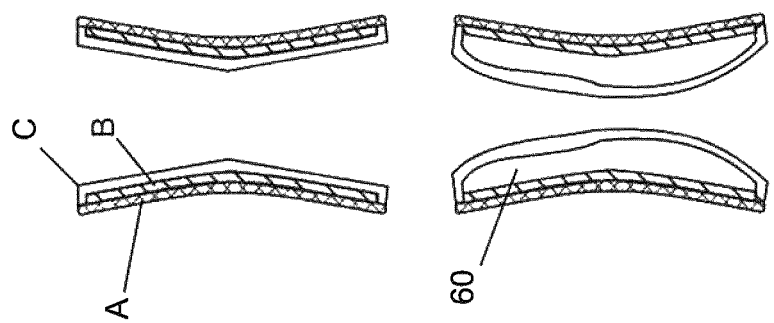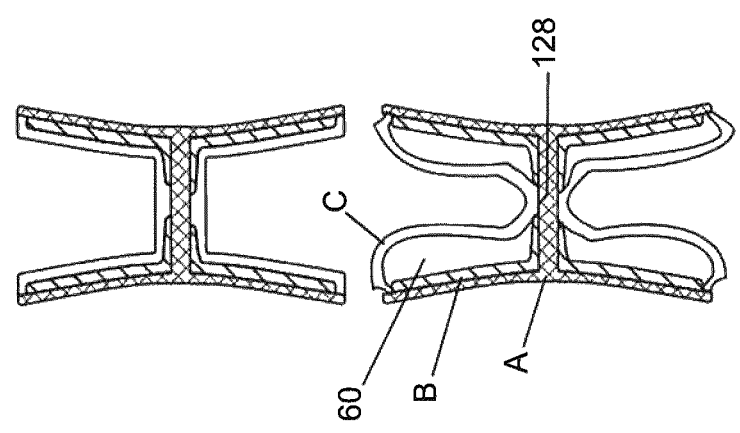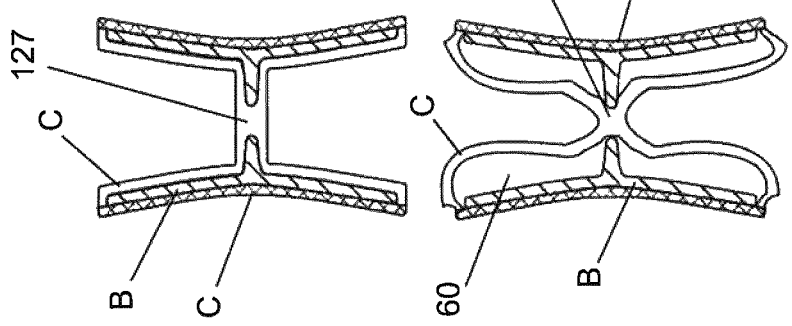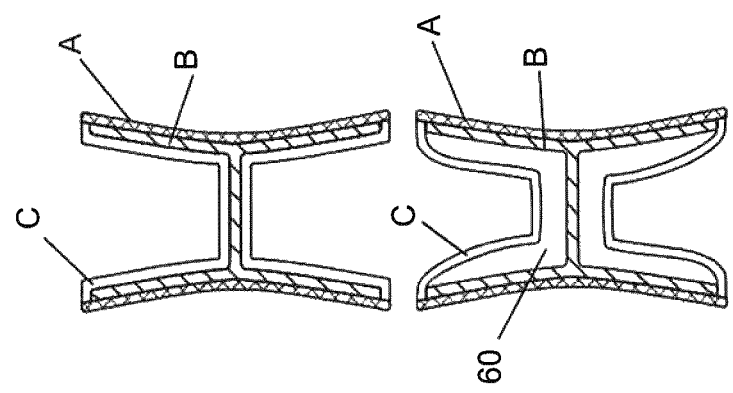

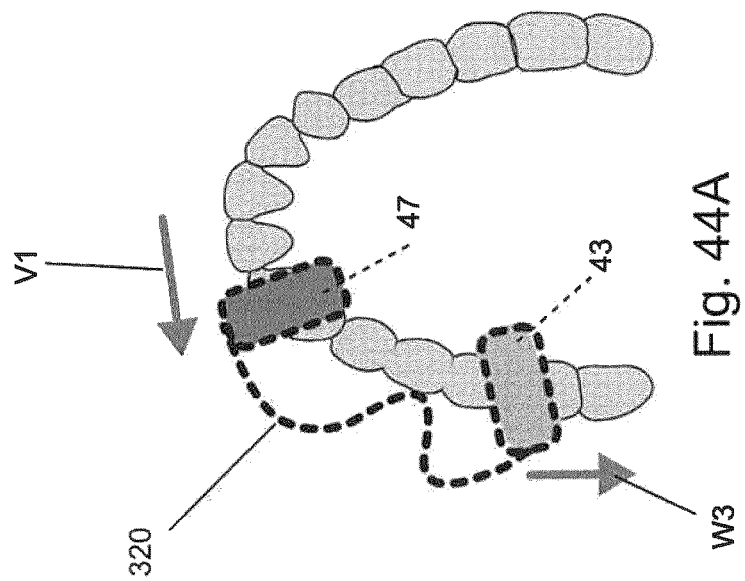
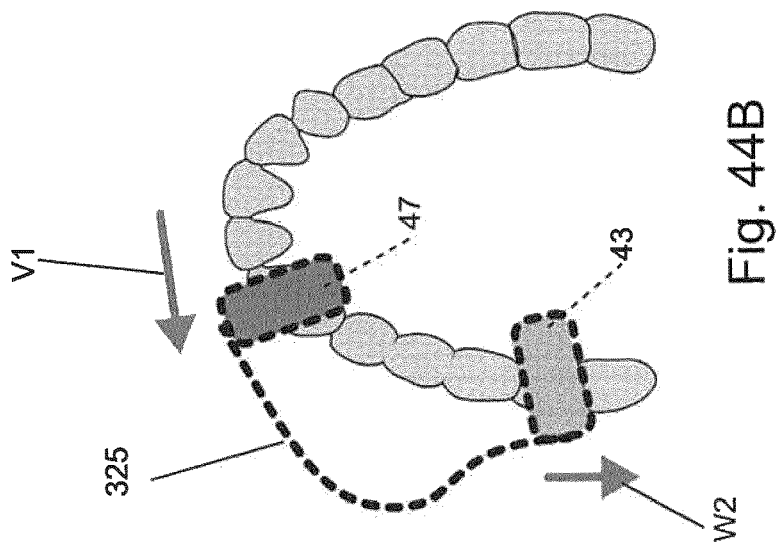
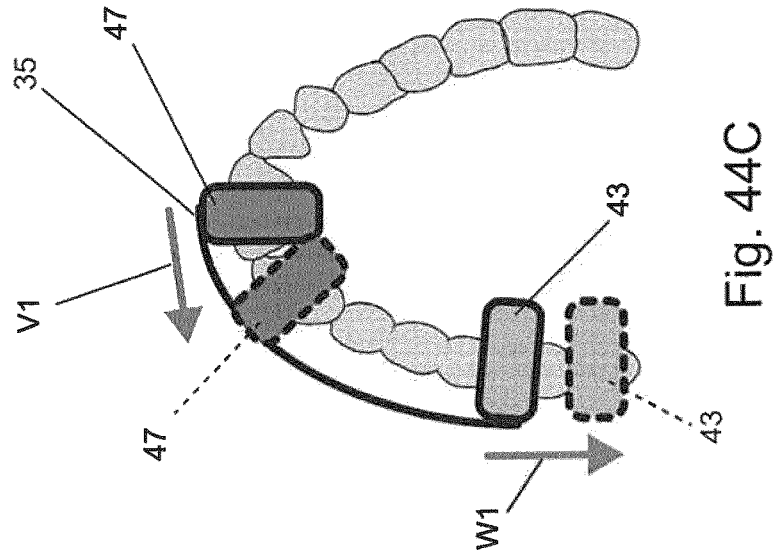

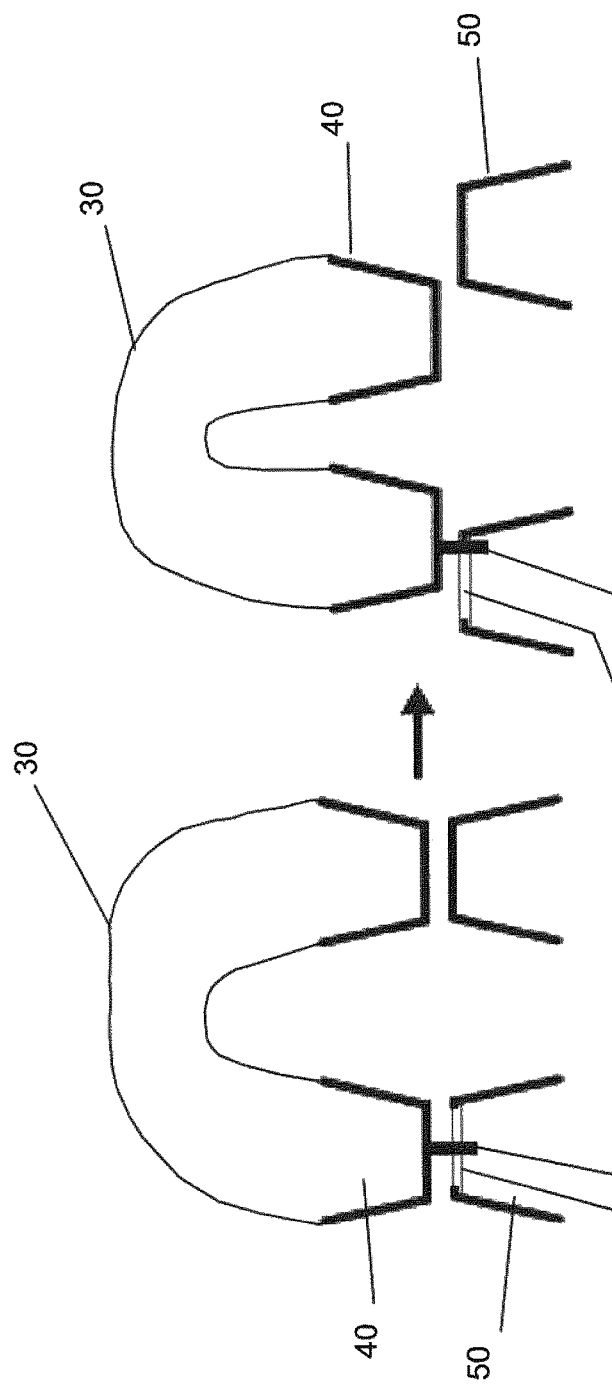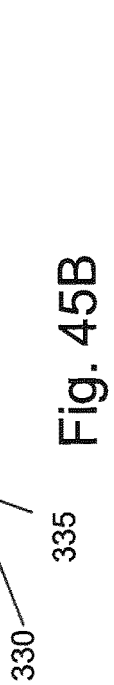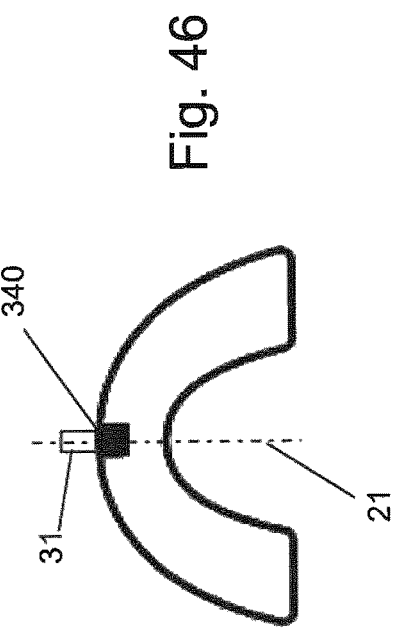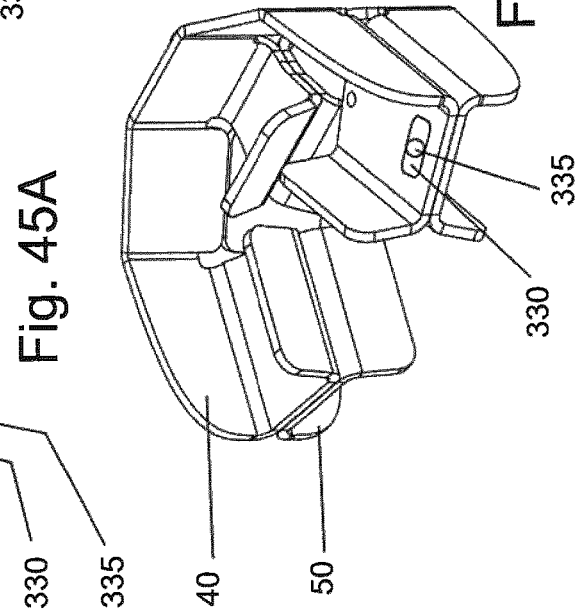

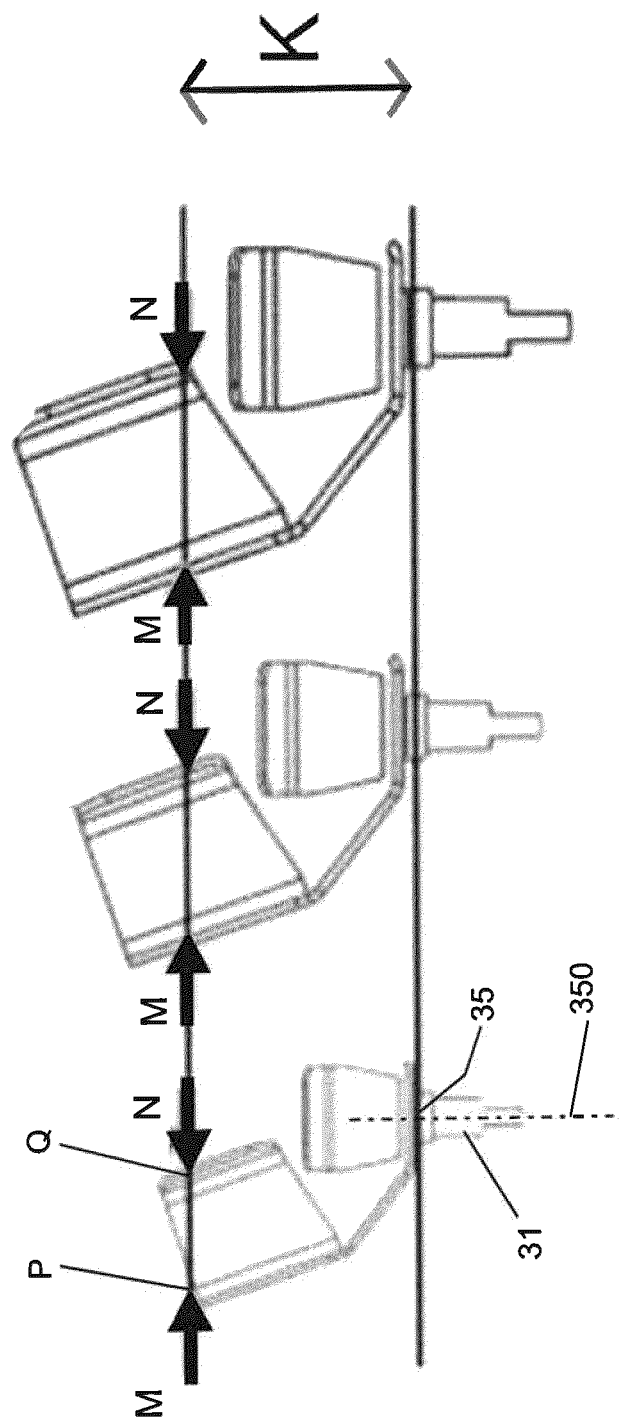

METHOD OF MANUFACTURING A PRESSURE CHAMBER OF A DENTAL MOUTHPIECE, METHOD OF MANUFACTURING A DENTAL MOUTHPIECE, PRESSURE CHAMBER AND MOUTHPIECE MANUFACTURED WITH THESE METHODS, PROVIDED WITH THESE METHODS, J-/U-SHAPED DENTAL MOUTHPIECE, AND SYSTEMS COMPRISING SAID MOUTHPIECES

CROSS-REFERENCE TO RELATED APPLICATIONS

This application claims priority to Netherlands Patent Application No. 2025996, filed Jul. 3, 2020, Netherlands Patent Application No. 2025997, filed Jul. 3, 2020, and Netherlands Patent Application No. 2025998, filed Jul. 3, 2020, the entireties of which are incorporated herein by reference.

GENERAL INTRODUCTION

This application contains three inventions, named the first invention, the second invention, and the third inventions. All these three inventions relate to the same field of 'mouthpieces simultaneously treating a plurality of dental positions'.

In this respect, a 'dental position' is in this document: the position in a dental arch where usually a tooth is present. The dental position may be filled in case the associated tooth is present, but may be empty in case, for which ever reason, the associated tooth is absent.

In this application, the term 'this document' means 'the three inventions of this application'.

In this document, the 'dental arch' is: the arch of teeth of a user in general. This user may be any user of any age, like an adult, an elderly person, an adolescent, a youngster (still) having its milk teeth, a youngster having its adult teeth, or a youngster with milk teeth and adult teeth. The term 'dental arch' as used in this document includes both the upper dental arch and the lower dental arch, regardless of whether one or more of its dental positions are empty or filled with a natural or artificial tooth.

As is commonly known, teeth need to be cleaned on a daily basis, preferably 2 to 3 times a day. Although 'treating teeth' can according to this document be any kind of treating teeth—like whitening—, the term 'treating teeth' comprises according to this document in particular 'cleaning teeth', such as the 'daily basis' cleaning. Although in this document other manners of cleaning teeth are not excluded, 'cleaning teeth' may according to this document comprise in particular 'brushing teeth'. Although the brushing may according to this document be achieved with any type of brushing element—like a rib or flap of material rubbing along the dental positions or teeth—, the brushing is according to embodiments of this document achieved by means of bristles, which includes one or more tuft of bristles as well.

In mouthpieces for simultaneously treating a plurality of dental positions, treating elements may be required to be moved to-and-fro with respect to the dental positions to be treated. Moving treating elements to-and-fro with respect to the dental positions, may according to this document (i.e.—see the definition of 'this document'—according to the three inventions of this application) be achieved by means of one or more pressure chambers which are subjected to an increasing and decreasing pressure. According to this document, the pressure in the one or more pressure chambers may be an alternating one (like current in alternating current) alternatingly increasing and decreasing, resulting in a repeating to-and-fro movement of the treating elements.

The first invention relates to a method of manufacturing one or more of such pressure chambers, a pressure chamber obtained with this method, as well as a mouthpiece obtained with this method.

In mouthpieces for simultaneously treating a plurality of dental positions, the mouthpiece may have a single or double J-shaped or single or double U-shaped trough. With a single J-shaped trough, one quarter of the dental arch may be treated at once. With a double J-shaped trough, the left or right half of the dental arch may be treated at once. With a single U-shaped trough, the upper or lower half of the dental arch may be treated at once. With a double U-shaped trough, the entire dental arch may be treated at once.

The second invention relates to a method of manufacturing a mouthpiece with a trough system, a mouthpiece obtained with this method, and a system comprising such mouthpiece. The method of the second invention may make use of the first invention but can also be without the first invention or without a pressure chamber.

The third invention relates to a J-shaped or U-shaped mouthpiece with double J-shaped trough or single or double U-shaped trough, which mouthpiece is capable to ride to-and-fro—like a mono-rail train—along the dental arch—as the rail—, and to a system comprising such a mouthpiece. The mouthpiece of the third invention may be made with the method according to the first invention and/or the method according to the second invention, but may also be made with another method. Further, the mouthpiece of the third invention may be a mouthpiece manufactured with the method of the first invention and/or second invention, but may also be a mouthpiece manufactured in another manner or of another type, such as without pressure chambers.

Next following the three inventions will be discussed.

Introduction of First Invention

The first invention may be given the title: "Method of manufacturing one or more pressure chambers of a mouthpiece for simultaneously treating a plurality of dental positions by increasing and decreasing a pressure in the pressure chambers, pressure chamber manufactured with the method, and mouthpiece comprising pressure chamber manufactured with the method.

The first invention relates to the field of dental treating devices, such as dental cleaning devices, having a J-shaped or U-shaped mouthpiece for simultaneously encompassing and treating a plurality of dental positions by increasing and decreasing a pressure in one or more pressure chambers arranged in the mouthpiece.

Background of the First Invention

Cleaning of teeth of humans and animals, or more general treating of teeth of humans and animals, is a prerequisite for oral health, and health of internal organs. Various dental treating and cleaning devices are available, such as manual and powered toothbrushes.

Dental treating devices may be divided into: dental treating devices with a treating head, and dental treating devices with a mouthpiece.

Dental treating devices with a treating head, comprise a rod or handle with on one end a treating head. In use the treating head is inserted into the mouth and manually moved along all the dental positions, to treat each dental position. In case of a tooth brush, the treating head is provided with substantially parallel bristles for brushing the teeth from one side at a time. In case a dental device with a treating head is powered, treating elements provided on the treating head are moved with respect to the treating head by a movement system, which in general comprises an electromotor arranged in the handle and mechanically coupled to the treating elements for moving the treating elements with respect to the treating head.

Dental treating devices with a mouthpiece, comprise a J-shaped or U-shaped mouthpiece for simultaneously encompassing a plurality of dental positions and simultaneously treating a plurality of dental positions. In general the mouthpiece encompasses teeth in a trough, which trough may comprise several trough sections aligned to form a J-shaped or U-shaped trough. In case of a mouthpiece for simultaneously treating teeth of the upper dental arch and lower dental arch, the mouthpiece in general comprises an upper trough for encompassing teeth of the upper dental arch and a lower trough for encompassing teeth of the lower dental arch. Dental cleaning devices with a mouthpiece may be sub-divided into treating devices with a mouthpiece which is from a mechanical perspective passively treating teeth and treating devices with a mouthpiece which is from a mechanical perspective actively treating teeth. In passively treating mouthpieces, the trough comprises in general a chemical compound or radiation source acting on the teeth without any treating elements in the mouthpiece being moved with respect to the mouthpiece. In actively treating mouthpieces, the mouthpiece is provided with treating elements, which are arranged in or on the mouthpiece and are moved with respect to the mouthpiece.

In actively treating mouthpieces, the treating elements may be moved by means of pressure chambers provided in the mouthpiece and pneumatically or hydraulically operated to cause a movement of treating elements with respect to the rest of the mouthpiece by increasing and decreasing a pressure in the pressure chamber. This is as such known, see for example applicant's earlier WO-2018/199760 and WO-2020/017963.

In mouthpieces with one or more pressure chambers according to the first invention, the mouthpiece is of the type, in which:
the mouthpiece comprises a frame, a flexible wall, which is flexible relative to the frame, and a pressure chamber between the frame and flexible wall,
the flexible wall comprises the treating elements configured for acting onto the dental positions for treatment of the dental positions, and
is configured to subject the flexible wall to a to-and-fro movement relative to the frame by increasing and decreasing a pressure in the pressure chamber.

The pressure in the pressure chamber may according to (further embodiments of) the first invention be an alternating one, which alternatingly increases and decreases to obtain a repeating to-and-fro movement. Such pressure chambers are known as such, see for example applicant's earlier WO-2018/199760 and WO-2020/017963.

Taking into account the limited space available in the mouth, the movement caused by the pressure chamber should be transferred efficiently into a to-and-fro movement of the treating elements comprised by the flexible wall, so that in the ideal situation only the treating elements move with respect to the dental positions to be treated. This means that whilst the flexible wall comprising the treating elements is deformable when increasing and decreasing the pressure in the pressure chamber, the rest of the mouthpiece is to be prevented from deforming when increasing and decreasing the pressure in the pressure chamber. The pressure chamber thus is arranged between a frame and wall, which wall is flexible relative to the frame.

Concerning the pressure used, it is known that when brushing teeth the pressure exerted on the teeth is to be kept below a certain maximum brushing pressure because otherwise the gum may become damaged. For this reason, regular electric toothbrushes, which belong to the group of 'dental treating devices with a treating head', frequently have a warning system warning the user when the maximum pressure is exceeded during brushing. In relation to dental cleaning devices with mouthpieces, it is known from Chapter 2 of WO-2020/017963 that the maximum pressure in the pressure chamber may as low as +0.5 bar (relative to the ambient pressure) or lower. The flexibility of the flexible wall relative to frame thus may be in relation to relatively small pressures.

When manufacturing mouthpieces of the type, in which:
the mouthpiece comprises a frame, a flexible wall, which is flexible relative to the frame, and a pressure chamber between the frame and flexible wall,
the flexible wall comprises the treating elements configured for acting onto the dental positions for treatment of the dental positions, and
the mouthpiece is configured to subject the flexible wall to a to-and-fro movement relative to the frame by increasing and decreasing a pressure in the pressure chamber,
especially the manufacturing of pressure chambers is in practice quite a challenge. A hollow space, the pressure chamber, has to be made, which should have a flexible wall and also a frame rigid relative to the flexible wall to withstand deformation. On prototyping level and for small numbers, this may be done by manually assembling pre-fabricated parts. When assembling the pre-fabricated parts manually this can be done very carefully so that there is no leakage of the pressure chamber. When increasing the production volume, leakage of the pressure chamber may become an issue with a high rejection rate as a consequence.

It is therefore an object of the first invention, to provide an alternative method of manufacturing pressure chambers for mouthpieces of the above mentioned type. A further object is providing such a method which overcomes one or more of the above disadvantages. Another further object is to provide such a method which may allow economic manufacturing in large(r) numbers, preferably with a low rejection rate.

Summary of the First Invention

C1: One or more of the above objects are according to a first aspect of the first invention achieved by providing a method of manufacturing a pressure chamber, such as one or more pressure chambers, of or for a mouthpiece for simultaneously treating a plurality of dental positions by increasing and decreasing a pressure in the one or more pressure chambers, wherein the method comprises:
a step b) of providing a frame part of a frame of the mouthpiece in an injection mould,
a step c) of providing a wall part of a flexible wall of the mouthpiece in the injection mould,
a step f) of over-moulding, in which a first over-moulding material is injected into the injection mould to attach the wall part and frame part to each other along an attachment loop (which may be an essentially closed attachment loop) such that the attachment loop, a part of the wall part surrounded by the attachment loop, and a part of the frame part surrounded by the attachment loop delimit a composed pressure chamber, and a step g) of allowing the composed pressure chamber to solidify and removing it from the injection mould, which step g) results in the pressure chamber to be manufactured having a frame part and flexible wall part.

With respect to the above terms 'step b)', 'step c)', 'step f)' and 'step g)' as well as the terms 'step a)', 'step d)', and 'step e)' to follow, it is noted that these are just used as short names for identification and that the respective letters a), b), c), d), e), f) and g) as such say nothing about the order in which these steps take place. For example, step b) and/or step c) may take place before step c). As a further example, step a) and/or step b) and/or step c) may take place in step f).

With respect to this document, and here specifically in relation to the first invention, the following is noted:

Overmoulding is the injection moulding process where one material is moulded onto a second material.

There are basically two types of overmoulding processes: insert moulding and multi-shot injection moulding.

In insert moulding a pre-moulded insert is placed into a mould and the second material is shot (injected) over it. Insert moulding allows using a single shot injection moulding machine.

In multiple material moulding, also known as two-shot or multi-shot (in case of more than two materials) injection moulding requires an injection moulding machine allowing two or more materials to be shot (injected) into the same mould during the same moulding cycle.

In the step f) a material will be injected into the injection mould. This material may be called the first injected material. It is for example conceivable that the step f) coincides with step b), i.e. with providing the frame part. In this case the frame part is provided by over-moulding and the first injected material will be the material from which the frame part is made. It is also conceivable that the step f) coincides with step c), i.e. with providing the wall part. In this case the wall part is provided by over-moulding and the first injected material will be the material from which the wall part is made. It is also conceivable that the frame part and wall part are provided as pre-fabricated parts which are placed as an insert in the injection mould and that the first material injected in the step f) is additional material (which may be the same as one the wall part material or frame part material, or may differ from both). Finally, it is also conceivable that both the steps b) and c) coincide with the step f). In this case the wall part and frame part are provided by multi-shot injection moulding two materials simultaneously in the same mould during the same moulding cycle.

Independent from how the wall part and/or frame part are provided according to the first invention, in the resulting manufactured pressure chamber the wall part will be flexible and the frame part will be rigid, flexible and rigid being in mutual relation. This flexibility or rigidity may origin in solidifying after having been injected into the injection mould in case it has been injected during the step f). In case the wall part and/or frame part is/are provided as pre-fabricated part(s), said part may have its rigidity respectively flexibility already before the step f).

Using over-moulding to attach the frame part and wall part together in an injection mould in order to forming a pressure chamber allows for an efficient and reliable manufacturing of pressure chambers. As will follow from further embodiments of the first invention, to be described below, this over-moulding can be in several manners each having their specific benefits.

C2: According to a further embodiment of the first aspect of the first invention, the wall part may be stretchable. According to a further embodiment of this embodiment, the wall part may be elastically stretchable.

C3-4: According to another further embodiment of the first aspect of the first invention, the method further comprises a step of arranging the frame part and wall part in a layered manner along each other to obtain a layered structure with a frame part layer and a wall part layer parallel to each other. Arranging the frame part and wall part in a layered manner to obtain a layered structure results in a pressure chamber having minimal dimensions in its direction transverse to the layered structure, which allows the thickness of the mouthpiece, viewed transverse to the dental positions to be treated, to be minimized further. According to a further embodiment of this embodiment, the method may further comprise a step of introducing a pressurized medium into the area, between the frame part layer and wall part layer, which area is surrounded by the attachment loop, to separate the frame part layer and wall part layer. This step of introducing pressurized medium, which may take place during step f) or during step g), prevents the frame part layer and wall part layer from sticking together or in case sticking together prevents this sticking together from becoming permanent.

C5-6: According to another further embodiment—also called the 'intermediate member' embodiment—of the first aspect of the first invention, the method further comprise a step a) of providing an intermediate member; wherein one of the steps b) and c) take place before step f) resulting in a provided part; wherein the method further comprise a step d) of combining the provided part and intermediate member to obtain a combined part, in which combined part the intermediate member is a positive or negative pre-defining a location of the attachment loop to be obtained, after step d), in the step f); and wherein the other of the steps b) and c) takes place in the step f) to provide the other of the wall part respectively frame part by moulding it onto the combined part to obtain the layered structure and the attachment loop. Assuming that step b) takes place before step d), the combined part obtained in step d) comprises the frame part and intermediate part, and the wall part is obtained—in step f)—by overmoulding it onto the combined part. Assuming that step c) takes place before step d), the combined part obtained in step d) comprises the wall part and intermediate part, and the frame part is obtained—in step f)—by overmoulding it onto the combined part. In case the intermediate part is a positive pre-defining the location of the attachment loop, the intermediate part will become part of the attachment loop when attaching the wall part to the frame part. In case the intermediate part is a negative pre-defining the location of the attachment loop, the intermediate part caver the provided part whilst leaving free the location of the attachment loop, and will not become part of the attachment loop when attaching the wall part to the frame part. To prevent the intermediate member from moving, during step f), with respect to the provided part, the intermediate member is—according to a further embodiment of this further embodiment—in step d) attached to the provided part.

C7-8: According to a further 'intermediate member' embodiment of the first aspect of the first invention (i.e. a further embodiment of the embodiment in which an intermediate member is used), the step b) takes place before the step f) resulting in the provided part being the frame part, and step c) takes place with or in the step f). In order to incorporate providing bristles already during manufacturing of the pressure chamber, it is according to a further embodiment of this embodiment provided that the method further comprises, before the step f), a step e) of preparing the injection mould such that it has a die cavity delimited by a first cavity wall and a second cavity wall opposite and spaced from the first cavity wall, wherein the step e) comprises:

provide a said first cavity wall with bores which bores
have bore ends which open into the die cavity, and
are filled with bristles having a root section lying at the bore ends; and
placing the combined part as an insert into the die cavity spaced from the first cavity wall and with the frame part against the second cavity wall;

wherein, in the first over-moulding material is a wall material for forming the wall part and is, in the step f), injected into the die cavity such that the root section of the bristles becomes integral with the wall part. The intermediate member will face the first cavity wall and may possibly contact the first cavity wall at some location. With respect to providing the first cavity wall with bores filled with bristles, it is noted that this 'providing' may by in the form of placing an insert into the mould, which insert comprising a cavity wall (insert) having bores filled with the bristles. This insert may for example originate from a preceding manufacturing step in which bristles are attached to root sections common for multiple bristles arranged in different bores. With respect to the root section, it is noted that each bristle or tuft of bristles may have their own root section, but it is also conceivable that the multiple of bristles (or tuft of bristles) arranged in different bores may have a common root section. In step f) the bristles become, at their root sections, attached to the injected wall part as an integral part of the wall part (i.e. the wall part and bristles are so to say one part). This is due to the root sections being over-moulded by the injected wall material, which may for example result in the root-sections becoming embedded in the wall part or fused with the wall part.

C9: According to an alternative further 'intermediate member' embodiment of the first aspect of the first invention, the step c) may also takes place before the step f) resulting in the provided part being the wall part. In order to incorporate providing bristles already during manufacturing of the pressure chamber, the method may further comprise, before the step f), a step e) of preparing the injection mould such that it has a die cavity delimited by a first cavity wall and a second cavity wall opposite and spaced from the first cavity wall; wherein the step e) comprises:

providing a said first cavity wall with bores, which bores:
have bore ends which open into the die cavity, and
are filled with bristles having a root section lying at the bore ends; and
placing the combined part as an insert into the die cavity spaced from the second cavity wall and with the wall part contacting the root sections;

wherein the first over-moulding material is a frame material (A) for forming the frame part and is, in step f), injected into the die cavity. In this respect it is noted that the bristles and wall part may be a prefabricated unit in which the bristles are already attached to (and thus also contacting) the wall part, but it is also conceivable that the bristles initially contact the wall part with their root section without (initially) being attached to the wall part and fuse with the wall part due to the heat of the frame material injected in the step f).

C10-16: In the 'intermediate member' embodiment, there are according to the first aspect of the first invention several further embodiments relating to the providing of the intermediate member and/or attaching of the intermediate member to the provided part:

According to one of these further embodiments, the step a) may takes place before the steps b) and c), i.e. the intermediate member is provided before providing the frame part and wall part.

According to another one of these further embodiments, the step d) comprises a first further over-moulding step in which the intermediate member and provided part are combined by over-moulding. In this embodiment it is conceivable that the intermediate member is a prefabricated part and that the provided part is over-moulded onto the pre-fabricated intermediate member, or that the provided part is a prefabricated part and that the intermediate member is over-moulded onto the pre-fabricated provided part, or that the intermediate member and provided part are simultaneously provided by multi-material moulding. For example, according to a further one of this embodiments, the intermediate member fuses with the provided part during the first further over-moulding step.

According to another further one of these further embodiments, the intermediate member is, in the step d), attached to the provided part by an adhesive.

According to another further one of these further embodiments, the intermediate member is, in the step d), mechanically attached to the provided part.

According to another further one of these further embodiments, the intermediate member may comprise a 3-dimensional male or female configuration mating with a corresponding 3-dimensional female respectively male configuration of at least part of the provided part such that the intermediate member and provided part fit in a male-female manner into each other.

According to another further one of these further embodiments, the intermediate member may, in the step a), be provided by spraying, such as by spraying the intermediate member onto the provided part. This spray may or may not be adhesive with respect to the provided part.

These several embodiments may be applied in combination with each other.

C17: According to several further embodiments-further called 'intermediate layer' embodiments—of the first aspect of the first invention, the wall part and frame part may fuse together when over-moulded onto each other and the intermediate member may be an intermediate layer arranged between the wall part and frame part. According to the main embodiment of the 'intermediate layer' embodiments: the frame part and wall part are fusible with each other when over-moulded onto each other; the intermediate member is an intermediate layer; the provided part of the combined part resulting from the step d) is covered with the intermediate layer whilst leaving a fusing loop on the provided part exposed; said other of the wall part respectively frame part is obtained, in the step f), by moulding a layer onto the intermediate layer and onto the fusing loop resulting in:

a layered structure with the intermediate layer arranged between the frame part layer and the wall part layer, and
the attachment loop by fusing of the frame part layer and wall part layer at the fusing loop;

and the intermediate layer is configured to provide a separation layer along which the wall part layer separates from the frame part layer when introducing a pressurized medium between the wall part layer and frame part layer. Introducing the pressurized medium may take place during the method according to the first invention, for example, such as in the step f) and/or the step g), but it may also take place after the manufacturing of the pressure chamber, for example in a test procedure for testing proper functioning or at the first use of the pressure chamber by a user.

C18-19: According to a first further embodiment of the 'intermediate layer' embodiment according to the first aspect of the first invention, the intermediate layer-which may optionally be a laminate—has a first outer surface—or in case of a laminate a first outer layer—which faces the provided part and is attached to the provided part or—if not yet attached to it—fuses with the provided part in the step f), and the laminate has a second outer surface—or in case of a laminate a second outer layer—facing away from the provided part, which second outer surface is configured to resist fusing with the first over-moulding material injected in the step f). As an example of this first further embodiment of the 'intermediate layer' embodiment, the intermediate layer may comprises or may be made of a polyamide (PA) or a polyethylene (PE), the frame part may comprises or may be made of a polypropylene (PP), and the wall part may comprise or may be made of a thermoplastic polymer (TPE), such as a styrene-ethylene/butylene-styrene (SEBS).

C20: According to a second further embodiment of the 'intermediate layer' embodiment according to the first aspect of the first invention, the intermediate layer may be a laminate comprising a first surface bonding to the wall part layer, a second surface bonding to the frame part layer, and, in between the first and second surface, a weakened area to provide the separation layer such that the wall part layer separates from the frame part layer by delamination when said pressurized medium is introduced between the wall part layer and frame part layer.

C21-23: According to a third further embodiment of the 'intermediate layer' embodiment according to the first aspect of the first invention, the intermediate layer covering the provided part may have an exposed surface facing away from the provided part, which exposed surface is configured to resist fusing with the first over-moulding material which is injected in the step f). According to a further embodiment of this third further embodiment, the intermediate layer covering the provided part may have, opposite the exposed surface, an opposing surface facing the provided part, which opposing surface is configured to fuse with the provided part due to the heat of the first over-moulding material injected in the step f). As an example of this third further embodiment of the 'intermediate layer' embodiment, the intermediate layer may comprises or may be made of a polyamide (PA), the wall part may comprise or may be made of a thermoplastic polymer (TPE), such a styrene-ethylene/butylene-styrene (SEBS), and the frame part may comprise or may be made of a TPE-PA (=a thermoplastic polymer that bonds with a polyamide when heated). A TPE-PA may for example be a TPE with an admixture of a PA, for example a 5-10 weight % admixture of a PA.

C24-26: According to a fourth further embodiment of the 'intermediate layer' embodiment according to the first aspect of the first invention, the intermediate layer covering the provided part may have an exposed surface facing away from the provided part, which exposed surface is configured to fuse with the first over-moulding material which is injected in the step f). According to a further embodiment of this fourth further embodiment, the intermediate layer covering the provided part has, opposite the exposed surface, an opposing surface facing the provided part, which opposing surface is of a material configured to resist fusing with the provided part due to the heat of the first over-moulding material which is injected in the step f). As an example of this fourth further embodiment of the 'intermediate layer' embodiment, the intermediate layer may comprises or may be made of a polyamide (PA), the wall part may comprise or may be made of a thermoplastic polymer (TPE), such a styrene-ethylene/butylene-styrene (SEBS), and the frame part may comprise or may be made of a polypropylene (PP).

C27-28: According to several further embodiments—further called 'bead loop' embodiments—of the first aspect of the first invention, the wall part and frame part may not fuse together when over-moulded onto each other and the intermediate member may be bead loop. According to the 'bead loop' embodiment: the frame part and wall part are configured to resist fusing with each other when over-moulded onto each other; the intermediate member is a bead loop which is configured to fuse, in the step f), with the first over-moulding material; the bead loop is, in the step d), placed against the provided part whilst leaving inside the bead loop an exposed (or uncovered) area of the provided part; and, the first over-moulding material injected in step f) is moulded onto the bead loop and onto the exposed area resulting in:

a layered structure with the frame part layer and the wall part layer lying against each other, and
 the attachment loop by fusing of the first over-moulding material in the step f) with the bead loop.

According to a further embodiment of this 'bead loop' embodiment, the bead loop may be configured to fuse with the provided part due to the heat of the first over-moulding material injected in the step f) or due to the heat of the bead loop itself in case the bead loop is provided onto the provided part by a second further over-moulding step.

C29: According to several further embodiments—further called 'pre-fab' embodiments—of the first aspect of the first invention, the wall part and frame part may both be provided as a pre-fabricated part. According to the main embodiment of the 'pre-fab' embodiments: the frame part provided in the step b) is a pre-fabricated frame part; the wall part provided in the step c) is a pre-fabricated wall part; which means that steps b) and c) both take place before step d); step e) comprises placing the pre-fabricated frame part and the pre-fabricated wall part as an insert into the injection mould with the frame part and wall part pressed against each other along a circumferential edge of the pre-fabricated wall part; and, the first over-moulding material injected in the step f) fuses, in the step f), with the circumferential edge of the wall part such that the circumferential edge of the wall part becomes fixed relative to the frame part to provide the attachment loop.

C30: According to a further embodiment of the 'pre-fab' embodiment of the first aspect of the first invention, the insert of the pre-fabricated frame part and pre-fabricated wall part may be a layered structure in which the part of the wall part layer inside the circumferential edge pressed into contact with the frame part layer lies loose against the frame part layer. According to an alternative of this further embodiment of the 'pre-fab' embodiment, the insert may comprise a cavity enclosed by the pre-fabricated wall part and pre-fabricated frame part.

C31: According to another further embodiment of the 'pre-fab' embodiment of the first aspect of the first invention, the pre-fabricated wall part is along at least part of the circumferential edge provided with a slitted female part configured to receive a mating male edge of the pre-fabricated frame part.

C32-33: According to another further embodiment of the 'pre-fab' embodiment of the first aspect of the first invention, an opposite side of the frame part, which faces away from the pressure chamber is covered with the first over-moulding material injected in the step f) such that the injected first over-moulding material connects opposing sides of the circumferential edge along a shortest line between the opposing sides of the circumferential edge. According to a further embodiment of this embodiment, the opposite side of the frame part is covered with the material (B) injected for at least 80%, such as at least 90% or 100%.

C34: According to another further embodiment of the 'pre-fab' embodiment of the first aspect of the first invention, the first over-moulding material is configured to fuse, in step f), with the frame part.

C35-36: According to a second aspect, the first invention provides a pressure chamber manufactured with the method according to the first aspect. According to a further embodiment of this second aspect, the wall part is provided with bristles projecting from the wall part in a direction away from the frame part.

C37: According to a third aspect, the first invention provides a mouthpiece for simultaneously treating a plurality of dental positions by increasing and decreasing pressure in one or more pressure chambers, comprising at least one pressure chamber manufactured with the method according to the first aspect of the first invention.

C38-40: According to a further embodiment of the third aspect of the first invention, the mouthpiece has one or more troughs configured with a J-shaped or U-shaped curved length direction for encompassing a multiple of teeth of a dental arch. According to a further embodiment of this embodiment, the wall part defines a wall of the trough. According to another further embodiment of this embodiment, the trough comprises trough sections aligned on the curved length direction.

C41: According to another further embodiment of the third aspect of the first invention, the wall part is provided with bristles projecting from the wall part in a direction away from the frame part.

C42: According to another further embodiment of the third aspect of the first invention, the mouthpiece is provided with a pressure medium connector in fluid connection with the pressure chamber(s).

C43: According to another further embodiment of the third aspect of the first invention, the mouthpiece is provided with a handle connector.

C45: According to a fourth aspect, the first invention provides a system comprising a mouthpiece according to the third aspect, and a handle configured for detachable attachment to the mouthpiece, such as to the handle connector of the mouthpiece. According to a further embodiment of the fourth aspect of the first invention, the handle comprises a drive configured for alternatingly pressurizing and depressurizing the pressure chamber or pressure chambers to move the bristles to-and-fro.

Introduction of Second Invention

The second invention may be given the title: "Method for manufacturing a mouthpiece with a trough system for simultaneously treating a plurality of dental positions by increasing and decreasing a pressure in one or more pressure chambers, mouthpiece obtained with the method, and treating system comprising a mouthpiece obtained with the method".

The second invention relates to the field of dental treating devices, such as dental cleaning devices and more specifically dental brushing devices, having a mouthpiece with a trough system for simultaneously treating a plurality of dental positions by increasing and decreasing a pressure in one or more pressure chambers arranged in the mouthpiece. In these dental treating devices the trough system may be provided with treating elements which are moved to-and-fro by alternatingly increasing and decreasing the pressure in the one or more pressure chambers. In these dental treating devices, the mouthpiece and trough system provided in it may be J-shaped for treating a left or right side of a dental arch or U-shaped for treating a right and left side of a dental arch simultaneously.

Background of the Second Invention

Cleaning of teeth of humans and animals, or more general treating of teeth of humans and animals, is a prerequisite for oral health, and health of internal organs. Various dental treating and cleaning devices are available, such as manual and powered toothbrushes.

Dental treating devices may be divided into: dental treating devices with a treating head, and dental treating devices with a mouthpiece.

Dental treating devices with a treating head, comprise a rod or handle with on one end a treating head. In use the treating head is inserted into the mouth and manually moved along all the dental positions, to treat each dental position. In case of a regular toothbrush, the treating head is provided with substantially parallel bristles for brushing the teeth from one side at a time. Although not widespread and little used, also toothbrushes with a treating head for treating teeth simultaneously from three sides (the lingual side, the facial side and occlusal side) are known. In case a dental device with a treating head is powered, treating elements provided on the treating head are moved with respect to the treating head by a movement system, which in general comprises an electromotor arranged in the handle and mechanically coupled to the treating elements for moving the treating elements with respect to the treating head.

Dental treating devices with a mouthpiece, comprise a J-shaped or U-shaped mouthpiece for simultaneously encompassing a plurality of dental positions and simultaneously treating a plurality of dental positions. In general the mouthpiece encompasses multiple teeth in a trough, which trough may comprise several trough sections aligned to form a J-shaped or U-shaped trough system. In case of a mouthpiece for simultaneously treating teeth of the upper dental arch and lower dental arch, the mouthpiece in general comprises an upper trough for encompassing teeth of the upper dental arch and a lower trough for encompassing teeth of the lower dental arch. Dental cleaning devices with a mouthpiece may be sub-divided into treating devices with a mouthpiece which is from a mechanical perspective passively treating teeth and treating devices with a mouthpiece which is from a mechanical perspective actively treating teeth. In passively treating mouthpieces, the trough comprises in general a chemical compound or radiation source acting on the teeth without any treating elements in the mouthpiece being moved with respect to the mouthpiece. In actively treating mouthpieces, the mouthpiece is provided with treating elements, which are arranged in the trough and are moved with respect to the mouthpiece.

In actively treating mouthpieces, the treating elements may be moved by means of pressure chambers provided in the mouthpiece and pneumatically or hydraulically operated to cause a movement of treating elements with respect to the rest of the mouthpiece by increasing and decreasing a pressure in the pressure chamber. This is as such known, see for example applicant's earlier WO-2018/199760 and WO-2020/017963.

In mouthpieces with one or more pressure chambers according to the second invention, the mouthpiece is of the type, in which:
  the mouthpiece comprises a frame, a flexible wall, which is flexible relative to the frame, and a pressure chamber between the frame and flexible wall,
  the flexible wall comprises the treating elements configured for acting onto the dental positions for treatment of the dental positions, and
  the mouthpiece is configured to subject the flexible wall to a to-and-fro movement relative to the frame by increasing and decreasing a pressure in the pressure chamber.

The pressure in the pressure chamber may according to (further embodiments of) the second invention be an alternating one, which alternatingly increases and decreases to obtain a repeating to-and-fro movement. Such pressure chambers are known as such, see for example applicant's earlier WO-2018/199760 and WO-2020/017963.

Taking into account the limited space available in the mouth, the movement caused by the pressure chamber should be transferred efficiently into a to-and-fro movement of the treating elements comprised by the flexible wall, so that in the ideal situation only the treating elements move with respect to the dental positions to be treated. This means that whilst the flexible wall comprising the treating elements is deformable when increasing and decreasing the pressure in the pressure chamber, the rest of the mouthpiece is to be prevented from deforming when increasing and decreasing the pressure in the pressure chamber. The pressure chamber thus is arranged between a frame and wall, which wall is flexible relative to the frame.

Concerning the pressure used, it is known that when brushing teeth the pressure exerted on the teeth is to be kept below a certain maximum brushing pressure because otherwise the gum may become damaged. For this reason, regular electric toothbrushes, which belong to the group of 'dental treating devices with a treating head', frequently have a warning system warning the user when the maximum pressure is exceeded during brushing. In relation to dental cleaning devices with mouthpieces, it is known from Chapter 2 of WO-2020/017963 that the maximum pressure in the pressure chamber may be as low as +0.5 bar (relative to the ambient pressure) or lower. The flexibility of the flexible wall relative to frame thus may be in relation to relatively small pressures.

When manufacturing mouthpieces of the type, in which:
  the mouthpiece comprises a frame defining a trough, a flexible wall inside the trough, and a pressure chamber between the frame and flexible wall,
  the flexible wall—which is flexible relative to the frame—comprises the treating elements configured for acting onto the dental positions for treatment of the dental positions, and
  the mouthpiece is configured to subject the flexible wall to a to-and-fro movement relative to the frame by increasing and decreasing a pressure in the pressure chamber, especially the manufacturing of the trough is in practice quite a challenge due to the limited space available for the mouthpiece as a whole. The trough has to encompass: in case i) of a J-shaped mouthpiece with single trough at least about the right or left half of the upper or lower dental arch, in case ii) of a J-shaped mouthpiece with double trough at least about the right or left half of the upper and lower dental arch, in case iii) of a U-shaped mouthpiece with single trough about the upper or lower dental arch, and in case iv) of a U-shaped mouthpiece with double trough about the upper and lower dental arch. As the mouthpiece is to be inserted into the mouth, the more volume it will have when more teeth are to be treated at the same time. Although, the challenge due to the limited space available will be most tangible with U-shaped mouthpieces with double trough, the advantages of slim design will also apply to the other mouthpieces with a single or double trough for simultaneously treating a row of dental positions. A slim design is one thing, but manufacturing a mouthpiece with a trough containing treating elements in a slim design is quite difficult to achieve economically in large numbers. On the one hand the outer dimensions of the mouthpiece transverse to the dental arch have to be kept as small as possible, on the other hand teeth are transverse to the dental arch relatively small as well meaning that the space available in the trough for a pressure chamber, a flexible wall and the treating elements is also small if not quite limited.

It is therefore an object of the second invention, to provide an alternative method of manufacturing a mouthpiece with a trough system for simultaneously treating a plurality of dental positions by increasing and decreasing a pressure in one or more pressure chambers. A further object is providing such a method which overcomes one or more of the above disadvantages or challenges. Another further object is to provide such a method which may allow economic manufacturing in large(r) numbers, preferably with a low rejection rate.

Summary of the Second Invention

C46: One or more of the above objects are according to a first aspect of the second invention achieved by providing a method of manufacturing a mouthpiece with a trough system for simultaneously treating a plurality of dental positions by increasing and decreasing a pressure in one or more pressure chambers, wherein the method comprises:
  a frame part providing step, in which a plate-shaped frame part is provided, the plate shaped frame part being defined by an elongate member having, at two or more spaced trough areas, a set of side members projecting, in a plane defined by the plate shaped-frame part, transverse from the elongate member;
  a pressure chamber manufacturing step, which comprises, whilst the plate-shaped frame part is in a sheet condition:
    providing, on one face of the plate-shaped frame part at the trough areas, a flexible wall part, and
    attaching the flexible wall part, in the trough areas, along one or more attachment loops to the plate-shaped frame part to provide the trough areas with one or more pressure chambers bounded between each attachment loop, the frame part and wall part;
  a folding step, in which the plate-shaped frame part provided with the one or more pressure chambers is folded to a folded condition in which, at each trough area, the associated set of side members is folded around folding axes, which are about parallel to a length direction of the elongate member, to a trough section with the one or more pressure chambers on the hollow (or concave) side of the trough section and with the trough sections aligned to define a trough system. The folding to the folded condition may be from the sheet condition, but it may also be from a bended condition obtained in the bending step as discussed further below.

The method according to the invention starts with a plate shaped frame part. A plate shaped frame part is according to 'this document' a part made from of a thin layer, thin being in relation to the dimensions of the part in the plane of the layer. In the embodiments of the invention thin may for example be in the range of up to about 5 mm, such as between 0.5 and 2.5 or between 1 and 2 mm. When in the sheet condition this plate shaped frame part is—due to its plate shape—an essentially flat, 2-dimensional part of in general a plastic, which is like a paper or metal sheet essentially flat on at least its side, called said one face, onto which the flexible wall part is to be provided. It is however to be noted, that this plate shaped frame part may have ribs and/or grooves, and/or may have a surface profile, and/or may be profiled, and/or may even have integral protrusions transverse to the face of the plate. For example: the handle coupling for attaching a handle to allow the user to manipulate the mouthpiece may be present as a protrusion as can be seen in the drawings discussed further below. Similar, if not yet integrated in the handle coupling an inlet and/or outlet tube (part) for pressurized medium to increase and decrease pressure in the one or more pressure chamber may be present as a protrusion, and/or in inlet tube (part) for supplying cleaning fluid to the trough may be present as a protrusion. Such protrusions may according to a further embodiment of the second invention be present on the face (/side) of the plate shaped frame part, which faces away from said one side of the plate shaped frame part onto which the flexible wall part is to be provided. As an example of a profile, the transition between the elongate member and a side member may be profiled, for example such a transition may have some stepped off-set resulting in a kind of Z-shaped cross-section when viewed in length direction of the elongate member. As an example of grooves, the plate shaped frame part may comprise grooves, which ones a pressure chamber has been formed serve as channels for supply and/or discharge of pressure medium to the pressure chambers.

The plate shaped frame part is basically composed of an elongate member having a length direction which pre-defines the length direction of the trough system and sets of side members projecting, in the plane of the plate-shaped frame part, transverse from the elongate member. Each set of side members is provided at a location, called trough area, where a trough section is to be formed. The trough areas are spaced with respect to each other so that adjacent trough sections obtained are spaced. A single set of side members may consist of one single flap extending from one side of the elongate member or may consist of two flaps, one flap extending from one side of the elongate member and the other flap extending from the opposing other side of the elongate member.

The pressure chambers are manufactured, whilst the plate shaped frame part is in the sheet condition, by providing a flexible wall part on one face of the plate-shaped frame part. Although a flexible wall part may be provided all over this one face, it is provided at least in the trough areas. While the plate shaped frame part still is in the sheet condition, the flexible wall part is, in the trough areas, attached to the frame part along one or more attachment loops, resulting in a pressure chamber being bounded by the attachment loop, the parts of the frame part and wall part surrounded by the attachment loop. The providing of the flexible wall part and attaching it to the frame part may take place simultaneously for example by means of over-moulding, as is for example the topic of the first invention. It is also conceivable to attach a pre-fabricated wall part to a pre-fabricated frame part by a welding or glue technique. Establishing the pressure chambers whilst the plate-shaped frame part is in the sheet condition—which is an essentially flat condition—allows full access to the trough areas. In case the trough areas would already contain the trough sections, this access would be hindered due to the small width of these troughs. Basically the plate shaped frame part facilitates, due to the plate shape, folding in the folding step (and optionally bending according to a further step not yet discussed) on the one hand, and provides in the sheet condition an about flat surface for unhindered access for manufacturing the pressure chamber, on the other hand.

Concerning the flexible wall part is noted that—as can also be seen in the drawings to be discussed further below—the flexible wall part may either be flat or profiled to provide expansion zones configured for directing the expansion of the pressure chambers to certain parts of the dental arch like the interdental areas. Alternatively or additionally the profile may form zones to attach the roots of the tufts. A profiled flexible wall may be created before, during or after the pressure chamber manufacturing step. In case of a pre-fabricated wall part the profile may for example be obtained by injection moulding a profiled wall part. Also thermoforming may be used to deform a wall part into a profiled wall part with the desired profile. Thermoforming may be used before the pressure chamber manufacturing step to provide a pre-fabricated profiled wall part, which is to attached to the frame part, or by thermoforming a pre-fabricated part into the desired profiled wall part. Thermoforming for profiling the wall part may however also be used during or after the pressure chamber manufacturing step.

In a next step, the folding step, the plate-shaped frame part—which may optionally be initially in the sheet (/essentially flat) condition in the sheet—is, together with the attached flexible wall part and resulting pressure chambers, transformed into a 3-dimensional configuration by folding each set of side members such that a trough section is created at each trough area. The pressure chamber(s) at each trough area will be on the hollow (/concave) side of the trough section and the trough sections will be mutually aligned to define the trough system formed by the mutually aligned trough sections. It is conceivable, but not required, that the plate shaped frame part is provided with pre-defined weakened lines where the plate shaped frame part (more) easily folds. The folding step may for example make use of a folding tool providing an edge around which the fold is made.

Concerning the frame part providing step it is noted that the frame part may be provided as a pre-fabricated frame part. It is however also conceivable that the flexible wall part is a pre-fabricated part placed as an insert in an injection mould and that subsequently the frame part is made in an over-moulding process by injecting a frame material into the injection mould. Further, it is also conceivable that the frame part and flexible wall part both are a pre-fabricated part, both placed as an insert into an in injection mould and that both parts are attached to each other along one or more attachment loops by injecting an additional material into the mould which establishes the attachment.

C47: According to another further embodiment of the first aspect of the second invention, the plate shaped frame part provided in the frame part providing step may have two, three, four or five or even more trough areas where a set of side members is provided. A J-shaped mouthpiece is for example possible with two or three trough sections, but also more through sections is possible. A U-shaped mouthpiece is for example possible with three, four or five through sections, but also in this case more through sections are conceivable.

C48: As already follows from what has been said above in relation to the 'frame part providing step' and in relation to the first invention, the pressure chamber manufacturing step may, according to another further embodiment of the first aspect of the second invention, comprises the method according to the first aspect of the first invention (method of manufacturing a pressure chamber). This may result in a very slim design, for example with the frame part and wall part arranged in a layered manner along each other to obtain a layered structure with a frame part layer and a wall part layer.

C49: In order to obtain a J-shaped or U-shaped trough system, the method may, according to another further embodiment of the first aspect of the second invention —also called the 'bending embodiment'—, further comprises: a bending step, in which the elongate member is bended, around bending axes, which extend transverse to the length direction of the elongate member, to the J-shaped or U-shaped configuration. This bending may for example start from, viewed with respect to the length direction, a straight condition of the elongate member.

Concerning the term 'bending axis' in relation to the term 'folding axis', the term 'bending step' in relation to the term 'folding step', and, more in general, the term 'bending' in relation to 'folding', it is noted in these terms the words 'bending' and 'folding' only intend to differentiate between the function (forming the J-/U-shape of the trough system for 'bending' versus forming of the trough sections for 'folding'). Instead of using different words the same differentiation is obtained by substituting each 'folding' by 'first folding' and each 'bending' by 'second folding' or the other way around by substituting each 'bending' by 'second bending' and each 'folding' by 'first bending'. Further, also in relation to the bending it is noted that it is conceivable, but not required, that the plate shaped frame part is provided with pre-defined weakened lines where the plate shaped frame part (more) easily bends. The bending step may for example make use of a folding tool providing an edge around which the bend is made.

C50: According to another further embodiment of the 'bending embodiment', the bending step may, according to the first aspect of the second invention, take place before the folding step, simultaneously with the folding step, or after the folding step.

C51-54: According to another further embodiment of the 'bending embodiment', each set of side members of the plate shaped part provided in the frame part providing step comprises a single flap attached to a side of the elongate member which is about parallel to the length direction of the elongate member, wherein, in the folding step:
  a first said folding axis is provided at and along the border between the elongate member and each said single flap, and
  a further said folding axis is provided in each said single flap, which further folding axis is arranged at a distance from the first folding axis and extends in the same direction as the first folding axis.

According to a further embodiment of this embodiment, the single flaps (or equivalently all the first folding axes) are provided on the same side of the elongate member, for example such that the trough sections of the mouthpiece obtained are arranged at a lingual side (i.e. the concave or hollow side) of the elongate member. This results in a side wall of the obtained mouthpiece, the lingual or the facial one, having an essentially uninterrupted surface, which prevents tissue from inside the mouth of the user from getting stuck in the mouthpiece, which is at the facial side a larger problem than at the lingual side. In this embodiment, the plate shaped frame part is, in its sheet condition, an essentially straight member (the elongate member) with flaps on one or both sides of the straight/elongate member. It is however according to an alternative further embodiment also envisaged that the plate shaped part, in its sheet condition, presents one or more zig-zags, resulting in that, in the mouthpiece as manufactured an intermediate trough section having at both sides an adjacent trough section connected to the intermediate trough section by a respective link, which links are, viewed in the length direction, not aligned. For example, the link with the first adjacent trough section is provided at the facial side of the trough sections, whilst the link with the second adjacent trough section is provided at the lingual side. As will be elucidated in the third invention, this may assist in preventing the mouthpiece from torsion around its curved length axis.

C55: According to another further embodiment of the 'bending embodiment', a mouthpiece flexible with respect to its curved length direction may be obtained when the bends provided in the bending step comprise living hinges configured for providing a permanent flexible hinge allowing adapting the curvature of the J-shaped or U-shaped configuration to the shape of the dental arch of a user and/or allowing the J-shaped or U-shaped configuration to conform to the dental arch of a user when moving to-and-fro along the dental arch of the user.

C56: As an alternative for the 'bending embodiment', a J-shaped or U-shaped trough system, may, according to another further embodiment of the first aspect of the second invention—further called the 'J-/U-shaped plate part' embodiment—be obtained by providing in the frame part providing step a plate-shaped part having a J-shaped or U-shaped length direction, a first longitudinal side, and a second longitudinal side; wherein each set of side members of the plate shaped frame part provided in the frame part providing step comprises:
  a first side flap attached to the first longitudinal side, and
  a second side flap attached to the second longitudinal side;
and wherein, in the folding step:
  a first said folding axis is provided at and along the border between the elongate member and each said first side flap, and
  a second said folding axis is provided at and along the border between the elongate member and each said second side flap.

C57: According to another further embodiment of the 'J-/U-shaped plate part' embodiment, flexibility of the manufactured mouthpiece with respect to its curved length direction may according to the first aspect of the second invention be obtained when the first longitudinal side of the elongate member of the plate-shaped part provided in the frame part providing step is provided with first cut outs, when the second longitudinal side of the elongate member of the plate-shaped part provided in the frame part providing step is provided with second cut outs opposite the first cut outs, and when the first cut outs and second cut outs are configured to provide living hinges between each pair of first cut out and opposing second cut out to provide permanent flexible hinges allowing adapting the curvature of the J-shaped or U-shaped length direction to the shape of the dental arch of a user.

C58: In order to obtain mouthpiece for brushing simultaneously at least part of the upper dental arch and lower dental arch, the frame part providing step may, according to another further embodiment of the first aspect of the second invention, provide two said plate-shaped frame parts, wherein the said plate-shaped frame parts are, after being subjected to:

the pressure chamber manufacturing step,
the folding step, and
optionally the bending step
attached to each other.

This connection may be an attachment mounting the trough sections rigidly to each other. But As will be elucidated in relation to the third invention, this connection may also be a flexible attachment allowing trough section to move with respect to each other, like shifting with respect to each other in a direction transverse to the curved length direction of the mouthpiece.

C59: According to another further embodiment of the first aspect of the second invention, the flexible wall part may be provided or may have been provided with bristles projecting from the flexible wall in a direction away from the frame part so that in the manufactured mouthpiece the bristles project into the trough.

C60: According to another further embodiment of the first aspect of the second (as well as the first and third) invention the plate shaped part and/or the wall part comprise a plastic or are made of a plastic.

C64: According to a second aspect, the second invention provides a mouthpiece obtained or manufactured with the method according to the first aspect of the first invention.

C65: According to a third aspect, the second invention provides system comprising a mouthpiece according to the second aspect of the second invention claim 18 and a drive configured for alternatingly pressurizing and depressurizing the pressure chamber (/s) to move the treating elements, such as bristles, to-and-fro.

Introduction of Third Invention

The third invention relates to a U-shaped mouthpiece for simultaneously treating a plurality of dental positions, such as the teeth and/or gum at these dental positions. The treating may be by brushing.

Background of the Third Invention

Such mouthpieces are known, see for example applicant's WO-2018/199760 and WO-2020/017963 which show toothbrush devices with U-shaped mouthpieces. These types of toothbrushes have a U-shaped mouthpiece with an upper trough and a lower trough for receiving the upper dental arch respectively the lower dental arch. Inside the upper and lower trough bristles are provided which are put into motion with respect to the mouthpiece body by a drive system for brushing simultaneously all teeth of the user. In applicant's WO-2018/199760 and WO-2020/017963 the drive system comprises pressure chambers which are alternatingly pressurized and depressurized by a pressure device, such as a pump, which is arranged outside the mouthpiece in the handle of the toothbrush device. Also other toothbrush devices with U-shaped mouthpieces are known with for example other drive systems for putting into motion the bristles.

These kind of toothbrush devices with U-shaped mouthpieces have in common that, despite all efforts for minimizing the size of the U-shaped mouthpiece, the mouthpiece still remains a relatively large object to be put in the mouth. Especially in the back of the mouth, in the region of the wisdom teeth, this may result to discomfort. When a large object is inserted far into the mouth a gag reflex may result, for example when a dentist inserts a so called spoon for making a dental impression.

Most people are sensitive in the back of their mouth, so the mouthpiece should fit very precisely to not cause a gag reflex. This is in conflict with creating a mass market consumer product where a 'one size fits all' or a 'few sizes fit all' is important for a low cost price, consumer adaptation and ease of use. If the mouthpiece is too long, the gag reflex is triggered, if the mouthpiece is too short not all the teeth are being brushed completely.

Referring to US-2012/255137 (Chang) and WO-2019/198911 (Ziagle) also small slide brushes are known having a single curved mouthpiece body with the length of about 3-4 teeth, with one upper trough—one upper tooth receiving section—for receiving teeth of the upper arch and one lower trough—one lower tooth receiving section—for receiving teeth of the lower arch. This single body is mounted on a handle and for brushing the handle is used to move the mouthpiece body to and fro a short distance along the dental arch at one location. When at that one location the teeth have been brushed the mouthpiece is moved to another location where it is moved to and fro over a small distance to clean the teeth at that location. These toothbrush devices require good brushing skills like with regular toothbrushes, require care to be sure that all teeth are brushed and like regular toothbrushes require quite a lot of brushing time.

WO-2018/198116 (Dentver) shows a toothbrush with a U-shaped mouthpiece having three teeth receiving sections for brushing the upper arch and subsequently (but not simultaneously) the lower dental arch. Each teeth receiving section has several bristle support elements arranged on a spine part and flap parts extending from opposing sides of the spine part. The bristle support elements are due to this construction quite spaced from each other, resulting in poor bristle coverage and consequently poor brushing action. The mouthpiece has a central teeth receiving section for the front teeth of the dental arch, a right teeth receiving section for receiving teeth on the right side of the dental arch, and a left teeth receiving section for receiving teeth on the left of the dental arch. The teeth receiving sections are joined to each other by flexible links and in addition the teeth receiving sections are subdivided into sub-sections with a flexible link between adjacent sub-sections as well. The handle has two arms arranged in a V. At the point of the V, the arms are mounted to the handgrip part of the handle, and, at the free ends of the V, the right arm is attached to the most posterior end of the right teeth receiving section and the left arm is attached to the most posterior end of left teeth receiving section, remote end of the right/left teeth receiving section being the end remote from the central section. The mouthpiece of WO-2018/198116 is moved to-and-fro along the dental arch. The to-and-fro movement of the bristles is according to WO-2018/198116 achieved by an electric drive alternatingly extending the right arm while withdrawing the left arm followed by extending the left arm and withdrawing the right arm, etcetera. In this manner, the teeth receiving sections are pulled by the, at that moment, extending arm of the V. In use, the V-shaped arms extend though the corners of the mouth (i.e. where the upper lip and lower lip transfer from the one in the other) touching the lips in this corner, are vibrated for the two-and-fro movement along the dental arch and are also—at higher frequency-vibrated for additionally activating the bristle elements, resulting in an unpleasant feeling for the user due to transfer of the arm vibrations to the facial tissue of the user. Further, the motorized movement of the toothbrush of WO-2018/198116 along the dental arch does not solve the precise fit issues to not cause a gag reflex and/or not brush all teeth, and is not under control of the user which contributes in causing gag reflexes.

US 2010/0062397 (Ryca) shows a J-shaped toothbrush with i) an upper dental arch part for cleaning the teeth of one side (right or left) of the upper dental arch, which upper dental arch part extends, in use, from the central incisor up to (and including) the wisdom tooth, with ii) an lower dental arch part for cleaning the teeth of one side (right or left) of the lower dental arch, which lower dental arch part extends, in use, from the central incisor up to (and including) the wisdom tooth, with iii) an inflatable bladder disposed between the upper and lower dental arch part, with iv) a handle for the user, and with v) a handle attachment attaching the handle to the inflatable bladder. This J-shaped toothbrush is for encompassing all teeth on the left or right side of the dental arch together so that all teeth are brushed together. Therefor this toothbrush extends to deep into the mouth of the user and triggers gag reflexes. Although this toothbrush can be made flexible, for example by means of so called flex gaps, to adjust or conform to the shape of a user's mouth, this toothbrush is not suitable for displacement along the dental arch and cannot be displaced along the dental arch. This because the handle is attached to the inflatable the bladder which lies in between the upper and lower part of the mouthpiece and which is quite flexible—it requires for example bite restrictors—and thus cannot transfer forces to the upper dental arch part and lower dental arch part to move the mouthpiece along the dental arch. Further, similar as in WO-2018/198116 the bristle coverage is relatively poor.

US 2011/185525 (Philips) shows a U-shaped mouthpiece body large enough—see paragraph [0013]—to accommodate all the teeth in the upper and lower jaws. This mouthpiece body has at the anterior end of the mouthpiece body a small handle element allowing the mouthpiece to be gripped between two fingers for insertion and removal of the mouthpiece body into and from the mouth. This mouthpiece body is provided with hinges permitting—see paragraph [0015]—the side sections of the mouthpiece body—i.e. the legs of the U-shape—to move somewhat laterally relative to the front section of the mouthpiece body—i.e. the bend of the U-shape—in order to accommodate a variety of dental arch configurations. Because this mouthpiece is sized to accommodate all teeth of the upper and lower jaw at once, is no intended to be moved along the dental arch of a user and also cannot be moved along the dental arch because at the anterior ends of the dental arch of the user there is simply no space left for such movement. Further the small handle element to be gripped between two fingers would also be unsuitable for transferring the force required for such movement. This will the more be the case, because this small handle element will in use become slippery due to water and toothpaste.

The present third invention has as its object to provide an alternative U-shaped mouthpiece for simultaneously brushing a plurality of dental positions, such as the teeth and/or gum at those positions. A further object of the third invention is providing a U-shaped mouthpiece overcoming one or more of the above addressed problems. Another further object of the third invention is providing a U-shaped mouthpiece which is comfortable in use.

Summary of the Third Invention

C66: One or more of these objects are according to a first aspect of the third invention achieved by providing a J-shaped or U-shaped mouthpiece for simultaneously treating a plurality of dental positions, such as simultaneously brushing a plurality of dental positions, when riding the mouthpiece to-and-fro along the dental arch of a user between a neutral position and a shifted position,
  wherein, defined in the neutral position, the mouthpiece has an anterior end located at the (location of the) central incisors of the dental arch of a user and a posterior end located at the (location of the) posterior teeth of the dental arch of a user; wherein the mouthpiece comprises:
    a set of a multiple of trough sections comprising treating elements, such as brushing elements, which set of trough sections:
      is arranged along a J-shaped respectively U-shaped curved length direction of the mouthpiece, and
      is configured for simultaneously receiving and treating, such as brushing, a plurality of both anterior and posterior dental positions of an upper or lower dental arch of a user;
    flexible links joining the trough sections of the set to a train of trough sections and configured to:
      allow the mouthpiece to ride to-and-fro along the dental arch between the neutral position and shifted position, and
      to conform the mouthpiece to the dental arch when riding to and fro along the dental arch between the neutral and shifted position;
  and
    a handle coupling attached to the mouthpiece, for example to at least one of the trough sections, and configured for attaching a handle to ride the train of trough sections to-and-fro along the dental arch by applying a riding force onto the handle;
  wherein the handle coupling is provided at the anterior end of the mouthpiece and configured to transfer the riding force, applied onto the handle coupling, to the train of trough sections such that all trough sections, viewed in the riding direction, in front of the handle coupling are advanced by pushing action of the handle coupling, while all trough sections, viewed in the riding direction, behind the handle coupling are advanced by pulling action of the handle coupling.

The trough sections are sections receiving or encompassing one or more teeth. A trough section may also be called a teeth receiving section, not only in relation to the third invention but also in relation to the second and first invention.

Like is usual in dentistry, in this document the term anterior teeth refers as a group to the central incisors, lateral incisors, and canine teeth as distinguished from the posterior teeth, which are the first and second premolars, the first and second molars, and wisdom teeth. Correspondingly, the anterior zone of the dental arch is the zone of the dental arch containing the dental positions of the anterior teeth, and the posterior zone of the dental arch is the zone of the dental arch containing the posterior teeth.

An anterior part of the mouthpiece according to the third invention is defined as that part of the mouthpiece which:

in the neutral position, extends within the range of the anterior teeth and may overlap all anterior teeth of a dental arch of the user, and in the shifted position, overlaps with at least part of the posterior teeth A posterior part of the mouthpiece according to the third invention is defined as that part which, in the neutral position, overlaps with only posterior teeth. As according to the third invention the mouthpiece is moveable along the dental arch between the neutral position and a shifted position, the posterior part of the mouthpiece according to the third invention does, in the neutral position, not necessarily overlap all posterior teeth. Further it is noted that the posterior and anterior part of the mouthpiece are defined with respect to the mouthpiece and not with respect to the trough sections. In this respect, it is for example conceivable that:

the mouthpiece has one single trough section which is entirely within the anterior part of the mouthpiece and thus, in the neutral position, overlaps with only anterior teeth (but not necessarily all anterior teeth), whilst, in the shifted position, it may overlap with both anterior and posterior teeth or may (still) only overlap with only anterior teeth.

The mouthpiece has a trough section which extends in the anterior part as well as the posterior part of the mouthpiece and thus, in neutral position, overlaps with both anterior and posterior teeth, whilst in the shifted position it may—depending on the direction of the shift—only overlap with posterior teeth or anterior teeth.

In case of a J-shaped mouthpiece, the mouthpiece will have one posterior end because, in neutral position, it extends essentially in one half of the dental arch. In case of a U-shaped mouthpiece, the mouthpiece will have two posterior ends because, in neutral position, it extends essentially in two halves of the dental arch. In both cases the handle coupling is, with the mouthpiece in neutral position, provided at the anterior end of the mouthpiece. Thus when in use and in the neutral position, the handle coupling will lie on the centre axis of the dental arch of the user at the front side of the dental arch, or in other words the handle coupling will so to say lie at and in the middle of the lips of the user. In case of a U-shaped mouthpiece, this boils down to the handle coupling being provided in the middle of the bend section of the U-shape.

The trough sections are according to the third invention so to say arranged in a master-slave-configuration, in which one master—the only handle connection—controls all the slaves—the trough sections. Basically, the mouthpiece according to the third invention has so to say one single handle coupling where the handle can be attached to the mouthpiece. Arranging the handle coupling only at anterior end of the mouthpiece—or in other words at the centre of the bend of the U-shaped dental arch, i.e. at the central incisor (s)—so that it engages on—directly acts on—trough section (s) closest to the central incisors—which trough section (/s) is (/are) named central trough section (/s)—and so that forces transferred from the handle (via the handle connection) to the mouthpiece act on the central trough section and not on the other trough sections results in:

that the normal passage as defined by the lips of the user can be used to ride the mouthpiece to and fro along the dental arch, without uncomfortably tensioning or stretching these lips in for example the corners.

that the handle and handle connection will during use not or nearly come in the posterior zone of the dental arch;

that the riding of the mouthpiece to-and-fro along the dental arch is without applying any riding force with the handle (connection) directly onto posterior trough sections, which in neutral position are in the posterior zone of the dental arch. The riding force applied to trough sections in the posterior zone of the dental arch is indirect via the central trough section (thus trough sections in the anterior zone of the dental arch) and the links between the central trough section(s) and other trough sections. Applying direct riding force onto trough sections in the posterior zone of the dental arch—which is not the case according to the third invention—would easily cause discomfort. In case of diseased or inflamed gum at the molars this may result in pain. Further the treating or brushing pressure may become too high.

that—viewed with respect to mouthpiece as shown in for example WO-2018/199760 and WO-2020/017963—the legs of the U-shaped mouthpiece can be shortened a little without wisdom teeth and second molars being reached insufficiently for good brushing.

According to a further embodiment of the first aspect of the third invention, the trough sections each have a receiving trough configured to encompass at least one or two teeth. Although in a mouthpiece according to the third invention, the brushing may be accomplished with any brushing element provided on a trough section and configured for brushing teeth—like a projecting rib or a projecting flap—, the trough sections may according to a further embodiment of this further embodiment comprise bristles projecting into the trough for brushing the teeth.

C67: According to another further embodiment of the first aspect of the third invention, the flexible links are configured to provide a monorail-train of trough sections moveable to-and-fro along a monorail formed by the dental arch. Speaking in this monorail-train language the driven locomotive is in case of a U-shaped mouthpiece so to say arranged in the middle of the train, whilst the non-motorized wagons are arranged on the right and left of the driven locomotive.

C68: According to another further embodiment of the first aspect of the third invention, the mouthpiece is made of one or more plastic materials.

C69-71: Applicant found on the one hand that for high comfort and good brushing action it is of importance that the U-shaped mouthpiece with tooth receiving sections joined by flexible links should not be too flexible with respect to the curved length direction.

Applicant found that, in case the mouthpiece with tooth receiving sections joined by flexible links is too flexible, the tooth receiving sections may get misaligned with respect to the dental arch when being pushed in a master-slave configuration. Misalignment causes the trough sections to buckle with respect to each other around a vertical axis. This buckling cause edges of tooth receiving sections to be pressed against the gum or teeth. This may result in discomfort, in harming the gums and teeth, and it may decrease the effectiveness of the brushing action in removing plaque. It may also result in malfunctioning due to the edge of a trough section getting stuck in the gap between two teeth. In other words, although the mouthpiece must be flexible it should also be not too flexible (or in other words it should be sufficiently stiff) to prevent:

misalignment of trough sections with respect to the dental arch, and/or buckling of trough sections with respect to each other and/or with respect to the dental arch, and/or too high or too low brushing pressure that makes the toothbrush less or not effective.

In a U-shaped mouthpiece with trough sections (arranged like a train and) joined by flexible links, the flexibility of the mouthpiece is determined by the construction of the mouthpiece as a whole, in which the flexibility of the flexible links plays a role of relevance.

C69: In general terms the requirement of being flexible but not too flexible, results in another further embodiment of the first aspect of the third invention which may be worded as: A mouthpiece according to first aspect of the third invention, wherein the mouthpiece and/or flexible links are configured with regard to their flexibility stiff enough to prevent the trough sections, when being pushed by the handle the handle coupling [or central trough section (/s)] in a master-slave-configuration along a dental arch, as can be simulated on a basic AG-3 dental model (with 32 teeth) from frasaco GmbH, from:
  buckling, around a vertical axis, with respect to the dental arch (and/or with respect to each other), or
  misalignment with respect to the dental arch (and/or with respect to each other).

C70: According to a another further embodiment of the first aspect of the third invention—called the limited torsion embodiment—, the trough sections have a lingual side wall and a facial side wall, and the flexible links between adjacent trough sections are configured such that, when the posterior end of the mouthpiece is moved from the neutral position 1 cm towards the centre axis of the dental arch whilst the anterior end of the mouthpiece is kept in place, the change of the angle of the lingual and facial side walls with respect to the vertical is, in the region of the second pre-molars to the first molars of the AG-3 model from frasaco GmbH, at most 15°, such as at most 10° or at most 5°. Applicant found that when mouthpieces, which are too flexible—such as silicon made mouthpieces—, are subjected to forces along the dental arch, these mouthpieces show a strong tendency for torsion around the curved length axis of the mouthpiece, which results in increased pressure on the gums on one side and decreased pressure on the gums on the opposing side, which in turn may cause discomfort and harm to the gums. These effects may be counteracted by making the lingual and/or facial side walls of the trough sections sufficiently flexible, which however decreases the brushing action. Applicant found that these effects can also be counteracted by providing the flexible links with, viewed with respect to the curved length axis of the mouthpiece, a torsion flexibility. This can for example be achieved by providing the flexible links on only one side of the teeth (the lingual side, the facial side or the occlusal side) and keeping, viewed transverse to the respective link and the curved length axis, the mouthpiece open at the other of said sides of the teeth.

According to a further embodiment of the limited torsion embodiment, one or more of the flexible links may be at least 8 mm or at least 10 mm, such as in the range of 10-18 mm or 10-15 mm. In a still further embodiment these links of at least 8 mm are arranged i) at the facial side of the mouthpiece to connect facial walls of adjacent troughs, and ii)—optionally in addition—at a location which extends at least partly in the anterior part of the mouthpiece, so that, in neutral position of the mouthpiece, the at least 8 mm links extend along anterior teeth. This anterior part of the mouthpiece is the part where the curvature radius of the mouthpiece is the most curved (=radius of curvature being smaller than elsewhere). In a still further embodiment of the at least 8 mm links at the facial side of the mouthpiece, a gap is provided between the occlusal walls (i.e. the bottoms) of adjacent trough sections connected by the at least 8 m links at the facial side.

C71: Taking into account that misalignment or buckling of a train of trough sections when being pushed in a master-slave configuration will result in the slaves being displaced less than the master, the requirement of being flexible but not too flexible may according to another further embodiment of the first aspect of the third invention also be expressed in wording as: A mouthpiece according to the first aspect of the third invention, wherein the mouthpiece and/or flexible links are configured with regard to their flexibility stiff enough such that, when the handle coupling [or central trough section (/s)] is moved—as a master of a master-slave configuration—from the neutral position over a distance of X cm along the dental arch, the one or two posterior ends of the mouthpiece move—as slaves of the master slave configuration—, in the same direction as the handle coupling, over a distance of at least Y cm along the dental arch, Y being at least 70% of X, such as at least 80% of X or at least 90% of X, and wherein X is in the range of 1 to 2 cm, such as about 1 cm. This being measured on a basic AG-3 dental model (with 32 teeth) from frasaco GmbH, the upper and lower model halves being pressed together with a force of 5 N.

C73-74: According to a further embodiment of the first aspect of the third invention, having the mouthpiece and/or flexible links are configured with regard to their flexibility stiff enough, may also be worded as:
  Mouthpiece according to the first aspect of the third invention,
  wherein the mouthpiece is a U-shaped (full) mouthpiece comprising two said sets of a multiple of trough sections, a first set for the upper dental arch and a second set for the lower dental arch;
  wherein the mouthpiece has a resistance $F_{AW}$ against widening of a curve of the curved length direction, which resistance $F_{AW}$ is at least 0.6 N, such as at least 1.2 N (N meaning Newton),
  wherein the resistance $F_{AW}$ is defined as a force acting:
    parallel to the tangent of the curved length direction at the anterior end of the mouthpiece,
    at a point Q which is, viewed transverse to said tangent, at 30 mm from the anterior end of the mouthpiece, and
    in outward direction of the mouthpiece,
  in order to displace the point Q over 10 mm parallel to said tangent when the handle coupling is kept immovable.
and/or (i.e. in addition or alternatively) as:
  Mouthpiece according to the first aspect of the third invention,
  wherein the mouthpiece is a U-shaped (full) mouthpiece comprising two said sets of a multiple of trough sections, a first set for the upper dental arch and a second set for the lower dental arch;
  wherein the mouthpiece has a resistance $F_{AN}$ against narrowing of a curve of the curved length direction, which resistance $F_{AN}$ is at least 2 N, such as at least 2.4 N (N meaning Newton),
  wherein the resistance $F_{AN}$ is defined as a force acting:
    parallel to the tangent of the curved length direction at the anterior end of the mouthpiece,
    at a point P which is, viewed transverse to said tangent, at 30 mm from the anterior end of the mouthpiece, and in inward direction of the mouthpiece, in order to displace the point P over 10 mm parallel to said tangent when the handle coupling is kept immovable.

In case of a U-shaped half mouthpiece (i.e. a mouthpiece with only one said set of multiple trough sections for encompassing only lower or upper teeth), the forces for $F_{AN}$ and $F_{AW}$ will be about 50% of the above (in this paragraph) mentioned $F_{AN}$ and $F_{AW}$ values (for example a $F_{AN}$ of 2.4 N in a U-shaped full mouthpiece becomes for a U-shaped half mouthpiece 1.2 N).

C75-77: Applicant found on the other hand—in contrast to being flexible but not too flexible (or in other words flexible but sufficiently stiff)—that for high comfort and good brushing action it is of importance that the J-shaped or U-shaped mouthpiece with tooth receiving sections joined by flexible links should not be too stiff (or sufficiently flexible) with respect to the curved length direction. When too stiff the ability of the mouthpiece to conform to the dental arch decreases, resulting in the brushing pressure locally increasing at places where the inner or outer wall of trough sections comes too close to the dental arch as well as—but being less a problem—decreasing at places where the inner or outer wall of trough sections comes too far away from the dental arch. Increase of brushing pressure may cause gum to degenerate and may be a cause of discomfort. Decrease of brushing pressure may case a decrease in brushing action.

In other words, although the mouthpiece must be flexible and sufficiently stiff, it should also be not too stiff (or in other words it should be sufficiently flexible) to ensure that the mouthpiece has a sufficient ability to conform to the dental arch when riding to-and-fro along the dental arch. Also in this respect the master-slave-configuration with always slaves which are pushed plays a role, because when always pulling trough sections by means of a handle directly acting on trough sections in the posterior zone of the dental arch, the undesired change in brushing action may be counteracted by manipulating the pulling action.

In a U-shaped mouthpiece with trough sections (arranged like a train and) joined by flexible links, the flexibility of the mouthpiece is determined by the construction of the mouthpiece as a whole, in which the flexibility of the flexible links plays a role of relevance.

C75-77: Taking into account that insufficient ability of the mouthpiece to conform to the dental arch when riding to-and-fro along the dental arch, will result in increase of brushing pressure at amongst others the molars, the requirement of being sufficiently flexible may according to other further embodiments of the first aspect of the third invention also be expressed in wording as:

Mouthpiece according to the first aspect of the third invention, wherein the mouthpiece and/or flexible links are configured such that, when the trough sections are in a shifted position 1 cm to the right or left of the neutral position, the brushing pressure exerted by the mouthpiece on the molars is, without any activation of the brushing elements, at most 3 Newton/cm$^2$, preferably at most 2 Newton/cm$^2$, such as at most 1 Newton/cm$^2$. [This being measured on a basic AG-3 dental model (with 32 teeth) from frasaco GmbH].

and/or (i.e. in addition or alternatively) as:

Mouthpiece according to the first aspect of the third invention, wherein the mouthpiece is a U-shaped (full) mouthpiece comprising two said sets of a multiple of trough sections, a first set for the upper dental arch and a second set for the lower dental arch;

wherein the mouthpiece has a resistance $F_{AW}$ against widening of a curve of the curved length direction, which resistance $F_{AW}$ is at most 3 N, such as at most 2.2 N (N meaning Newton), wherein the resistance $F_{AW}$ is defined as a force acting:

parallel to the tangent of the curved length direction at the anterior end of the mouthpiece, at a point Q which is, viewed transverse to said tangent, at 30 mm from the anterior end of the mouthpiece, and in outward direction of the mouthpiece, in order to displace the point Q over 10 mm parallel to said tangent when the handle coupling is kept immovable.

and/or (i.e. in addition or alternatively) as:

Mouthpiece according to the first aspect of the third invention, wherein the mouthpiece is a U-shaped (full) mouthpiece comprising two said sets of a multiple of trough sections, a first set for the upper dental arch and a second set for the lower dental arch;

wherein the mouthpiece has a resistance $F_{AN}$ against narrowing of a curve of the curved length direction, which resistance $F_{AN}$ is at most 4 N, such as at most 3.3 N (N meaning Newton), wherein the resistance $F_{AN}$ is defined as a force acting:

parallel to the tangent of the curved length direction at the anterior end of the mouthpiece, at a point Q which is, viewed transverse to said tangent, at 30 mm from the anterior end of the mouthpiece, and in inward direction of the mouthpiece, in order to displace the point Q over 10 mm parallel to said tangent when the handle coupling is kept immovable.

In case of a U-shaped half mouthpiece (i.e. a mouthpiece with only one said set of multiple trough sections for encompassing only lower or upper teeth), the forces for $F_{AN}$ and $F_{AW}$ will be about 50% of the above (in this paragraph) mentioned $F_{AN}$ and $F_{AW}$ values (for example a $F_{AN}$ of 3.3 N in a U-shaped full mouthpiece becomes for a U-shaped half mouthpiece 1.65 N).

According to other further embodiments of the first aspect of the third invention comprise:

Mouthpiece according to the first aspect of the third invention, wherein the mouthpiece is a U-shaped (full) mouthpiece comprising two said sets of a multiple of trough sections, a first set for the upper dental arch and a second set for the lower dental arch;

wherein the mouthpiece has a resistance $F_{AW}$ against widening of a curve of the curved length direction, which resistance $F_{AW}$ is in the range of 0.6 N to 2.2 N, such as in the range of 1.2 N to 3 N or in the range of 1.2 N to 2.2 N or in the range of 0.6 N to 3 N (N meaning Newton);

wherein the resistance $F_{AW}$ is defined as a force acting:

parallel to the tangent of the curved length direction at the anterior end of the mouthpiece, at a point Q which is, viewed transverse to said tangent, at 30 mm from the anterior end of the mouthpiece, and in outward direction of the mouthpiece, in order to displace the point Q over 10 mm parallel to said tangent when the handle coupling is kept immovable.

and/or (i.e. in addition or alternatively) as:

Mouthpiece according to the first aspect of the third invention, wherein the mouthpiece is a U-shaped (full) mouthpiece comprising two said sets of a multiple of trough sections, a first set for the upper dental arch and a second set for the lower dental arch;

wherein the mouthpiece has a resistance $F_{AN}$ against narrowing of a curve of the curved length direction, which resistance $F_{AN}$ is in the range of 2 N to 4 N, such as in the range of 2.4 N to 4 N or in the range of 2.4 N to 3.3 N or in the range of 2 N to 3.3 N (meaning Newton), wherein the resistance $F_{AN}$ is defined as a force acting:
    parallel to the tangent of the curved length direction at the anterior end of the mouthpiece,
    at a point P which is, viewed transverse to said tangent, at 30 mm from the anterior end of the mouthpiece, and
    in inward direction of the mouthpiece,
  in order to displace the point P over 10 mm parallel to said tangent when the handle coupling is kept immovable.

In case of a U-shaped half mouthpiece (i.e. a mouthpiece with only one said set of multiple trough sections for encompassing only lower or upper teeth), the forces for $F_{AN}$ and $F_{AW}$ will be about 50% of the above (in this paragraph) mentioned $F_{AN}$ and $F_{AW}$ values (for example a $F_{AN}$ of 2.4 N in a U-shaped full mouthpiece becomes for a U-shaped half mouthpiece 1.2 N).

C72: According to another further embodiment of the first aspect of the third invention, the mouthpiece comprises two said sets of a multiple of trough sections, a first set for the upper dental arch and a second set for the lower dental arch, which is attached to the first set.

C78: According to another further embodiments of the first aspect of the third invention, the mouthpiece is a U-shaped (full) mouthpiece comprising two said sets of a multiple of trough sections, a first set for the upper dental arch and a second set for the lower dental arch, wherein, when the U-shaped mouthpiece is placed between the upper and lower model halves of a basic AG-3 dental model from frasaco GmbH with the model halves pressed together with a force of 5 N whilst the mouthpiece encompasses lower and upper teeth of the AG-3 model, the force:

applied on the handle coupling in a direction perpendicular to the centre axis of the dental arch of the AG-3 model, and
  required to move the mouthpiece from the neutral position 1 cm along the dental of the AG-3 model is at most 20 Newton, such as at most 17.5 Newton or at most 15 Newton. In case of a U-shaped half mouthpiece (i.e. a mouthpiece with only one said set of multiple trough sections for encompassing only lower or upper teeth), said forces will be in the range of 70-100% of the values of a U-shaped full mouthpiece full, i.e. at most 28-40 Newton, such as at most 24.5-35 Newton or at most 21-30 Newton. In case of a J-shaped full mouthpiece encompassing both lower and upper teeth, the same values may apply as for a U-shaped half mouthpiece.

C79-81: According to another further embodiments of the first aspect of the third invention, the length of the legs of the J-shaped or U-shaped mouthpiece may be reduced to increase the comfort whilst still being able to brush the full dental arch. In this respect it is to be noted that the gag reflex is reduced by having the mouthpiece only inserted deep into the mouth at one side of the mouth, by having this deep insertion only temporary, and by having this deep insertion at one side under full control of the user who manipulates the handle manually by him/herself. A first of these embodiments may be worded as a mouthpiece according to the third invention, wherein, viewed along the dental arch of a basic AG-3 dental model (with 32 teeth) from frasaco GmbH, the length of the mouthpiece is such that the second molar (/s) is (/are), in the neutral position, outside the mouthpiece whilst the first molars may in a further embodiment be inside the mouthpiece; and wherein the mouthpiece is configured to ride to-and-fro along the dental arch from the neutral position up to (and including) the position of a wisdom tooth. A second of these embodiments may be worded as a mouthpiece according to the third invention, wherein, viewed along the dental arch of a basic AG-3 dental model (with 32 teeth) from frasaco GmbH, the length of the mouthpiece is such that the first molar (/s) is (/are), in the neutral position, outside the mouthpiece whilst the second premolars may in a further embodiment be inside the mouthpiece, and wherein the mouthpiece is configured to ride to-and-fro along the dental arch from the neutral position up to (and including) the position of a wisdom tooth. A third of these embodiments may be worded as a mouthpiece according to the third invention, wherein, viewed along the dental arch of a basic AG-3 dental model (with 32 teeth) from frasaco GmbH, the length of the mouthpiece is such that the first molar (/s) is (/are), in the neutral position, outside the mouthpiece whilst the second premolars may in a further embodiment be inside the mouthpiece, and wherein the mouthpiece is configured to ride to-and-fro along the dental arch from the neutral position up to (and including) the position of a second molar. This third embodiment may in particular be useful for users having no wisdom teeth.

C82-83: According to a another further embodiment of the first aspect of the third invention, a said trough section—which may be one or more trough sections—, which in neutral position lies at least partly in the anterior part of a basic AG-3 dental model (with 32 teeth) from frasaco GmbH, has a receiving trough configured for encompassing at least one or at least two teeth and delimited by a facial wall part and a lingual wall part, and wherein, viewed in the curved length direction, the length of the lingual wall part is shorter than the length of the facial wall part. Having the length of the lingual wall part of a trough section in the anterior part of the mouthpiece shorter than the length of the facial wall part of this trough section, allows for a smoother riding of the trough sections along the front bow section of the dental arch, the front bow section of the dental arc being the section from the right up to the left first premolar. According to a further embodiment of this embodiment, the length of the lingual wall part is, viewed in the curved length direction, at most 75% of the length of the facial wall part. This prevents, viewed in the curved length direction, the ends of the lingual wall from getting stuck in the recesses between adjacent teeth.

C84: According to a further embodiment of the first aspect of the third invention with two said sets trough sections, the mouthpiece is configured to allow, when riding to-and-fro along the dental arch, the first set to undergo a first conformation to the upper arch and the second set to undergo a second conformation to the lower dental arch, in which the first conformation may be different from the second conformation. According to this embodiment, the first set and second set are allowed to flex mutually differently, although they will be displaced, viewed along the dental arch, over about the same distance. Allowing the first set and second set to bend differently, enables the mouthpiece, when riding to-and-fro along the dental arches, to adapt itself also in case the upper and lower dental arch have—as is usually the case—a different arch shape and/or are misaligned with respect to each other, in case one or more teeth in one of the dental arches or both the dental arches are misaligned, or in case of other irregularities in the upper dental arch or lower dental arch of a user.

C85-86: According to another further embodiment of the first aspect of the third invention, in which the first and second set are allowed to flex differently, at least one trough section of the first set is connected to a, viewed in vertical direction, adjacent one of the trough sections of the second set by a flexible connection configured to allow the sections connected by the flexible connection to move with respect to each other in a horizontal direction transverse to the dental arch. The flexible connection prevent the legs of the J-shape or U-shape of the first set from being separated from the adjacent leg of the J-shape or U-shape of the second set, whilst also allowing these legs freedom of movement to conform to irregularities in the upper and or lower dental arch. The flexible connection may for example be achieved by a pen-slit connection configured correspondingly. The pen may for example be a vertical pen attached to one of the vertically adjacent trough sections, whilst the slit is provided in the other of the vertically adjacent trough sections and extends in a horizontal direction essentially transverse to the dental arch. According to a further embodiment of this embodiment, the trough sections connected by said connection are, in the neutral position, arranged in the posterior part of the mouthpiece.

C87-89: According to another further embodiment of the first aspect of the third invention, in which the first and second set are allowed to flex differently, an attachment attaches the first set to the second set at the anterior end. This attachment may for example be established by the handle connection or by an additional attachment structure in between the first set and the second set. Having the first set and the second set attached to each other at the anterior end of the mouthpiece contributes in the handle connection acting as a common master for the slaves (trough sections). According to a further embodiment of this embodiment, the attachment may be a flexible attachment configured to allow the first and second set to rotate with respect to each other around a vertical axis at the anterior end, and/or the attachment may be configured to prevent the first and second set from translational movement with respect to each other at the place of attachment. Allowing the first set and second set to rotate with respect to each other introduces some ability to conform to irregularities in the front bow section of the dental arch. Preventing the first set and second set from translational movement with respect to each other ensures that the force exerted with the handle via the handle coupling to the trough sections causes the first set and second set to ride over about the same distance along the lower and upper dental arches.

C90: According to another further embodiment of the first aspect of the third invention, each said trough section has a receiving trough delimited along its length by a facial wall part at the facial (or convex) side of the curved length direction and by a lingual wall part at the lingual (or concave) side of the curved length direction, and bristles projecting from the facial wall part and lingual wall part into the trough.

C91: According to another further embodiment of the first aspect of the third invention, the facial wall part and the lingual wall part comprise—such as is also the case in applicant's WO-2018/199760 and WO-2020/017963—a pressure chamber configured to move the bristles of the facial and lingual wall part to-and-fro in the receiving trough by alternatingly pressurizing and depressurizing the pressure chamber.

C92: According to another further embodiment of the first aspect of the third invention, the pressure chamber of the facial wall part and/or the pressure chamber of the lingual wall part has been manufactured with the method according to the first aspect of the first invention. In this respect it is, on the level of a single trough section, noted that, according to one further embodiment, the pressure chamber of the facial wall part of this trough section and the pressure chamber of the lingual wall part of this trough section, may be one single pressure chamber or two pressure chambers acting as a single pressure chamber due to a fluid connection between the two. But, still on the level of a single trough section, it is also conceivable that the pressure chamber of a lingual wall part of this trough section is, although optionally connected via a manifold or supply/discharge channel, separated from the pressure chamber of the facial wall part of this trough section. On the level of all or some of the trough sections, it is to be noted that according to a further embodiment all or some of the pressure chambers of different receiving sections may be one single pressure chamber or a multiple of pressure chambers acting as a single pressure chamber due to a fluid connection between the pressure chambers. But, still on the level of all or some of the trough sections, it is also conceivable that the pressure chambers of different trough sections are, although optionally connected via a manifold or supply/discharge channel, separated from each other.

C93: According to another further embodiment of the first aspect of the third invention, the multiple of trough sections of a said set comprises at least two trough sections, such as three or four or five trough sections.

C94: According to another further embodiment of the first aspect of the third invention, the flexible links define at least one vertical rotational axis, such as two such axes, around which adjacent trough sections joined by a said respective link are rotatable with respect to each other. The flexible links thus may comprise or provide at least one hinge, such as two hinges. For example at the location where a flexible link is attached to a trough section, this may be by means of a hinge.

C95: According to another further embodiment of the first aspect of the third invention, essentially all the flexible links—but not necessarily each one of the flexible links—are provided at the facial side (or convex side) of the curved length axis, such as at the facial side (or convex side) of the trough sections. Doing so the facial side of the mouthpiece can be a face without recesses in which tissue inside the mouth of the user, especially lip or cheek tissue may get caught when such recesses get smaller due to the mouthpiece conforming to the dental arch when moving to and fro. Recesses at the inner side getting smaller is less a problem because the user may manipulate his tongue to keep it away from these recesses.

C96: Although preferably most of the flexible links may be provided at the facial (or convex) side of the mouthpiece, according to another further embodiment of the first aspect of the third invention, the flexible link on, viewed along the curved length direction, one end of a said trough section may be arranged at the facial (or convex) side of the curved length direction, whilst the flexible link on the end opposite this one end is arranged at the lingual (or concave) side of the curved length direction. Having a trough section with at one end a flexible link at the inner side of the mouthpiece and at the opposite end at the outer side of the mouthpiece contributes in preventing the tooth receiving sections from rotating around their length axis defined by the curved length direction.

C97: According to another further embodiment of the first aspect of the third invention, the side walls of the trough section (/s) at the posterior end of the mouthpiece are, at the posterior ends of the mouthpiece, configured flexible relative to the rest of the side walls of the trough sections to allow spreading of the ends of these sidewalls to conform to widening of the jawbone at the wisdom teeth. Deep in the mouth near the wisdom teeth, the base of the upper and lower jawbone from which the teeth project widens due to the bone and/or gum broadening there. This may cause discomfort or may prevent the mouthpiece from riding further along the dental arch. Configuring the side walls at ends of the mouthpiece facing away from the central section more flexible than the rest of the side walls of the mouthpiece enables to conform the mouthpiece easier to this widening, which reduces discomfort and enables the mouthpiece to ride to the end. For example, the posterior ends of the side walls of the mouthpiece may be made from a soft material or a resilient material easily bending away.

C98: According to another further embodiment of the first aspect of the invention, the mouthpiece is a U-shaped mouthpiece, wherein the handle connection is provided at the center of the curved part of the U-shape of the mouthpiece.

C99: According to another further embodiment of the first aspect of the third invention, the mouthpiece is a mouthpiece according to the third aspect of the first invention.

C100: According to another further embodiment of the first aspect of the third invention, the mouthpiece is a mouthpiece manufactured with the method according to the first aspect of the second invention.

C101: According to another further embodiment of the first aspect of the third invention, the mouthpiece is a mouthpiece according to the second aspect of the second invention.

C102-103: According to another further embodiment of the first aspect of the third invention, the trough sections each have a receiving trough configured to encompass at least one or at least two teeth. According to a further embodiment of this embodiment, the trough sections may have bristles projecting into the trough for brushing teeth.

C107: According to a second aspect of the third invention, the third invention relates to a system comprising:
- a mouthpiece according to the first aspect of the third invention, and
- a handle configured for detachable detachment to the handle coupling.

C108-109: According to a further embodiment of the second aspect of the third invention, the handle comprises a drive configured for driving the bristles in the troughs of the trough section to move to-and-fro. According to another further embodiment of this second aspect, this drive may comprise a pump and may be configured for alternatingly pressurizing and depressurizing the pressure chamber or pressure chambers.

BRIEF DESCRIPTION OF THE DRAWINGS

The invention will be explained further with reference to the drawings. In these drawings:

FIG. 1 shows schematically a dental arch.

FIG. 4 shows a cross-section IV of the mouthpiece of FIGS. 2 and 3.

FIG. 5 shows a cross-section V of the mouthpiece of FIGS. 2 and 3.

FIG. 7 shows a first embodiment of the method according to the first invention.

FIG. 8 shows a variant of a pressure chamber obtained with the method of FIG. 7.

FIG. 9 shows a second embodiment of the method according to the first invention.

FIG. 10 shows a third embodiment of the method according to the first invention.

FIG. 11 shows a third embodiment of the method according to the first invention.

FIG. 14 shows a fourth embodiment of the method according to the first invention.

FIG. 15 shows a fourth embodiment of the method according to the first invention.

FIG. 19 shows schematically an example of the method according to the first invention for manufacturing a mouthpiece. FIG. 19A representing a first step, FIG. 19B representing a second step, FIG. 19C showing the obtained mouthpiece in depressurized condition, and FIG. 19D showing the obtained mouthpiece in pressurized condition.

FIG. 20 shows schematically another example of the method according to the first invention for manufacturing a mouthpiece. FIG. 20A representing a first step, FIG. 20B representing a second step, and FIG. 20C showing the obtained mouthpiece in depressurized condition.

FIG. 21 shows schematically a further other example of the method according to the first invention for manufacturing a mouthpiece. FIG. 21A representing a first step, FIG. 21B representing a second step, and FIG. 21C showing the obtained mouthpiece in depressurized condition.

FIG. 22 shows in cross-section an example of a mouthpiece according to the first invention having the intermediate layer mechanically attached to the frame part.

FIG. 23 shows in cross-section a further example of a mouthpiece according to the first invention, with FIG. 23A showing the mouthpiece in depressurized condition and FIG. 23B showing the mouthpiece in pressurized condition.

FIG. 24 shows in cross-section a further example of a mouthpiece according to the first invention, with FIG. 24A showing the mouthpiece in depressurized condition and FIG. 24B showing the mouthpiece in pressurized condition.

FIG. 25 shows in cross-section a further example of a mouthpiece according to the first invention, with FIG. 25A showing the mouthpiece in depressurized condition and FIG. 25B showing the mouthpiece in pressurized condition.

FIG. 26 shows in cross-section a further example of a mouthpiece according to the first invention, with FIG. 26A showing the mouthpiece in depressurized condition and FIG. 26B showing the mouthpiece in pressurized condition.

FIG. 44 shows a visualization of a mouthpiece which is too flexible (FIG. 44A), of a mouthpiece which is too stiff (FIG. 44B), and of a mouthpiece according to the third invention (FIG. 44C).

FIG. 45 schematically shows a visualization of a mouthpiece according to the third invention, which allows the upper frame part to flex differently than the lower frame part, FIG. 45A showing the neutral position, and FIG. 45B showing a shifted position with different conformation of upper and lower mouthpiece part, FIG. 45C schematically shows a perspective view of a mouthpiece having the features of FIG. 47A and FIG. 47B.

FIG. 46 shows in top view and highly schematically a flexible attachment of the upper mouthpiece part to the lower mouthpiece part.

FIG. 49 schematically shows an experimental set up, FIG. 49A being the set up with a small mouthpiece, FIG. 49B being the set up with a medium mouthpiece, and FIG. 49C being the set up with a large mouthpiece.

FIG. 51 schematically shows as further illustration of a plate shaped frame part in sheet condition, which is more detailed than the one shown in FIG. 28.

DETAILED DESCRIPTION OF THE DRAWINGS

Figure 1B:
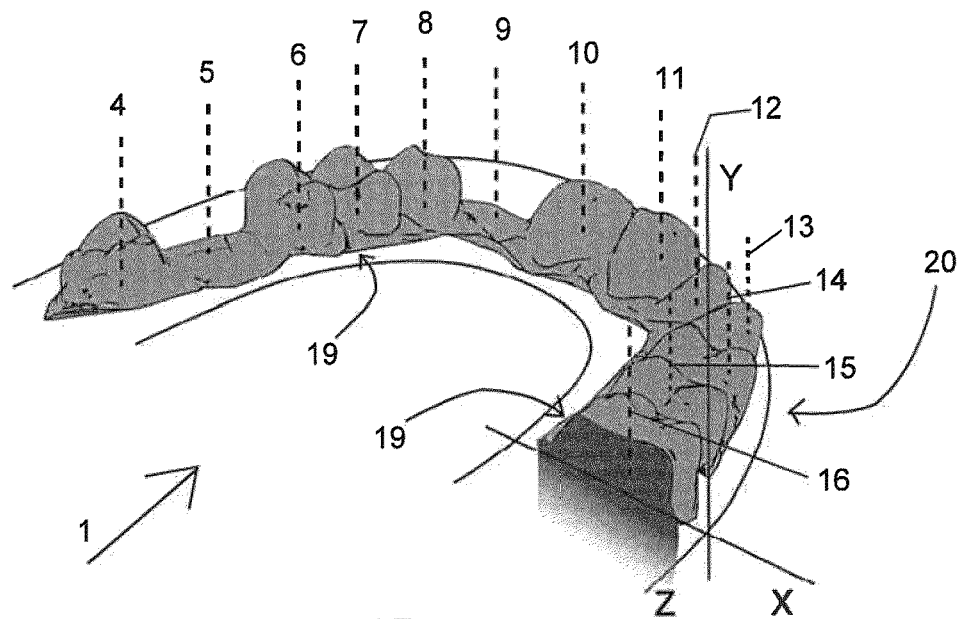
FIG. 1B shows an example of an upper dental arch with dental positions and a system of three orthogonal axes defining a dental arch.
Figure 1A:
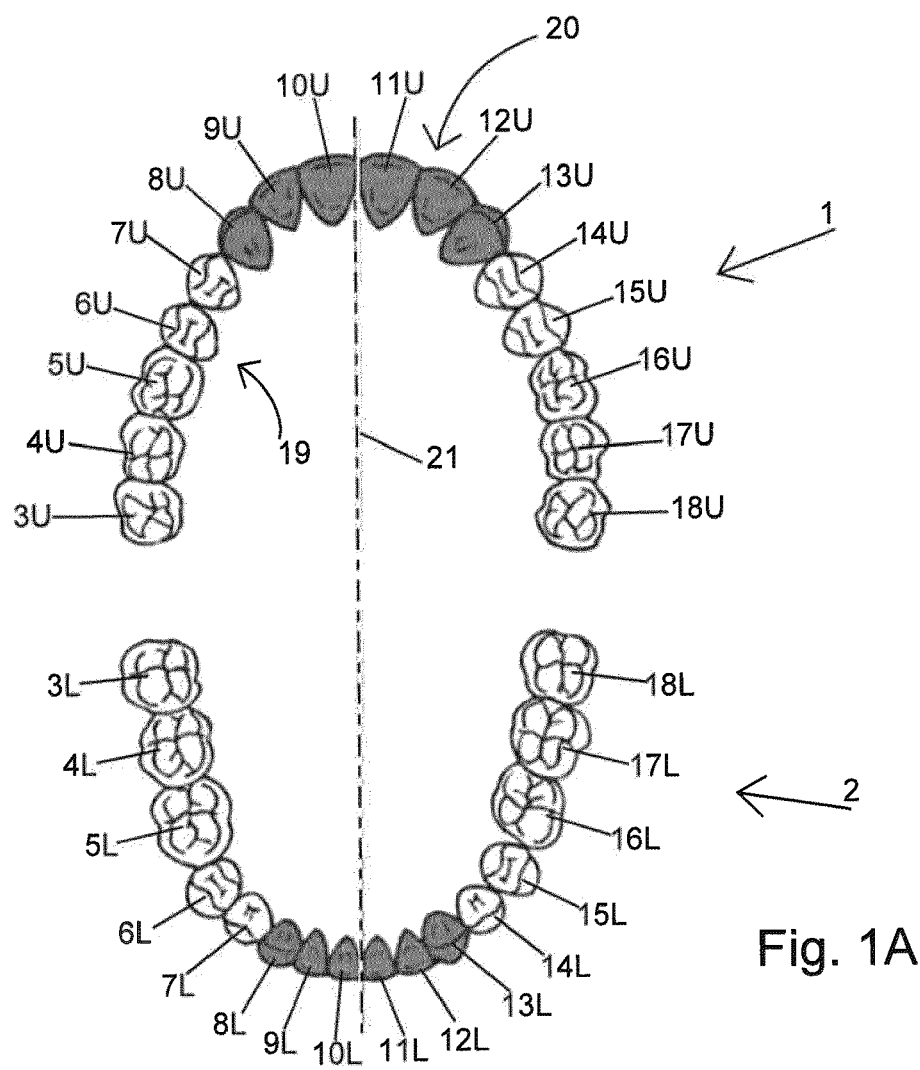
FIG. 1A shows in plain view the teeth of the lower dental arch and the teeth of the upper dental arch.

FIG. 1A shows in plain view, highly schematically an upper dental arch 1 and a lower dental arch 2. Each dental arch has in general 16 dental positions with a tooth which is named according to a nomenclature known to each dentist. Using this nomenclature, FIG. 1A shows:

- the right upper third molar 3U and right lower third molar 3L, which are also called wisdom teeth;
- the right upper second molar 4U and right lower second molar 4L;
- the right upper first molar 5U and right lower first molar 5L;
- the right upper second pre-molar 6U and right lower second pre-molar 6L;
- the right upper first pre-molar 7U and right lower first pre-molar 7L;
- the right upper canine 8U and right lower canine 8L;
- the right upper lateral incisor 9U and right lower lateral incisor 9L;
- the right upper central incisor 10U and right lower central incisor 10L;
- the left upper central incisor 11U and left lower central incisor 11L;
- the left upper lateral incisor 12U and left lower lateral incisor 12L;
- the left upper canine 13U and left lower canine 13L;
- the left upper first pre-molar 14U and left lower first pre-molar 14L;
- the left upper second pre-molar 15U and left lower second pre-molar 15L;
- the left upper first molar 16U and left lower first molar 16L;
- the left upper second molar 17U and left lower second molar 17L; and
- the left upper third molar 18U and left lower third molar 18L, which are also called wisdom teeth.

Further, according to commonly used nomenclature, the canines 8U, 8L, 13U, 13L, lateral incisors 9U, 9L, 12U, 12L, and central incisors 10U, 10L, 11U, 11L are called the anterior teeth—shown in grey in FIG. 1A—, and all molars 3U, 3L, 4U, 4L, 5U, 5L, 16U, 16L, 17U, 17L, 18U, 18 L and pre molars 6U, 6L, 7U, 7L, 14U, 14L, 15U, 15L are called the posterior teeth,—shown in white in FIG. 1A—.

FIG. 1B shows in perspective view, highly schematically a part of an upper dental arch 1 with dental positions 4-16. Each dental position is indicated with a vertical dashed line. Each dental position usually comprises an associated tooth which is named according to the above listed nomenclature. Dental position 7 is for example the dental position of the right upper first premolar 7U. In FIG. 1B the dental position of the left upper second molar is not shown, and also the dental positions of the wisdom teeth, the right and left upper third molars', are not shown.

Reference number 19 indicates the lingual side of the arch of dental positions. The lingual side 19 is the inner side of the arch of dental positions, which inner side faces the tongue. Reference number 20 indicates the facial side of the arch of dental positions. The facial side 20 is the outer side of the arch of dental positions, which outer side faces the face, like the cheeks and lips.

FIG. 1B further shows a system of three mutually orthogonal axes, comprising an x-axis X, a y-axis Y and a z-axis Z. The z-axis Z is a curved axis following the contour of the dental arch 1, 2. The x-axis X and y-axis Y are perpendicular to each other and define an xy-plane which is essentially flat and perpendicular to the dental arch 1, 2, i.e. each xy-plane intersecting a location on the z-axis is, at that location, perpendicular to the curved z-axis Z. The z-axis Z defines a curved length direction. The z-axis Z and y-axis Y define a curved zy-plane, with viewed along the z-axis, an arc-shape similar to shape of the dental arc. Further, the z-axis Z and x-axis X define a zx-plane and the x-axis X and y-axis Y define an xy-plane.

Referring to the terms 'J-shaped or U-shaped length direction' and 'U-shaped cross-section' as used in this document, the 'J-shaped or U-shaped length direction' is associated to the U-shaped z-axis Z in FIG. 1B and the 'U-shaped cross-section' is associated with the xy-plane in FIG. 1B.

Figure 2:
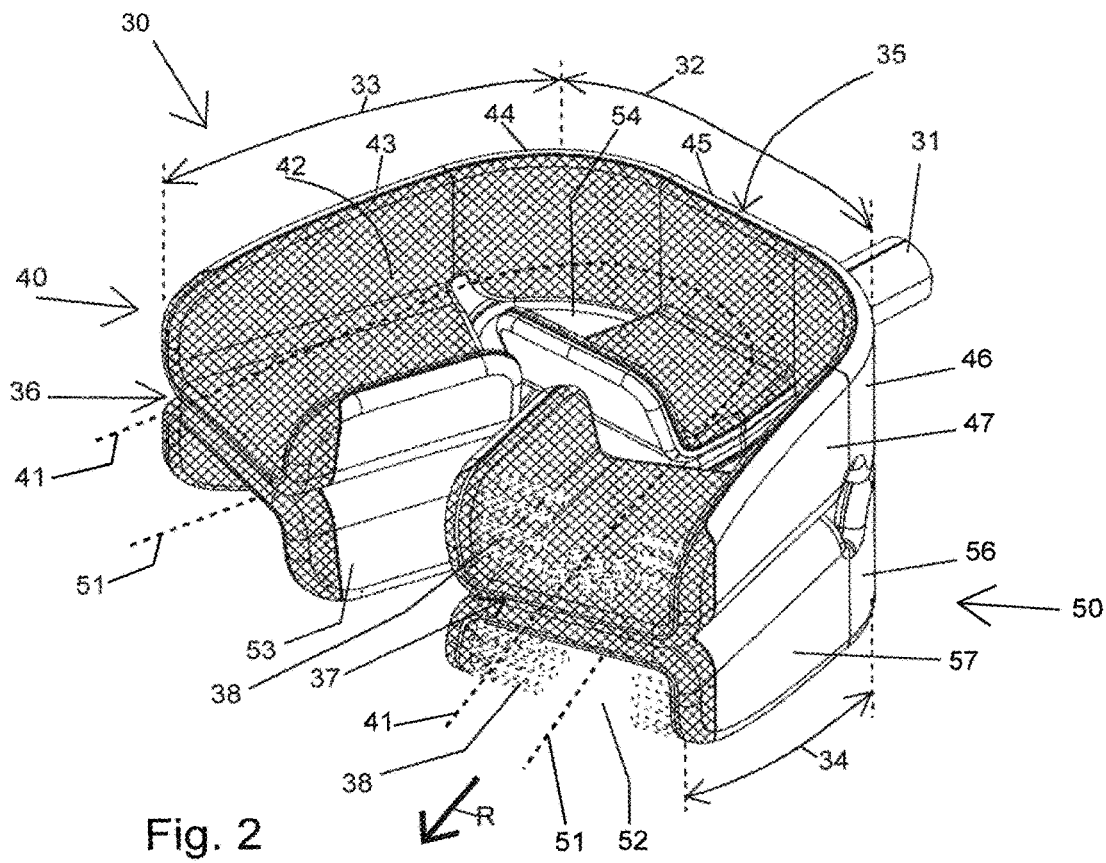
FIG. 2 show in perspective view an example of U-shaped mouthpiece according to the first, second and third invention and made with the method according to the first or second invention.

FIG. 2 shows schematically a perspective view of an example of a U-shaped mouthpiece 30 according to the first, second and third invention and made with the method according to the first or second invention.

The mouthpiece 30 of FIG. 2 has an upper part 40 for treating the upper dental arch and a lower part 50 for treating the lower dental arch. The upper part 40 has a trough system 42, upper trough system, which is in FIG. 2 represented by its U-shaped curved length axis 41. This upper trough system 42 with curved length axis 41 is configured for simultaneously encompassing a plurality of dental positions (or teeth) of the upper dental arch 1. The lower part 50 has a trough system 52, lower trough system, which is in FIG. 2 represented by its U-shaped curved length axis 51. This lower trough system 52 with curved length axis 51 is configured for simultaneously encompassing a plurality of dental positions (or teeth) of the lower dental arch 2. The lower and upper trough system may each be formed as one continuous trough (not shown). Each trough system may however also comprise a multiple of trough sections aligned along the curved length axis of the trough system to provide a discontinuous trough system. In the embodiment shown in FIG. 2, the upper trough system 42 comprises three trough sections 43, 45 and 47 aligned along the curved length axis 41 and connected by links 44 and 46 to provide the discontinuous through system 42. Although not all trough sections and links are visible ion FIG. 2, the same applies for the lower trough system 52 of the embodiment in FIG. 2. The lower trough system 52 comprises three trough sections 53, 57 aligned along the curved length axis 51 and connected by links 56 to provide the discontinuous through system 52.

As schematically indicated with the double-arrows 32, 33, and 34, the mouthpiece 30 has an anterior part 32, which, in use, overlaps with or lies along (all) the anterior teeth of the user, and two posterior parts 33 and 34, which, in use, overlaps with or lies along at least part of the posterior teeth. The mouthpiece 30 has one anterior end indicated with arrow 35 and two posterior ends indicated with arrows 36 and 37. The posterior ends 36, 37 of the mouthpiece are the ends that are deepest in the mouth during use, so to say the outer ends of the U-shape. The anterior end is the end that, during use, lies at the front of the mouth at the incisors, so to say on the outside of the U-shape, at the middle of the U-shape on the imaginary horizontal line dividing the mouthpiece equally in a right half and a left half. Taking into account, as will be explained further down below in relation to the third invention, that the mouthpiece of FIG. 2 will in use be moved to-and-fro along the dental ach of the user to the right and the left, it is noted that the above mentioned anterior part 32, posterior parts 33, 34 and anterior end 35 are defined in the neutral position, or middle position, and that FIG. 2 shows the mouthpiece in its neutral position. In the neutral position, the mouthpiece is—when inserted in the mouth—centred with respect to the centre axis 21—see FIG. 1A—of the dental arch. When the mouthpiece 30 has been moved to a shifted position on the right—arrow R in FIG. 2—along the dental arch, the anterior part 32 and posterior parts 33 and 34 will have been moved with respect to the dental arch resulting in:

that the left posterior part 33 not only overlaps with at least part of the left posterior teeth but also with at least some of the left anterior teeth, that the anterior part 32 no longer overlaps with only (all) anterior teeth but also overlaps with some of the right posterior teeth, that the right posterior part 34 still overlaps with only right posterior teeth, and that the anterior end 35 will no longer lie on the centre axis 21—see FIG. 1A—of the dental arch but on the right side of the centre axis 20 of the dental arch (or vice versa in case the mouthpiece has been moved to the left)

Further referring to FIG. 2, the mouthpiece 30 comprises a handle coupling 31 which is configured for attaching a handle for the user, which allows the user to manipulate the mouthpiece 30. This handle coupling 31 is provided at the anterior end 35 of the mouthpiece. Thus, in the neutral position the handle coupling will lie in front of the central incisors on the centre axis of the dental arch and in shifted position it may lie—depending on the amount of shift—in front of a right or left lateral incisor, or in front of a right or left canine, or in front of a right or left first pre-molar, or possibly in front of a right or left second pre-molar, or any position in between.

Each trough section is provided with brushing elements. In order to keep the FIG. 2 clear, only a few brushing elements 38 are shown very schematically in the trough sections 47 and 57. These brushing elements may according to the first, second and third invention be of any kind suitable for brushing the teeth. As shown in FIG. 2, these brushing elements are bristles, arranged in tufts. But also other brushing elements, like ribs or an embossed surface structure are very well conceivable within the scope of the first, second and third invention as defined by the claims.

FIG. 2 shows a so called U-shaped full mouthpiece 30. Within the scope of the first, second and third invention as defined by the claims, the mouthpiece may also be a so called U-shaped half mouthpiece (not shown). In a U-shaped half mouthpiece the upper part 40 of the mouthpiece 30 (or the lower part 50) is missing, and the remaining part can be used for treating subsequently the upper dental arch and lower dental arch by taking the mouthpiece out of the mouth after having treated one of the dental arches, turning it around a horizontal axis, and inserting it in the mouth again for treating the other dental arch.

Figure 3:
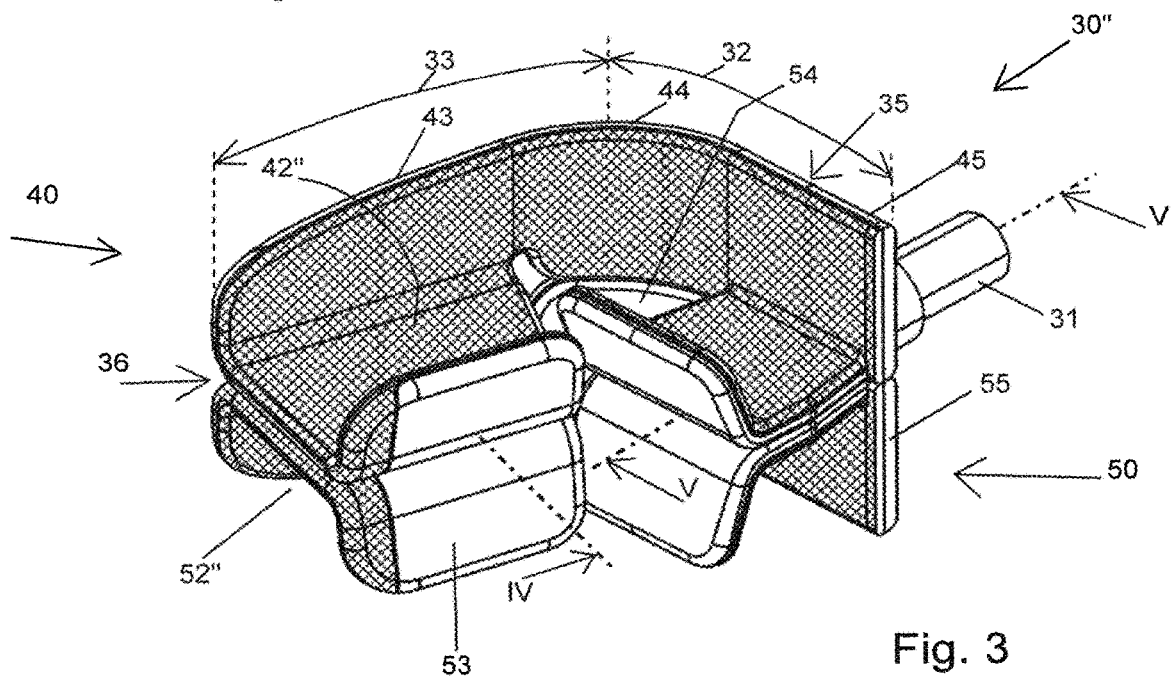
FIG. 3 show in perspective view an example of J-shaped mouthpiece according to the first, second and third invention and made with the method according to the first or second invention.

FIG. 3 shows a J-shaped mouthpiece 30" according to the first, second and third invention and made with the method according to the first or second invention. This J-shaped mouthpiece 30" is basically the same as the U-shaped mouthpiece 30 of FIG. 2, except that the links 46, 56 and trough sections 47 and 57 of FIG. 2 are not present in the J-shaped mouthpiece of FIG. 3. Also the J-shaped mouthpiece 30" of FIG. 3 is shown in its neutral (or middle) position. As the J-shaped mouthpiece 30" of FIG. 3 is, except for the parts left away, basically the same as the mouthpiece 30 of FIG. 2, same reference numbers have been used for same or similar parts and reference is made to what has been described in relation to FIG. 2.

FIG. 3 shows a so called J-shaped full mouthpiece 30.

FIG. 4 and FIG. 5 each show a cross-section of both the mouthpieces 30 (of FIG. 2) and 30" (of FIG. 3), at the location and as seen as is indicated in FIG. 3 with the arrow IV for FIG. 4 and with the arrows V for FIG. 5.

Figures 4A, 4B:
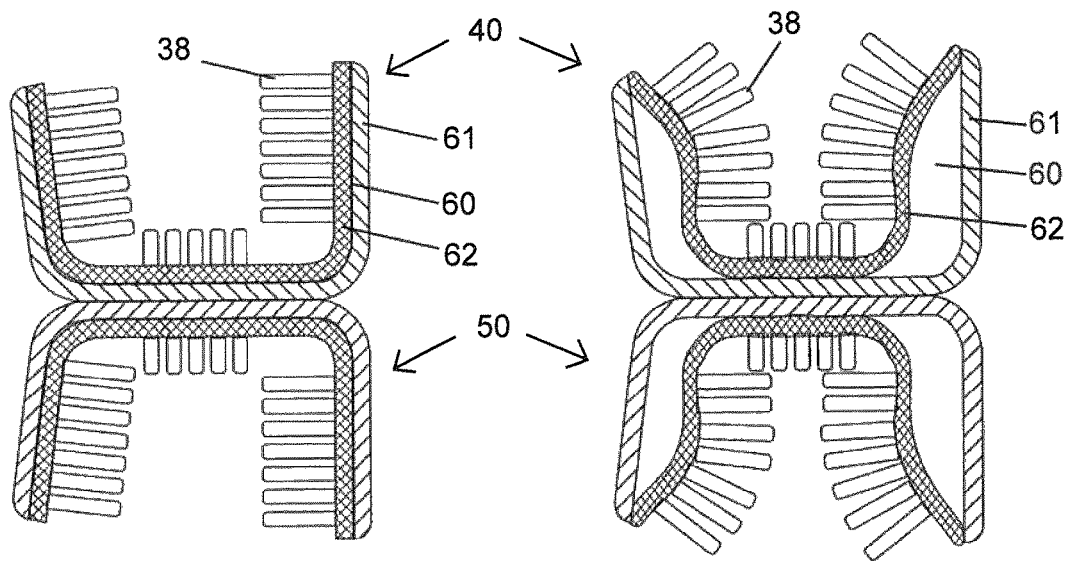
FIG. 4A shows the cross-section with depressurized pressure chamber and FIG. 4B shows the cross-section with pressurized pressure chamber.
Figures 5A, 5B:
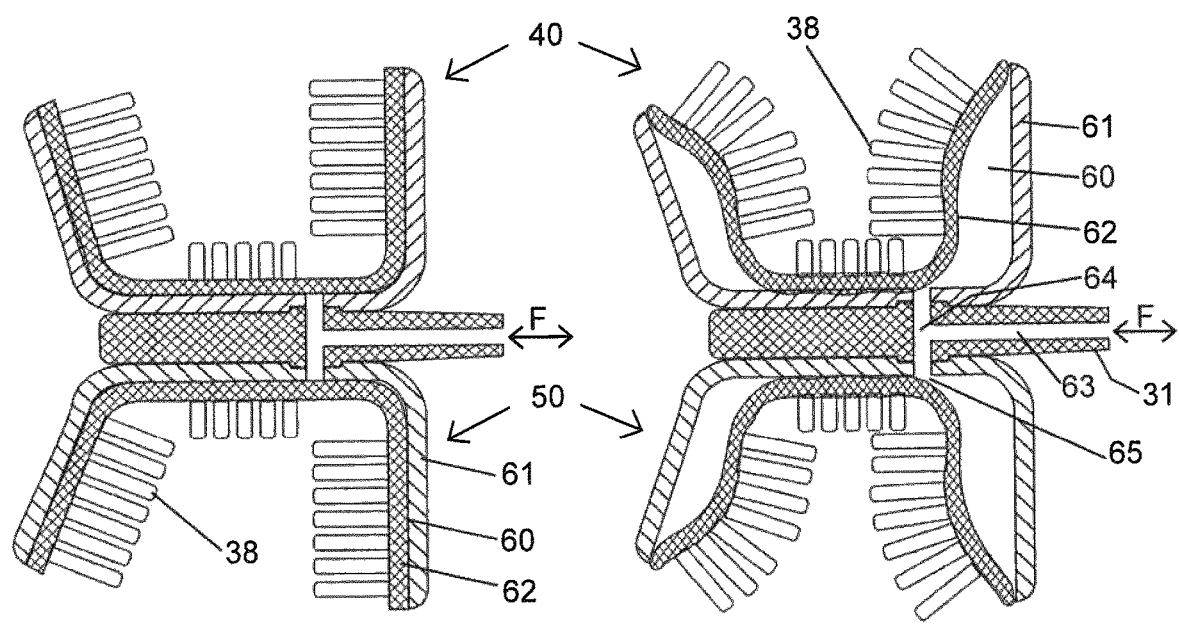
FIG. 5A shows the cross-section with depressurized pressure chamber and FIG. 5B shows the cross-section with pressurized pressure chamber.

In FIGS. 4A and 5A the mouthpiece is shown in a decreased pressure condition, in which it is also shown in FIGS. 2 and 3, and in FIGS. 4B and 5B the mouthpiece is shown in an increased pressure condition.

As can be seen in FIGS. 4 and 5, the mouthpiece has a frame part 61, and a wall part 62 provided with bristles 38, such as tufts of bristles. The frame part 61 and wall part 62 form a pressure chamber with a pressure cavity 60 between the frame part 61 and wall part 62. A pressure medium can be supplied into and discharged from the pressure cavity 60 formed between the frame part 61 and wall part 62. In FIGS. 4A and 5A the pressure cavity 60 (and thus the pressure chamber) is in a depressurized condition. In this embodiment, the pressure cavity has in the depressurized condition so to say no volume in the sense that the wall part 62 lies loosely against the frame part 61 in a layered like manner. When the pressure cavity 60 is alternatingly pressurized and depressurized, the wall part 62 with bristles deforms (alternatingly) so that the bristles are brought into motion to clean the teeth. FIGS. 4B and 65 show the pressure cavity 60 in pressurized condition.

Although FIGS. 4A and 5A show the pressure chamber in a kind of fully empty condition in which the pressure cavity has so to say a volume of about zero, it is however to be noted that in depressurized condition there may very well be a distance between the frame part 61 and wall part 62 so that also in depressurized condition the pressure chamber is present as a cavity with a certain volume larger than zero.

Further, it is to be noted that the terms 'pressurized' and 'depressurized' are only used in mutual relation to indicate that there is a condition in which the pressure cavity 60 is at a higher pressure—the pressurized condition—and a condition in which the pressure cavity is at a lower pressure—the depressurized condition—. For example it is conceivable that in depressurized condition, the pressure in the pressure cavity may have a pressure lower than the ambient pressure, but it may also have—in depressurized condition—a pressure above ambient pressure. In pressurized condition, the pressure will be higher than in depressurized condition. In practice, the operating pressure in the pressure cavity will be below 2 bar, it may for example alternate between +0.1 and +0.25 or +0.5 bar relative to ambient pressure or between −0.2 and +0.25 bar relative to ambient pressure.

Referring to FIGS. 5A and 5B, it can be seen that the pressurizing medium is supplied and discharged—see double arrow F—via a channel 63 in the handle coupling 31. This channel 63 communicates with a distribution channel 64 having passages 65 connecting the distributing channel 65 with the one or more pressure chambers. As a further note, it is noted that the pressure chamber on the facial side of the mouthpiece and the pressure chamber on the lingual side of the mouthpiece may be in direct fluid communication with each other (not shown) or in indirectly fluid communication via the distribution channel 64 (not shown).

As can be seen in FIGS. 4 and 5, the wall part 62 is flexible in order to allow deformation, and the frame part 61 is relative to the wall part rigid. When pressurizing the pressure cavity 60, the frame part may be dimensionally stable (to withstand deformation) (as shown by way of example on the right side of FIGS. 4B and 5B) or may deform (as shown by way of example in FIGS. 4B and 5B on the left side).

Figure 6:
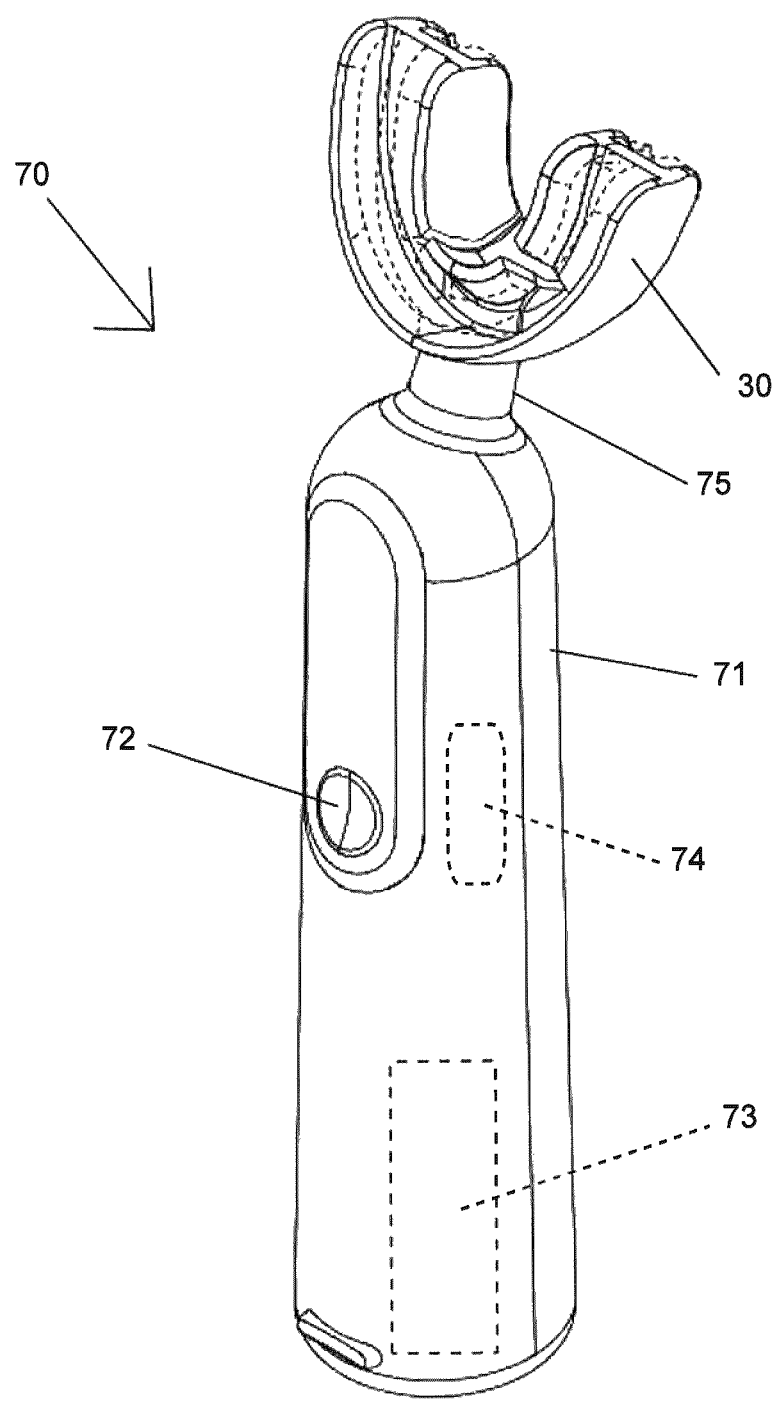
FIG. 6 shows in perspective view and schematically a system according to the first, second and third invention.

FIG. 6 shows schematically a perspective view of an example of a system 70 according to first, second and third invention. This system 70 comprises a mouthpiece 30 and a handle 71, The mouthpiece 30 is by means of its handle coupling (not visible in FIG. 6) attached to the coupling end 75 of the handle 71. Inside the handle a rechargeable battery 73 is provided and a drive 74, like a pump, for pressurizing and depressurizing the pressure cavity(s) of the mouthpiece. Further the handle comprises an on/off button 72.

Now turning to FIGS. 7 to 27, the method according to the first invention for manufacturing a pressure chamber according to the first invention will be elucidated. It is however to be noted that this method may be part of, such as a step in, the method according to the second invention for manufacturing a mouthpiece according to the second invention. Further it is to be noted that a pressure chamber or pressure chambers manufactured with the method according to the first invention, may be part of a mouthpiece according to the third invention.

In FIGS. 7-27, reference A is used to indicate a frame part of the mouthpiece of FIGS. 1-6, reference C is used to indicate a wall part of the mouthpiece of FIGS. 1-6, and reference 60 is, like in FIGS. 1-6, used to indicate the pressure cavity of the pressure chamber. Further reference 80 indicates an injection mould having a first mould halve 81 and a second mould halve 82. Reference numbers 83 and 85 indicate die cavities, and reference 84 indicates an attachment loop along which the frame part A and wall part C are attached to each other to form the pressure chamber 90 having a pressure cavity 60 enclosed by the part of the frame part A surrounded by the attachment loop, the part of the wall part C enclosed by the attachment loop, and the attachment loop itself.

Figure 7A:
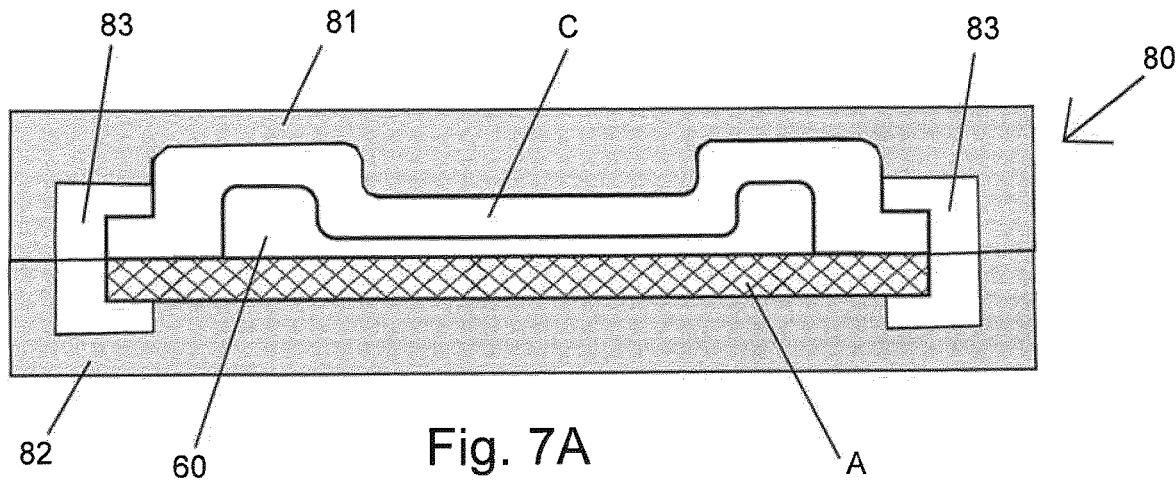
FIG. 7A shows a cross-section of an injection mould with insert ready for over-moulding.

Referring to FIG. 7A a pre-fabricated frame part A and a pre-fabricated wall part C are placed as an insert into an injection mould 80. The insert (composed by the wall part C and frame part A) and the mould halves 81 and 82 define a die cavity 83, which surrounds the wall part C and frame part A all along the circumferential edges of the wall part C and frame part A. In the embodiment shown in FIG. 7A, the die cavity 83 has a C-shaped cross-section. It is however noted that this C-shaped cross-section is just an example for the purpose of elucidation and the invention is not limited to a die cavity with C-shaped cross-section. For example, the cross-section may also be rectangular or a semicircle with a height respectively diameter equal to the thickness of the frame part A and wall part C or may have any other suitable shape.

Figure 7B:
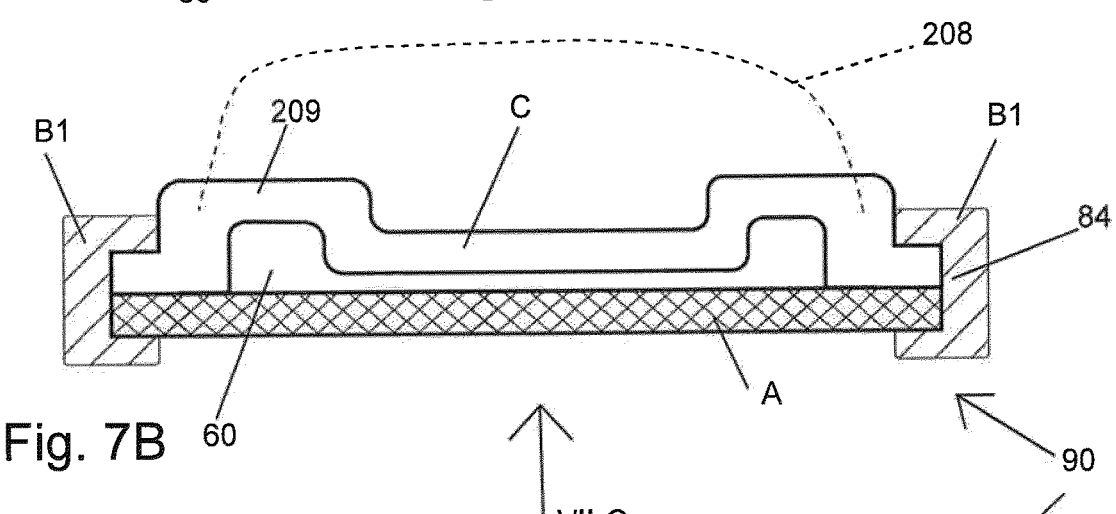
FIG. 7B shows in cross-section a pressure chamber obtained and FIG. 7C shows a top view of the same pressure chamber.
Figure 7C:
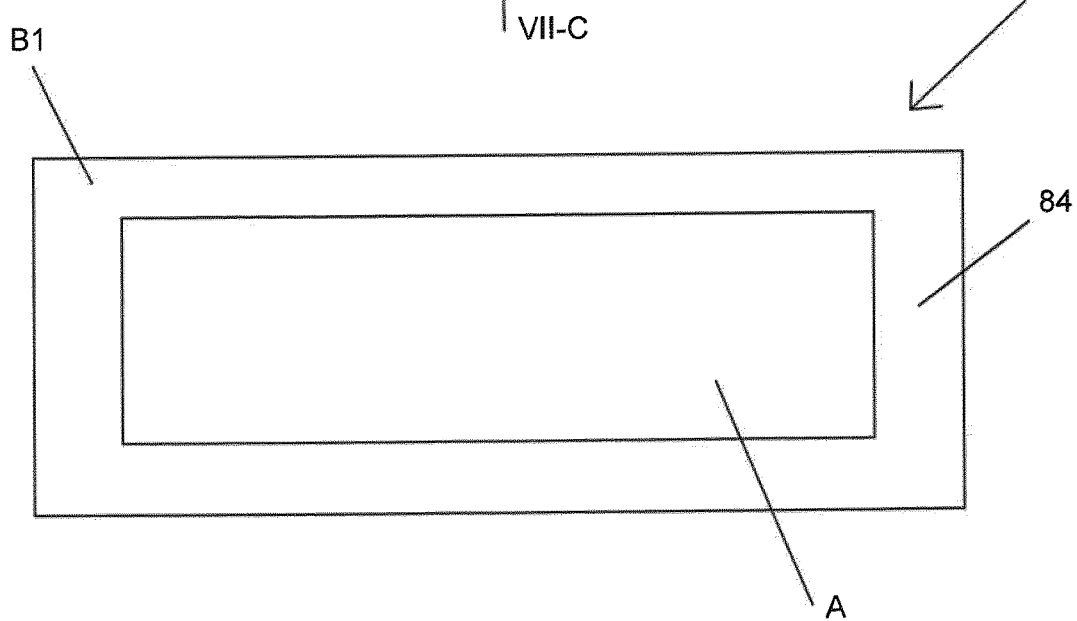

After having prepared the injection mould 80 by inserting the pre-fabricated frame part A and pre-fabricated wall part C and closing the mould, a first overmoulding material is injected into the injection mould to fill the die cavity 83. Doing so, the wall part C and frame part A are attached to each other along attachment loop 84 established by the first overmoulding material. In this embodiment the first overmoulding material provides a ring B1 around the frame part A and wall part C, see FIGS. 7B and 7C showing the manufactured pressure chamber 90 in cross-section respectively in top view according to arrow VII-C in FIG. 7B. The first over-moulding material forming the ring B1 may, due to its heat when injection moulded, fuse with the frame part A and/or wall part C, but it is also conceivable that the ring B1 is, once solidified, a clamping ring sealingly engaging, such as adhering, with the wall part C and frame part A.

The wall part C as shown in FIGS. 7A and 7B further show that the wall part C may be profiled. Along the circumference the wall part C is provided with a profile 209—in this example a C-shaped profile—configured to unfold when the pressure cavity 60 is pressurized. When unfolding, the pressure chamber 90 may for example unfold to an unfolded condition which has been shown schematically with the dashed line 208. The profile 209 or profiled flexible wall C may according to a further embodiment be configured to fold up when the pressure cavity 60 is depressurized (=lowered in pressure). This folding up may be back to the condition as shown in solid line in FIG. 7B or to some condition in between the condition shown—in FIG. 7B—in solid line and the condition shown—in FIG. 7B—in dashed line. In the example of FIG. 7, the wall part C is a pre-fabricated wall part. This pre-fabricated profiled wall part C may for example have been made by injection moulding the wall part with the shape as shown in FIG. 7 or some other pre-determined shape. According to another example the pre-fabricated profiled wall part may have been made by thermoforming a sheet into the shape as shown in FIG. 7 or into some other pre-determined shape.

Figure 8A:
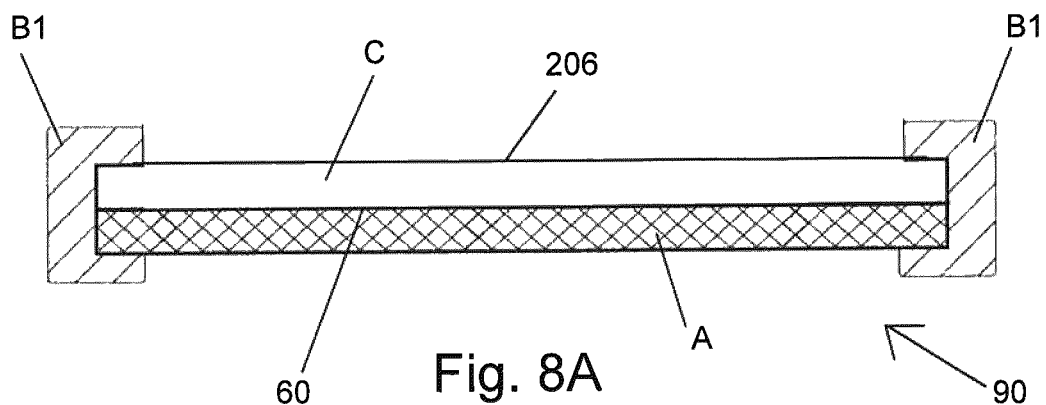
FIG. 8A shows the obtained pressure chamber in cross-section and depressurized condition.
Figure 8B:
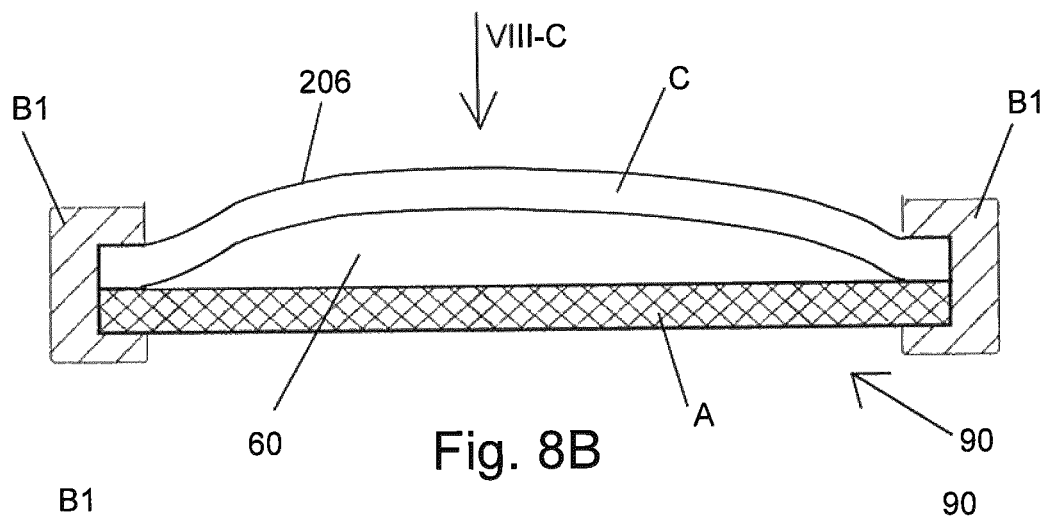
FIG. 8B shows the obtained pressure chamber in cross-section and pressurized condition.
Figure 8C:
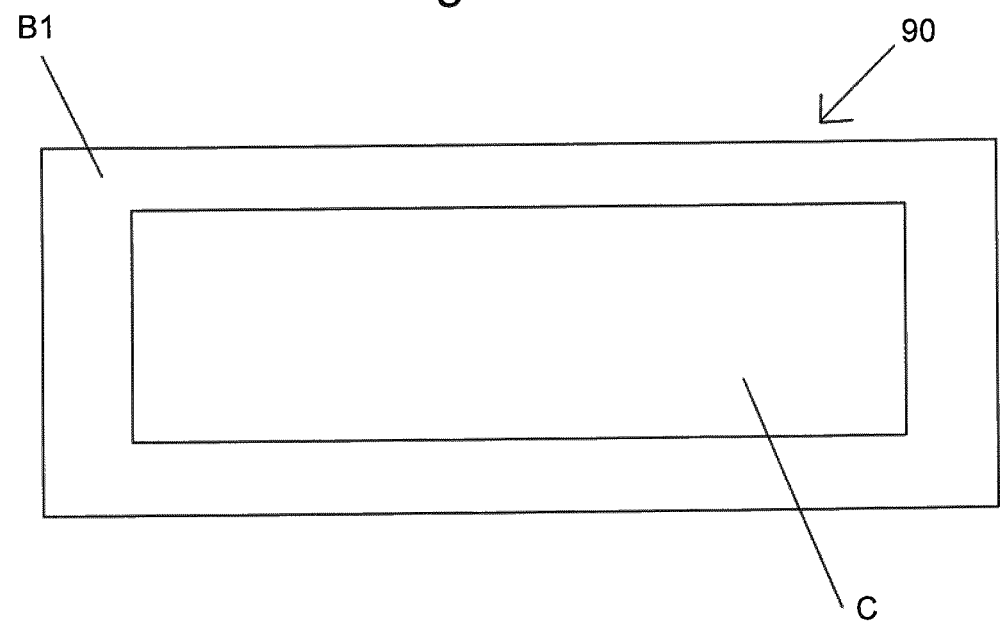
FIG. 8C shows the pressure chamber of FIGS. 8A and 8B in top view.

FIG. 8 shows a variant of the pressure chamber manufactured according to the example of FIG. 7, a pressure chamber 90 in which the pre-fabricated frame-part A and pre-fabricated wall C have been arranged in a layered manner along each other as insert into the injection mould (not shown), resulting in a pressure chamber having initially a layered structure with the frame part and wall part C parallel to each other. FIG. 8A shows the pressure chamber 90 after having been removed from the injection mould. FIG. 8B shows the same pressure chamber 90 with a pressure medium introduced between the wall part and frame part. In case the pre-fabricated wall part and pre-fabricated frame part A may have a tendency to adhere to each other for example under influence of the heat of the injection mould, introducing a pressurized medium into the area between the frame part A and wall part C prevents frame part A and wall part C from becoming stick to each other permanently in the area surrounded the attachment loop 84.

Referring to FIG. 8, it is noted that the wall part C may, after the pressure chamber having been manufactured, be given a profile, for example the same profile as shown in FIG. 7. This may for example be done by thermoforming. Once heated sufficiently, a die with the (mirror) shape of the desired profile—for example about the profile of the upper mold half 81 in FIG. 7A—may be placed on the outer surface 206 of the wall part and suction may be applied to so to say 'suction' the wall part into the desired pre-defined profile.

FIG. 9 shows another embodiment of the method according to the first invention. In the embodiment of FIG. 9, a frame part A is provided, for example as a pre-fabricated part, see FIG. 9A. In FIG. 9B the frame part B is combined with an intermediate member B to obtain a combined part 88. In the example of FIG. 9, the intermediate member B is an intermediate layer. The intermediate member B, may also be a prefabricated part. In case the frame part A and intermediate layer B both are prefabricated parts, they may be adhered to each other permanently or temporarily by any suitable adhesive to keep their relative positions fixed, when placing the combined part 88 as an insert into an injection mould, see FIG. 9C. It is however to be noted that also the frame part A may be a pre-fabricated part, whilst the intermediate layer B is over-moulded onto the prefabricated frame part in in injection mould (not shown), or the other way around the intermediate layer B may be a pre-fabricated part which is over-moulded with the frame part A in an injection mould (not shown).

Figure 9A:
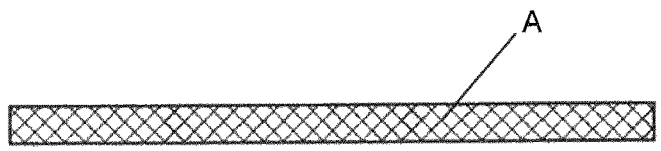
FIG. 9A shows a cross-section of the frame part.
Figure 9B:
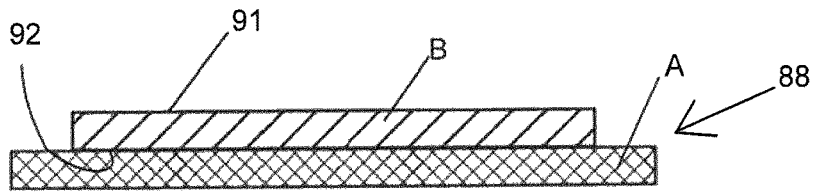
FIG. 9B shows a cross-section the frame part provided with an intermediate layer.
Figure 9C:
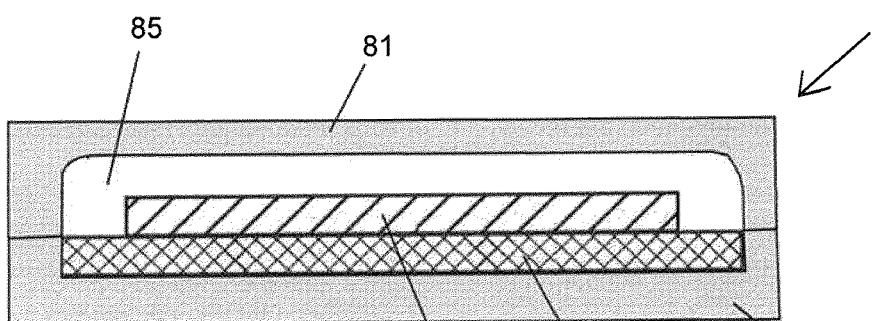
FIG. 9C shows a cross-section of an injection mould with insert ready for over-moulding.
Figure 9D:
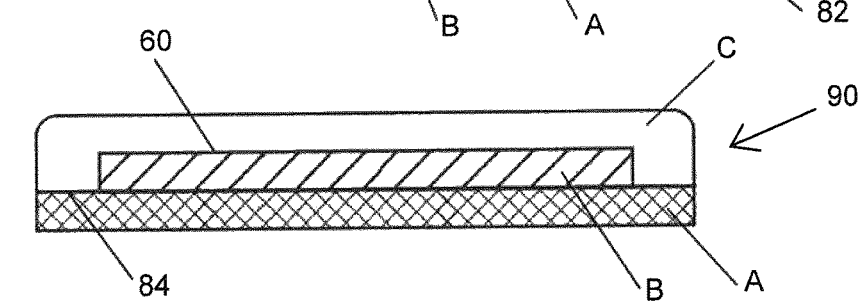
FIG. 9D shows in cross-section a pressure chamber obtained in depressurized condition.

Once the combined part 88 is obtained, this combined part 88 is placed as an insert into an injection mould 80, see FIG. 9C. The injection mould 80 and inserted combined part 88 define a die cavity 85 once the injection mould is closed. In an overmoulding step a first over-moulding material is injected into the injection mould to fill the die cavity 85. In this embodiment, the first over-moulding material is providing the wall part C, resulting in the pressure chamber 90 shown in FIGS. 9D-9F. FIG. 9D shows the pressure chamber after removal from the injection mould 80. The pressure chamber 90 is in FIG. 9D not yet pressurized.

It is noted, that as a variant of what has been shown in FIGS. 9A-9C, it is also conceivable to start in FIG. 9A with the wall part C and to combine—similar to FIG. 9B and what has been described in relation to FIG. 9B—the wall part C with the intermediate part/layer B, to place the thus obtained combined part as an insert into the injection mould and to provide the frame part A by injecting the first over-moulding material—in this case the material from which the frame part A is formed—into the injection mould 80.

In the embodiment of FIG. 9, the frame part A and wall part C are made of materials adhering to each other when one of them is over-moulded onto the other and the attachment loop 84 is obtained along the circumference of the pressure chamber where the frame part A and wall part C contact each other. The frame part A and wall part C may fuse together along the attachment loop 84. The intermediate layer B is placed in between the frame part A and wall part C to prevent the wall part C and frame part A from adhering or fusing to each other.

After the pressure chamber 90 has been removed from the injection mould—as shown in FIG. 9D—a pressure medium may be introduced in the area delimited between the wall part C, frame part A and attachment loop 84.

In case the intermediate layer B is adhered or fused to both the wall part and the frame part, the intermediate layer B may be a laminate having a weakened plane extending parallel to the laminate to provide a separation layer allowing separation of the wall part C and frame part A with respect to each other when introducing a pressurized medium.

The intermediate layer B may, in another embodiment, however also have a first outer surface or outer layer attached to or bonding, such as fusing, with the part provided in FIG. 9A and a second outer surface or outer layer configured to resist bonding or fusing with the first over-moulding material so that the intermediate layer allows separation between the frame part and wall part when a pressurized medium is introduced. As an example, the intermediate layer B may comprise or may be made of a PA or a PE, the frame part A may comprise or may be made of a PP, and the wall part C may comprise or may be made of a TPE.

According to another further embodiment, the intermediate layer B has an exposed surface 91, facing away from the frame part A (or wall part C in case the wall part A has been provided in the step of FIG. 9A), which exposed surface 91 is configured to resist fusing with the first over moulded material injected in the injection mould of FIG. 9C to provide the wall part C (or frame part A in case the wall part C has been provided in the step of FIG. 9A) by over-moulding. In this embodiment, the opposing surface 92 of the intermediate layer B, which opposing surface faces the frame part A (or wall part C in case the wall part A has been provided in the step of FIG. 9A), may be configured to fuse with the frame part A (or wall part C in case the wall part A has been provided in the step of FIG. 9A) due to the heat of the first over-moulding material injected in the injection mould of FIG. 9C. As an example, the intermediate layer B may comprise or may be made of a PA, the wall part C may comprise or may be made of a TPE, like SEBS, and the frame part A may be made or may comprise a TPE-PA.

According to still another further embodiment, the intermediate layer B has an exposed surface 91, facing away from the frame part A (or wall part C in case the wall part A has been provided in the step of FIG. 9A), which exposed surface is configured to fuse with the first over-moulding material which is injected into the injection mould of FIG. 9C to provide the wall part C (or frame part A in case the wall part C has been provided in the step of FIG. 9A) by over-moulding. In this embodiment, the opposing surface 92 of the intermediate layer B, which opposing surface 92 faces the frame part A (or wall part C in case the wall part A has been provided in the step of FIG. 9A), may be configured to resist fusing with the frame part A (or wall part C in case the wall part A has been provided in the step of FIG. 9A) due to the heat of the first over-moulding material injected into the injection mould of FIG. 9C. As an example, the intermediate layer B may comprise or may be made of PA, the wall part C may comprise or may be made of a TPE, like SEBS, and the frame part A may be made or may comprise a PP.

Figure 9E:
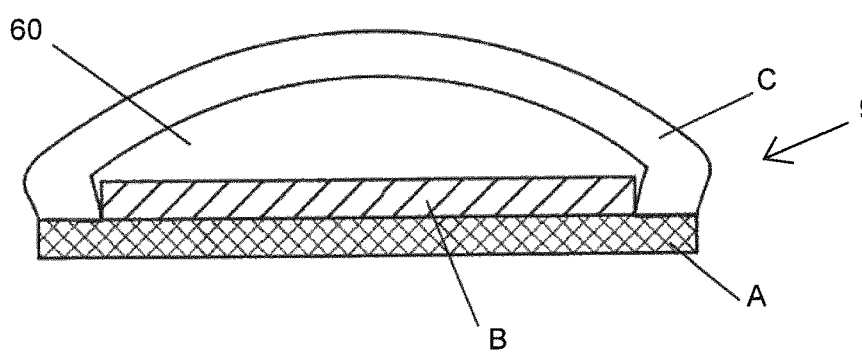
FIG. 9E shows in cross-section a pressure chamber obtained in pressurized condition.
Figure 9F:
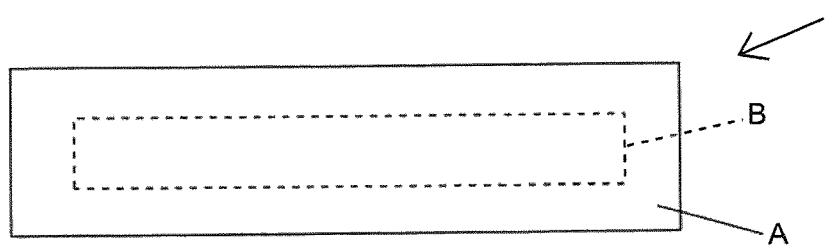
FIG. 9F shows a top view of the same pressure chamber.
Figure 10A:
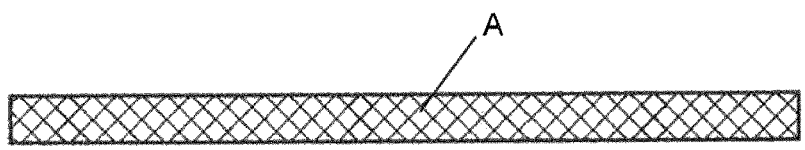
FIG. 10A shows a cross-section of the frame part.
Figure 10B:
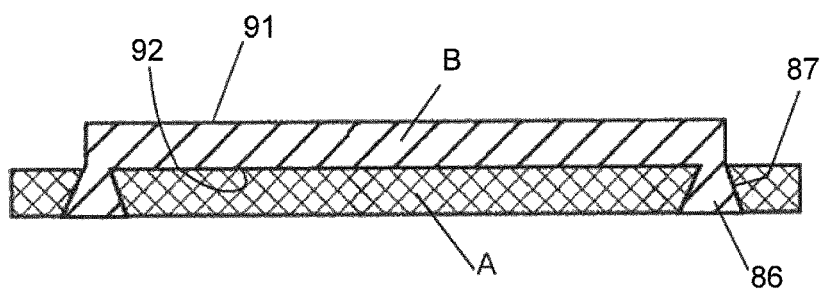
FIG. 10B shows a cross-section the frame part provided with an intermediate layer.
Figure 10C:
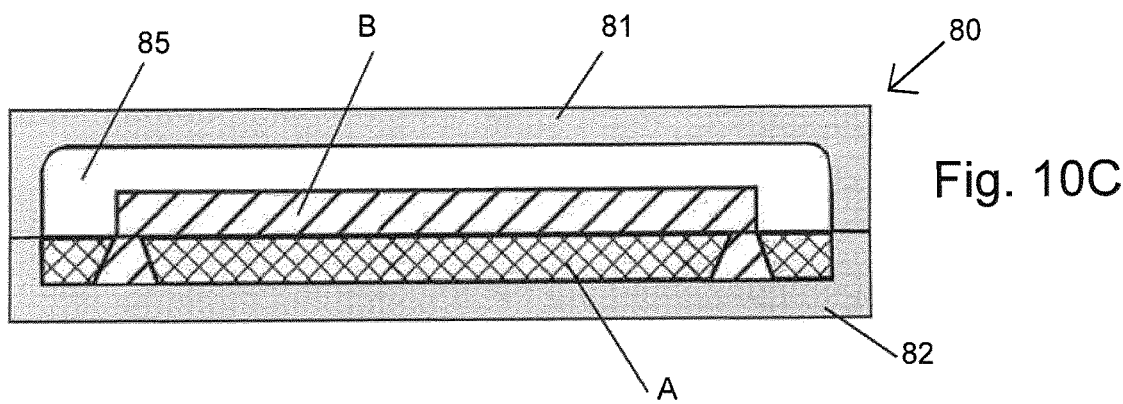
FIG. 10C shows a cross-section of an injection mould with insert ready for over-moulding.
Figure 10D:
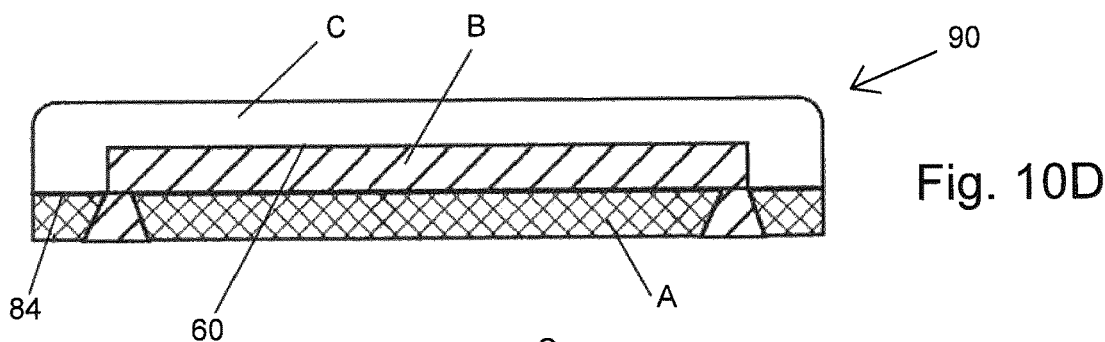
FIG. 10D shows in cross-section a pressure chamber obtained in depressurized condition.
Figure 10E:
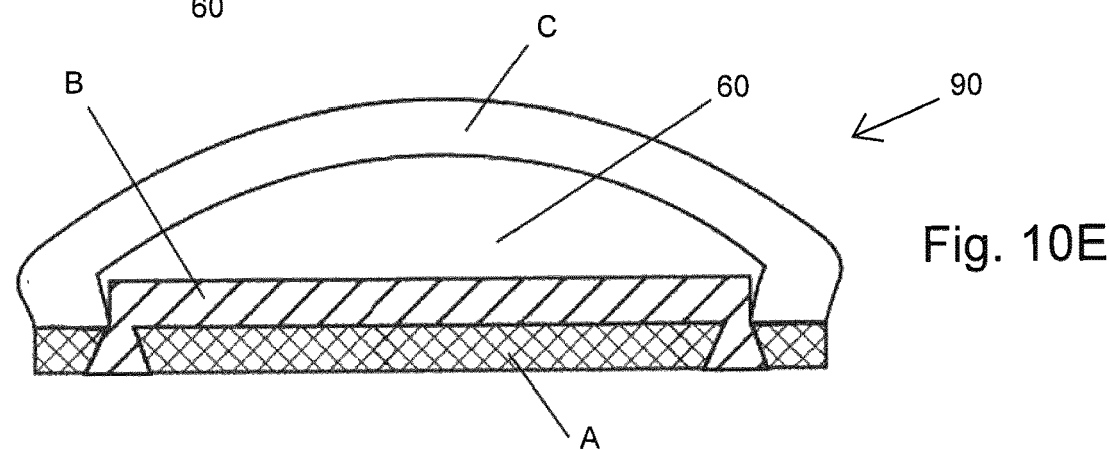
FIG. 10E shows in cross-section a pressure chamber obtained in pressurized condition.

FIGS. 10A to 10E correspond to FIGS. 9A to 9E, except that in FIG. 10, the intermediate layer B is mechanically attached to the frame part A (or wall part C in case the wall part C has been provided in the step of FIG. 10A). Except this difference, the above elucidation in relation to FIG. 9 applies mutatis mutandis to FIG. 10. The mechanical attachment comprises one or more male members 86 integral with the intermediate layer B and a corresponding number of female members formed in frame part A, or vice versa—not shown—one or more male members integral with the frame part A and a corresponding number of female members formed in the intermediate layer B. The mechanical attachment may be established in mechanical manner by inserting the male members into the female members, but may also be established by over-moulding the frame part A onto the intermediate layer B or vice versa by over-moulding the intermediate layer B onto the frame part A.

FIG. 11 shows an embodiment of the method according to the first invention, in which the frame part A and wall part C are made materials which resist fusing with each other when over-moulded onto each other or in which the frame part A and wall part C are configured to resist fusing with each other when over-moulded onto each other. FIGS. 11A to 11E are very similar to FIGS. 9A-9E and FIGS. 10A to 10E. The difference between FIGS. 11A-11E on the one hand and FIGS. 9A-9E and 10A-10E on the other hand is basically that the frame part A and wall part C are made of materials which resist fusing with each other when over-moulded onto each other, and that a bead loop B2 is used to manufacture the pressure chamber. Except these differences, the above elucidation in relation to FIG. 9 and FIG. 10 applies mutatis mutandis to FIG. 11.

Figure 11A:
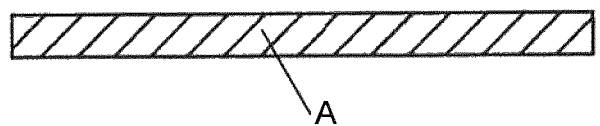
FIG. 11A shows a cross-section of the frame part.
Figure 11B:
FIG. 11B shows a cross-section the frame part provided with an intermediate layer.
Figure 11C:
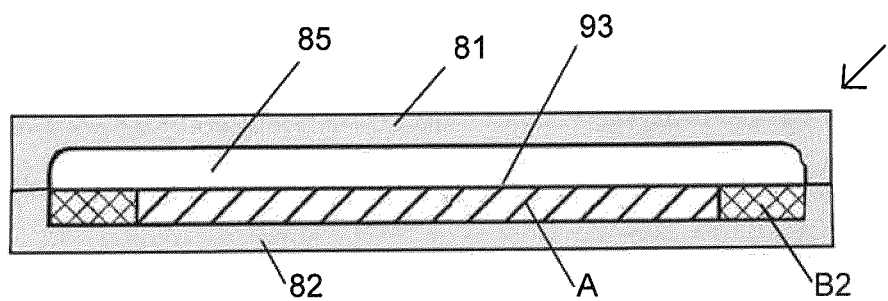
FIG. 11C shows a cross-section of an injection mould with insert ready for over-moulding.
Figure 11D:
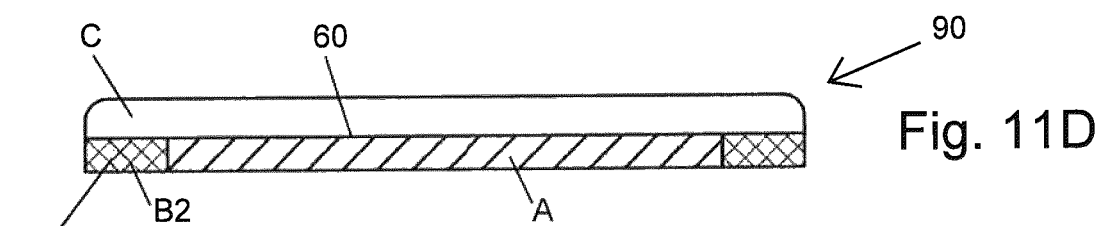
FIG. 11D shows in cross-section a pressure chamber obtained in depressurized condition.
Figure 11E:
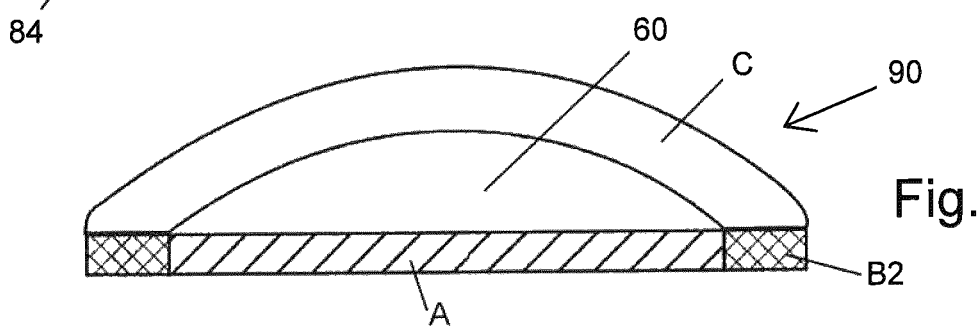
FIG. 11E shows in cross-section a pressure chamber obtained in pressurized condition.

In this embodiment of FIG. 11, the intermediate member is bead loop B2 which is configured to fuse in the over-moulding step represented by FIG. 11C with the first over-moulding material, which is to form the wall part C (or the frame part A in case the part provided in the step of FIG. 11A might be the wall part C). In the step represented by FIG. 11B, the bead loop B is placed against the frame part A or wall part C in case this might have been provided in FIG. 11A). Referring to FIG. 11C, the first over-moulding material (to form the wall part C) is injected into the injection mould 80 to fill the die cavity 85. Filling the die cavity 85, the first over-moulding material is moulded onto the bead loop and onto the exposed surface area 93 of the frame part A. As can be seen in FIG. 11D, this results in a layered structure with the frame part A and wall part C lying against each other (without bonding to each other due to the two resisting fusing with each other) and further results in forming the attachment loop 84 by fusing of the first overt moulding material (forming the wall part C) with the bead loop B2 during the step of over-moulding step of FIG. 11C.

According to a further embodiment of FIG. 11, the bead loop B2 may, in the condition of FIG. 11B and when placing it as an insert into the injection mould 80, not yet be sealingly attached to the frame part A. In this case, the bead loop may be configured to fuse with the frame part A due to the heat of the first over-moulding material injected into the die cavity 85. Further it is conceivable that the bead loop B2 is provided by over-moulding and that it fuses in a preceding second over-moulding step with the frame part when over-moulded onto the frame part (or the other way around that the bead loop B2 fuses with the frame part A when the frame part A is over-moulded onto the bead loop B2).

Figure 12:
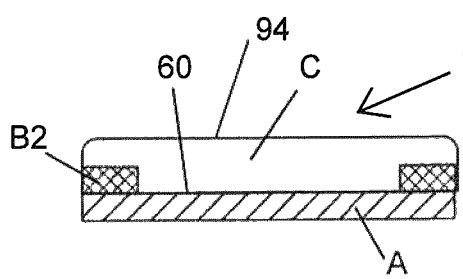
FIG. 12 shows in cross-section a variant of the pressure chamber obtained according to FIG. 11.
Figure 13:
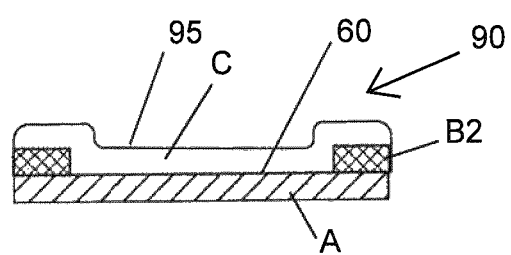
FIG. 13 shows in cross-section a further variant of the pressure chamber obtained according to FIG. 11.

FIGS. 12 and 13 show two variant of a pressure chamber 90 obtained with the method of FIG. 11. The difference in both cases with respect to the pressure chamber of FIG. 11, more specifically FIG. 11D, is that in FIGS. 12 and 13 the bead loop B2 is provided onto a surface of the frame part A rather than surrounding the frame part A. As shown in FIG. 12, the resulting wall part C may have an entirely flat surface 94 or may have a recessed part 95.

FIGS. 14-18 show examples of further elaboration of what has been shown in FIGS. 7-13, the further elaboration being the integration of bristles in the methods of manufacturing a pressure chamber 90 according to the first invention. For same or similar parts, FIGS. 14-18 use the same reference signs as in the previous figures.

Figure 14A:
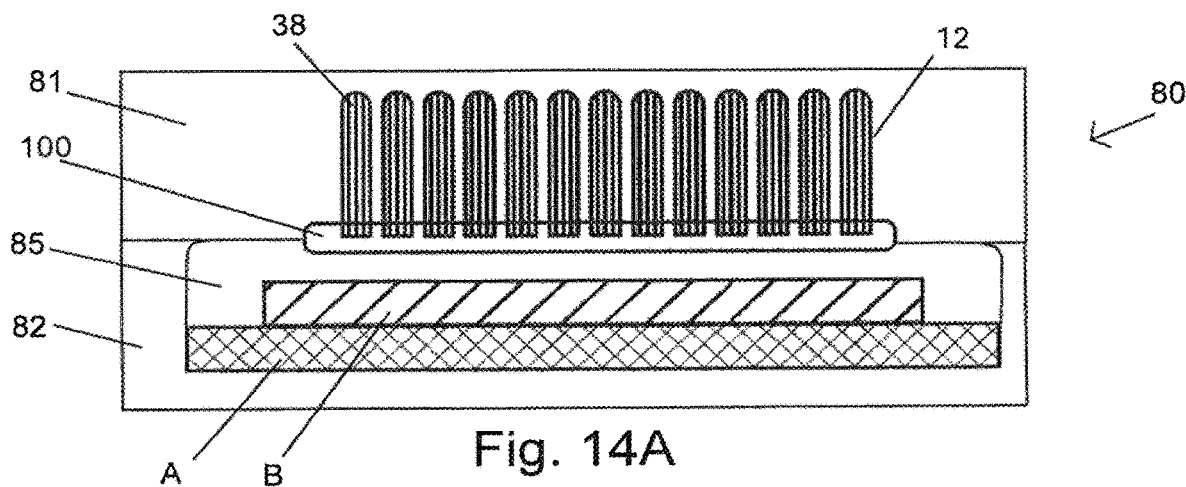
FIG. 14A shows a cross-section of an injection mould with insert ready for overmoulding.
Figure 14B:
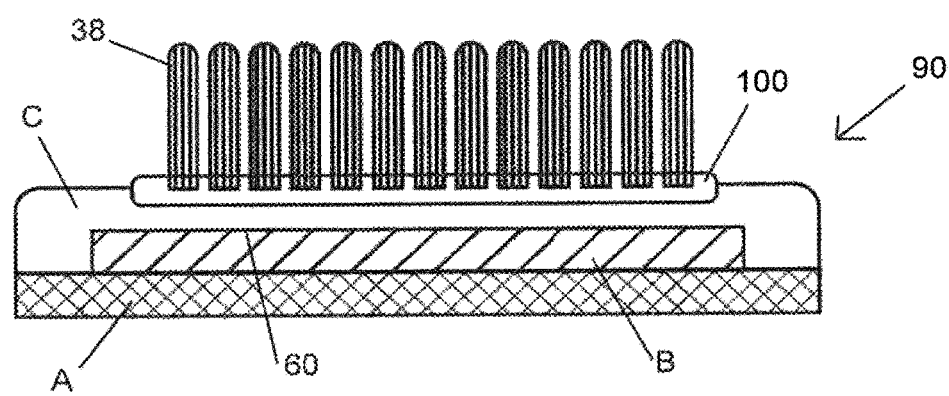
FIG. 14B shows in cross-section a pressure chamber obtained in depressurized condition.
Figure 14C:
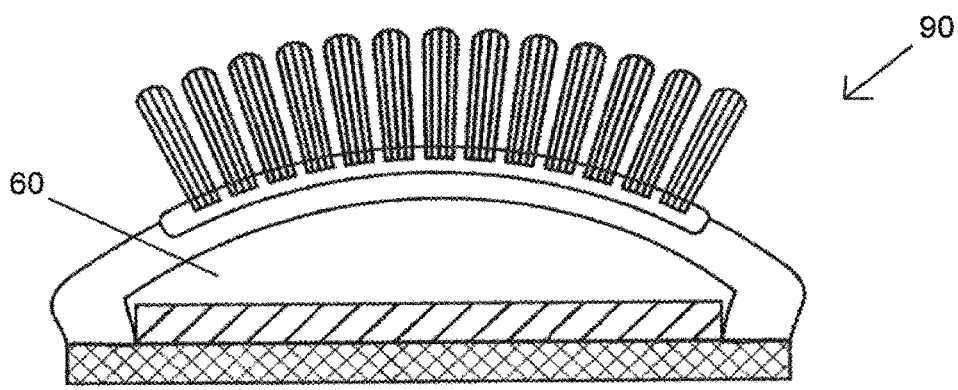
FIG. 14C shows in cross-section a pressure chamber obtained in pressurized condition.

FIG. 14 shows schematically a first example of integrating bristles 38 in the method of manufacturing a pressure chamber 90 according to the first invention. The upper half 81 of the injection mould 80 is provided with bores 120 into which pre-fabricated bristles tufts of 38 are inserted. The bristles are mounted on one common root section 100, which can be a foil onto which the tufts of bristles 38 have been attached. The root section 100 with tufts of bristles 38 form one unit, which is placed as an insert into the injection mould 80. For the rest the method as elucidated in FIG. 14 is basically the same as the method shown in FIG. 9, FIG. 14A being similar to what is shown in FIG. 9C, FIG. 14B being similar to what is shown in FIG. 9D, and FIG. 14C being similar to what is shown in FIG. 9E. When the first over-moulding material, which is to form the wall part C, is injected into the injection mould 80 to fill the die cavity 85, the root section 100 will become attached to the wall part C to be formed. This attachment of the root section 100 to the wall part C, may for example be due to the root section 100 and wall part C fusing together. It is however also possible that the attachment is due to the root section 100 becoming embedded in the wall part C. Once the pressure chamber has solidified sufficiently, it is removed from the injection mould 80, resulting in the pressure chamber 90 as shown in FIG. 14B. In e next step a pressurized medium may be introduced into the pressure cavity 60 to separate the wall part C and frame part A from each other, see FIG. 14C. As already discussed in relation to FIG. 9, the intermediate layer may be configured in several manners in order to facilitate this separation of the frame part A and wall part C.

Figure 15A:
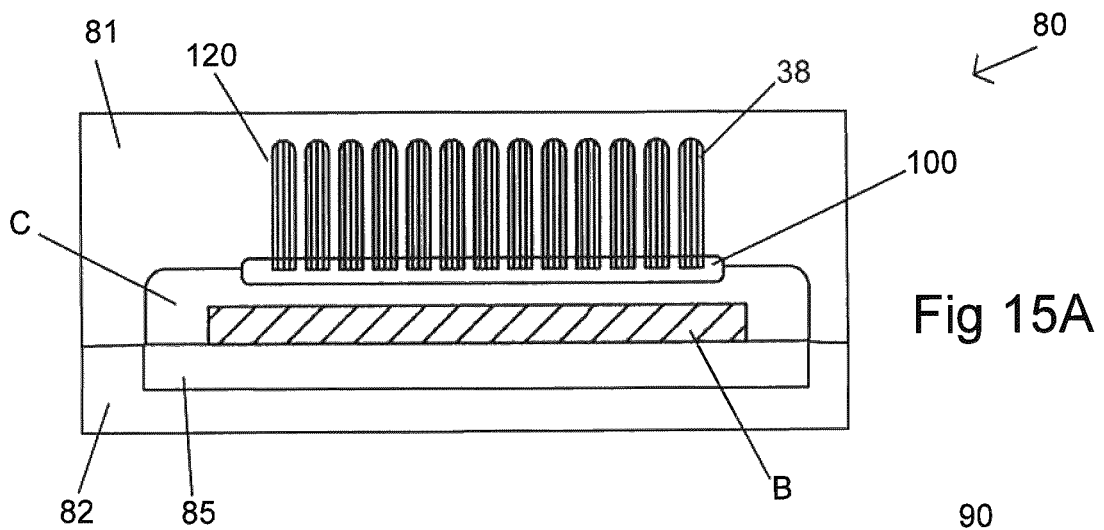
FIG. 15A shows a cross-section of an injection mould with insert ready for overmoulding.
Figure 15B:
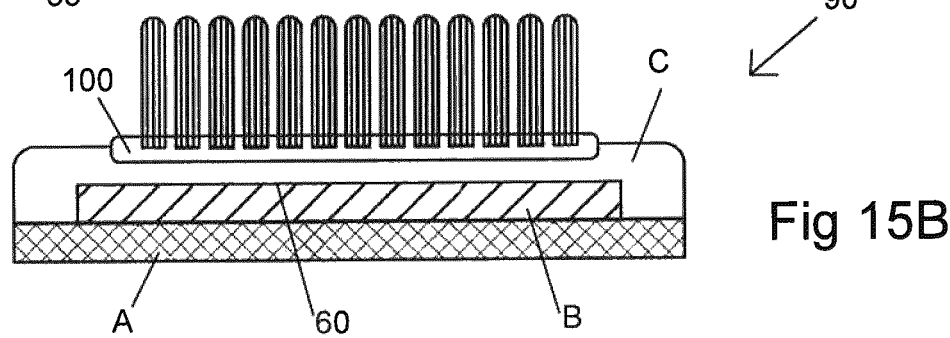
FIG. 15B shows in cross-section a pressure chamber obtained in depressurized condition.
Figure 15C:
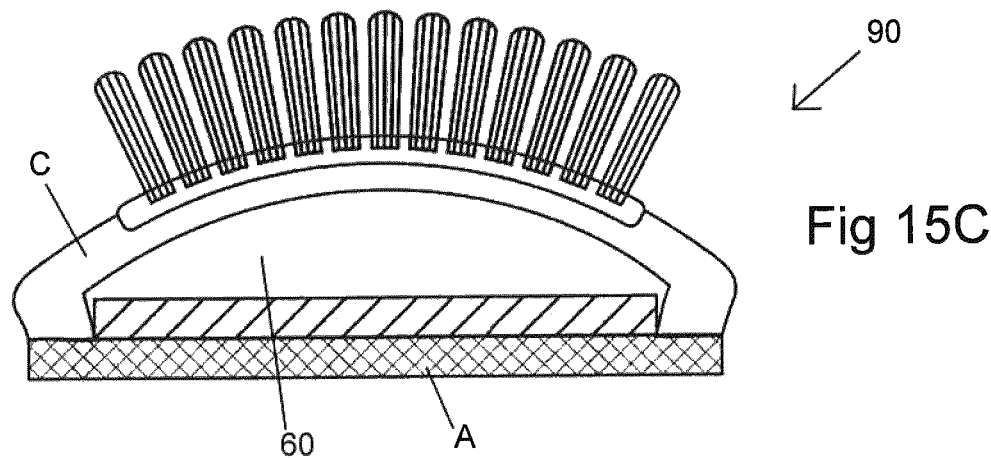
FIG. 15C shows in cross-section a pressure chamber obtained in pressurized condition.

FIG. 15 shows a variant of FIG. 14, in fact a variant which—without the bristles—has already been discussed in relation to FIG. 9. In FIG. 15, FIG. 15A is similar to FIG. 14A, FIG. 15B is similar to FIG. 14 B, and FIG. 15C is similar to FIG. 14C. The difference with FIG. 14 is basically that the prefabricated insert to be placed into the injection mould 80 comprises the wall part C, the intermediate layer B, and the root section 100 with tufts of bristles 38, and that the frame part A is over-moulded onto the wall part C and intermediate layer B by injecting, as the first over-moulding material, the material from which the frame part A is to be made into the die cavity 85. As already discussed in relation to FIG. 9, the intermediate layer may be configured in several manners in order to facilitate this separation of the frame part A and wall part C. Further, it is noted that the insert of wall part C, intermediate layer B, and root section 100 may be one single insert, but may also comprise a number of inserts. For example the root section 100 with bristles 38 may be a separate insert and may, during the step of over-moulding in the mould 80 of FIG. 15A, fuse with the wall part C due to the heat of the injected first over-moulding material.

Figure 16:
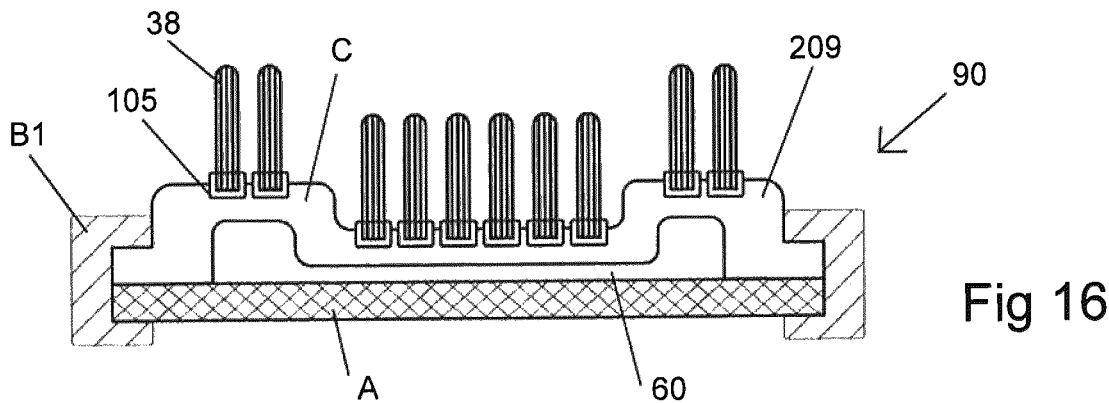
FIG. 16 shows in cross-section a further variant of a pressure chamber obtained according to the first invention.

FIG. 16 shows as a further variant of integrating bristles, a pressure chamber 90, which is except for the bristles, identical to the pressure chamber 90 of FIG. 7B. As a difference with FIGS. 14 and 15, each tuft of bristles 38 has its own separate root section 105. However, it is to be noted that also the root section 100 of FIGS. 14 and 15 may be used in the embodiment of FIG. 16, and that, the other way around, the separate root sections 105 may also be used in FIGS. 14 and/or 15 instead of the root section 100 or in addition to the root section 100. Similar as in the embodiment of FIG. 7, the wall part C is profiled. As explained in relation to FIG. 7, this profiled wall part C may have been provided as a pre-fabricated profiled wall part by for example injection moulding or thermoforming. As explained in relation to FIG. 8, the profiled shape may also be obtained by thermoforming after the pressure chamber has been manufactured.

Figure 17:
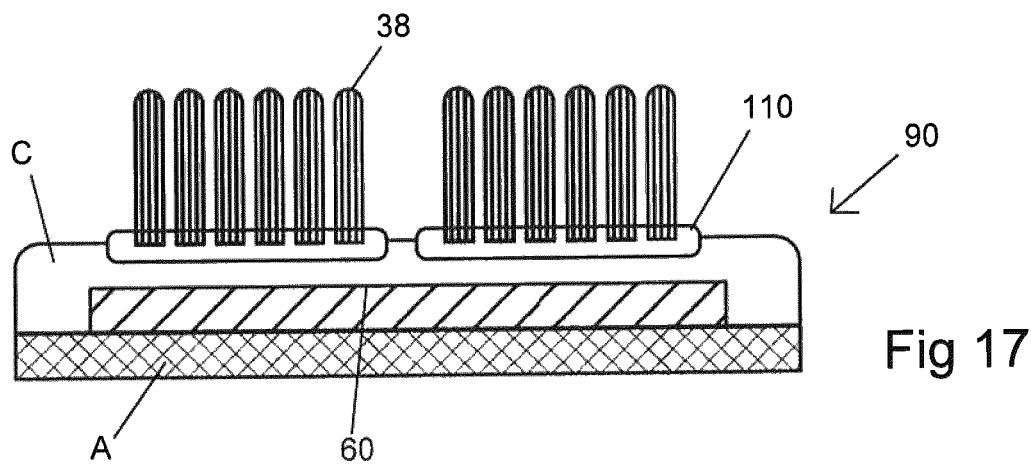
FIG. 17 shows in cross-section another further variant of a pressure chamber obtained according to the first invention.

FIG. 17 shows as a further variant of integrating bristles, a pressure chamber 90, which is except for the bristles, identical to the pressure chamber 90 of FIG. 8A. As a difference with FIGS. 14-16, groups of multiple tufts of bristles 38 have been attached to multiple root sections 110 (only two root sections 110 being shown in FIG. 17. However, it is to be noted that also the root section 100 of FIGS. 14 and 15 and/or the root sections 105 may be used in the embodiment of FIG. 17, and that, the other way around, the root sections 110 may also be used in FIGS. 14 and/or 15 and/or 16 instead of or in addition to root section 100 and/or root sections 105.

Figure 18:
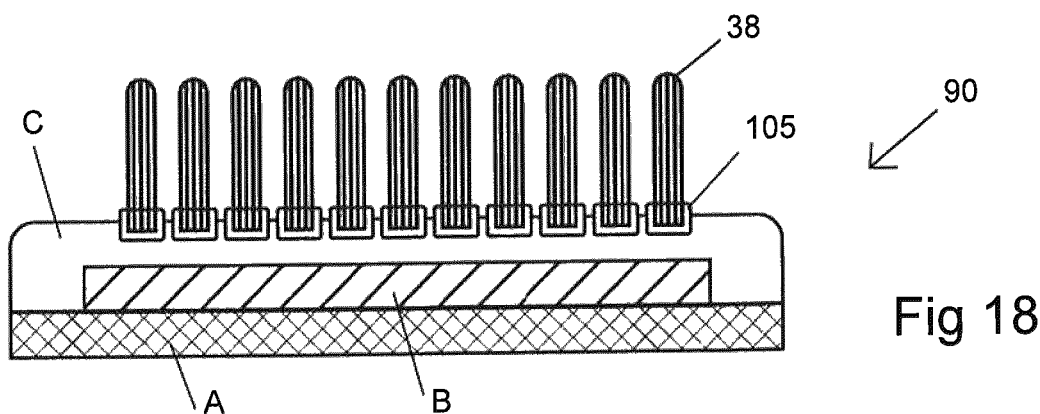
FIG. 18 shows in cross-section still another further variant of a pressure chamber obtained according to the first invention.

FIG. 18 shows as a further variant of integrating bristles, a pressure chamber 90, which is except for the bristles, identical to the pressure chamber 90 of FIG. 8A and FIG. 17. In FIG. 18, the root sections are separate root sections 105, one root section 105 for each tuft of bristles 38.

FIGS. 19-29 show examples of further elaborations of what has been shown in FIGS. 7-13, the further elaborations being the translation of the method of manufacturing a brushing chamber for a mouthpiece to manufacturing a complete mouthpiece with one or more pressure chambers manufactured according to the first aspect of the first invention. For same or similar parts, FIGS. 19-29 use the same reference signs as in the previous figures.

FIG. 19 shows schematically and steps wise a method of manufacturing a mouthpiece according to the first invention. FIG. 19A shows as a first step providing the wall part C as pre-fabricated part. FIG. 19B shows as a second step providing the frame part A as a pre-fabricated part and assembling together the pre-fabricated frame part A and pre-fabricated wall part C. The assembling together is facilitated by the hook 120 formed at the upper edges and lower edges of the upper wall part respectively lower wall part. These hooks 120 are hooked around the upper edges 121 of the frame part and lower edges of the frame part. This hooking around is further facilitated by the flexibility of the wall parts C. In a next step the thus obtained assembled unit is placed as a single insert in an injection mould (not shown). The injection mould and the insert—of FIG. 19B-together define a die cavity at the location where the layer B is shown in FIG. 19C. Subsequently the layer B is over-moulded onto the outside of the frame part A by injecting the material for layer B into the injection mould. During the step of over-moulding, the layer B fuses at the attachment loop 84 with the wall material C and optionally with the outer surface 128 of the frame part as well. This results in the mouthpiece-shown in cross-section transverse to the curved length axis z (see FIG. 1)—of FIGS. 19C (in depressurized condition) and 19D (in pressurized condition) having a pressure chamber 90 with pressure cavity.

FIG. 20 shows schematically and steps wise another method of manufacturing a mouthpiece according to the first invention. FIG. 20A shows as a first step providing a frame part A, with—transverse to the curved length direction of axis Z in FIG. 1—an H-shaped cross-section. In a second step, shown in FIG. 20 B, an intermediate layer B is provided on the inner surfaces of the H-shaped cross section. In this example, the intermediate layer B is adhered to, bonded to, or fused with the inner surface 129 of the frame part A. In a next step, the unit of A and B as shown in FIG. 20B is placed as an insert into an injection mould (not shown), defining together with the injection mould a die cavity for receiving the material which is to be over-moulded onto the intermediate layer and upper and lower edges of the H-shaped frame part A to provide the wall part C, resulting in the mouthpiece—shown in cross-section transverse to the curved length axis z (see FIG. 1)—of FIG. 20C. As the intermediate layer B does not adhere or bond to the wall part C, the pressure chamber can be pressurized to a condition similar as shown in FIG. 19D. The difference with FIG. 19D being however, that in FIG. 19D it is one pressure chamber for the upper part and lower part of the mouthpiece, whilst in the embodiment of FIG. 20C the frame part A has a horizontal part extending between two pressure chambers or through a single pressure chamber.

FIG. 21 shows schematically and steps wise another method of manufacturing a mouthpiece according to the first invention. FIG. 21A shows as a first step providing a frame part A, with—transverse to the curved length direction of axis Z in FIG. 1—an H-shaped cross-section. In a second step, shown in FIG. 21B, a layer B is provided on the outer surfaces 130 of the H-shaped cross section. The layer B projects at 124 from the H-shaped frame part A to provide a bead loop B2. In a next step, the unit of A and B as shown in FIG. 21B is placed as an insert into an injection mould (not shown), defining together with the injection mould a die cavity for receiving the material which is to be over-moulded onto the inner surface 129 of the H-shaped frame part and the bead loop B2. Because in this embodiment the over-moulded material providing the wall part C does not adhere to or bond with the frame part A and fuses with the bead loop B2 an attachment loop 84 is obtained, which together with the frame part A and wall part C encloses an upper pressure chamber and a lower pressure chamber, which may effectively be one pressure chamber in case they are in fluid connection with each other. The pressure chamber 90 of FIG. 21 can be pressurized to a condition similar as shown in FIG. 19D. The difference with FIG. 19D being however, that in FIG. 19D it is one pressure chamber for the upper part and lower part of the mouthpiece, whilst in the embodiment of FIG. 21C the frame part A has a horizontal part extending between two pressure chambers or through a single pressure chamber.

FIG. 22 shows as an example a further mouthpiece with an upper and lower pressure chamber 90. This example shows two variants of mechanically attaching the intermediate layer B to the H-shaped frame part A, in a manner similar as has been shown in FIG. 10, see the earlier elucidation of FIG. 10.

FIGS. 23-26 show four examples of how the wall part C in the upper part of the mouthpiece can be attached to the wall part C in the lower part of the mouthpiece, and FIG. 23 shows an example of how these wall parts can be kept unconnected. The FIGS. 23A, 24A, 25A and 26A show the mouthpiece in depressurized condition and the FIGS. 23B, 24B, 25B and 26B show the mouthpiece in pressurized condition.

As FIG. 23 shows, separation of the upper wall part C and lower wall part C may be obtained by means of an intermediate member B with H-shaped cross-section.

As FIG. 24 shows, the upper wall part C and lower wall part C may be attached to each other by means of a passage 127 in the horizontal part of the H-shaped intermediate member.

As FIG. 25 shows, the upper wall part C and lower wall part C may, in case of frame part A with H-shaped cross-section be attached to each other by means of a passage 128 in the horizontal part of the U-shaped intermediate members B.

As FIG. 26 shows, it is also possible that (locally) there is no horizontal connection between the facial side and lingual side of the mouthpiece. In this case thee may be one lingual pressure chamber for both the upper part of the mouthpiece, as well as one facial pressure chamber for both the upper part of the mouthpiece.

Figure 27:
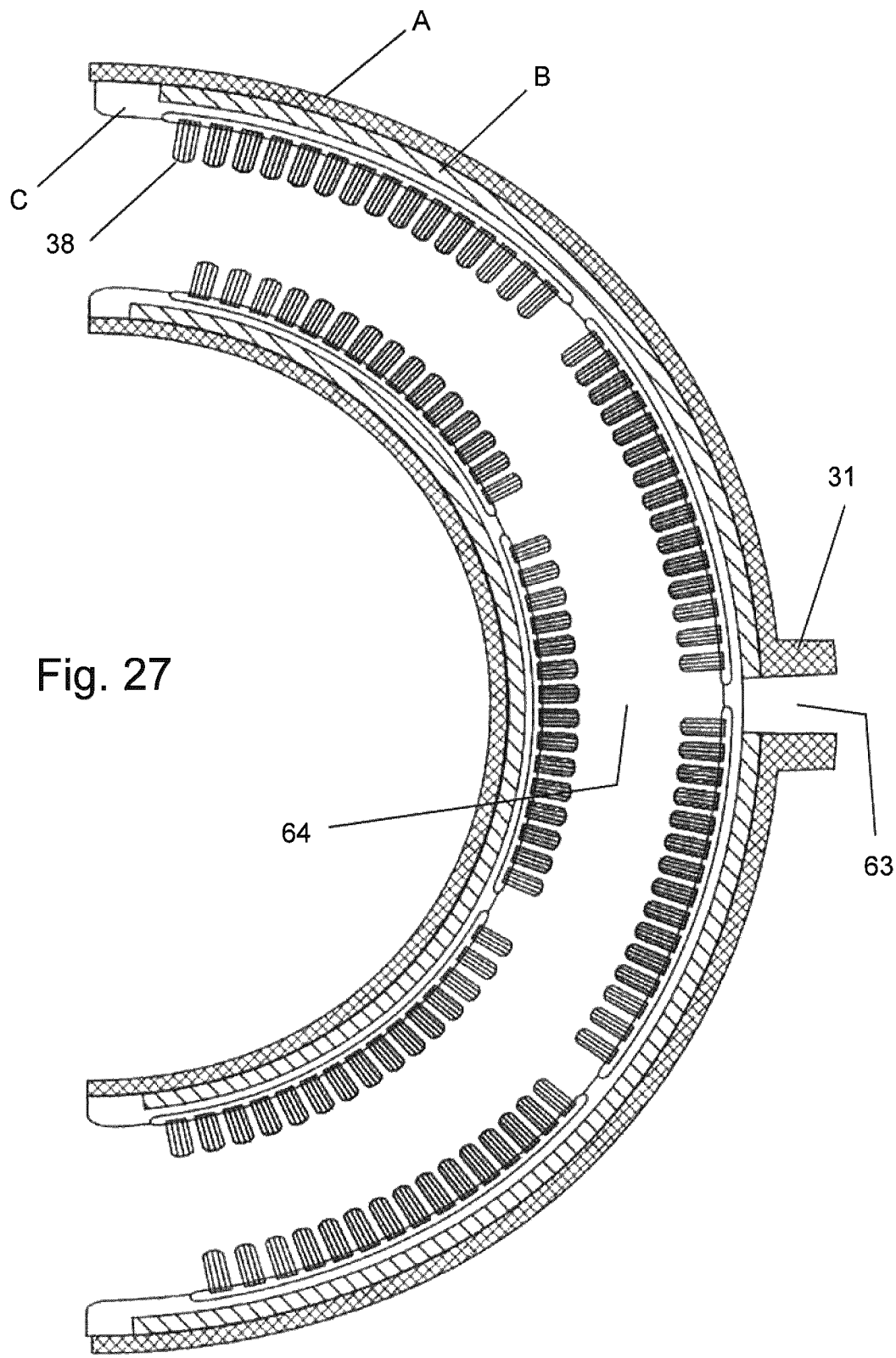
FIG. 27 shows a horizontal top view of a mouthpiece according to the first invention.

FIG. 27 shows in schematic top view a U-shaped mouthpiece with one or more pressure chambers made with the method according to the first aspect of the first invention. The mouthpiece is shown in depressurized condition.

Now turning to FIGS. 28 to 38, the method according to the second invention for manufacturing a mouthpiece will be elucidated. It is however to be noted that a step of this method according to the second invention may by the method according to the first invention, and that a mouthpiece manufactured with the method according to the second invention, may be a mouthpiece according to the third invention.

Figure 30A:
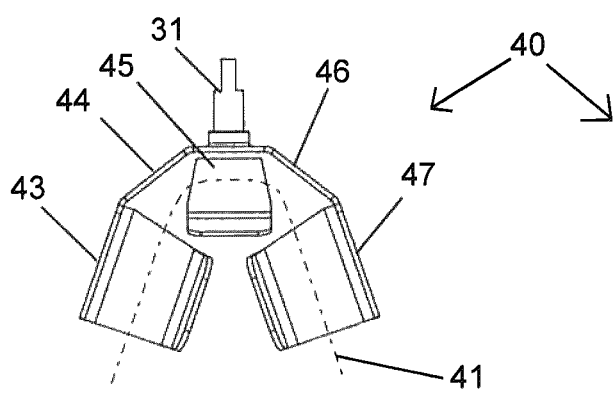
FIG. 30 visualizes the bending step of the second invention, FIG. 30A showing a top view and FIG. 30B showing a perspective view.
Figure 30B:
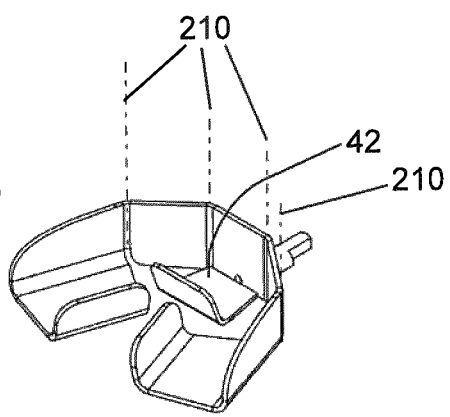
Figure 31:
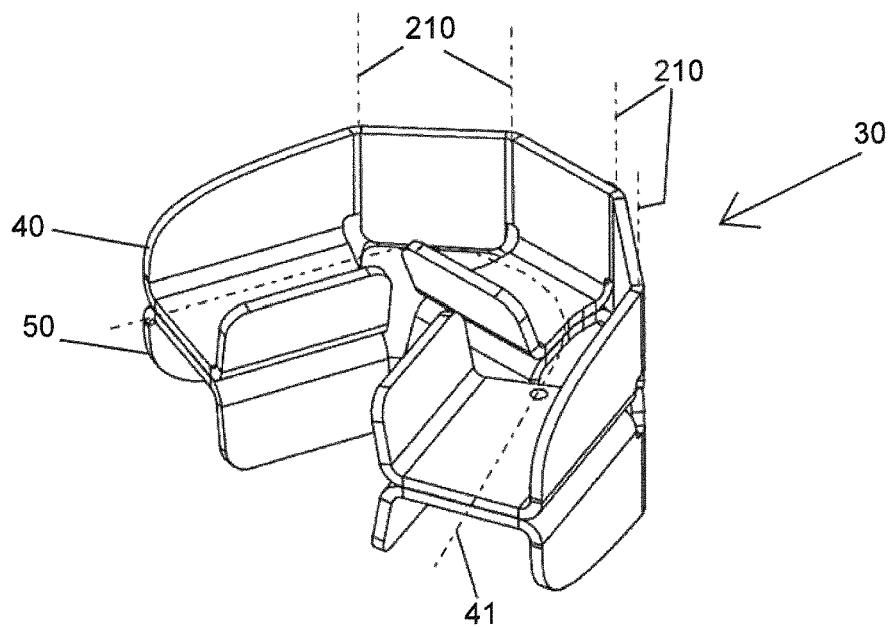
FIG. 31 visualizes the step of combining an upper mouthpiece part and a lower mouthpiece part in the second invention.
Figure 32:
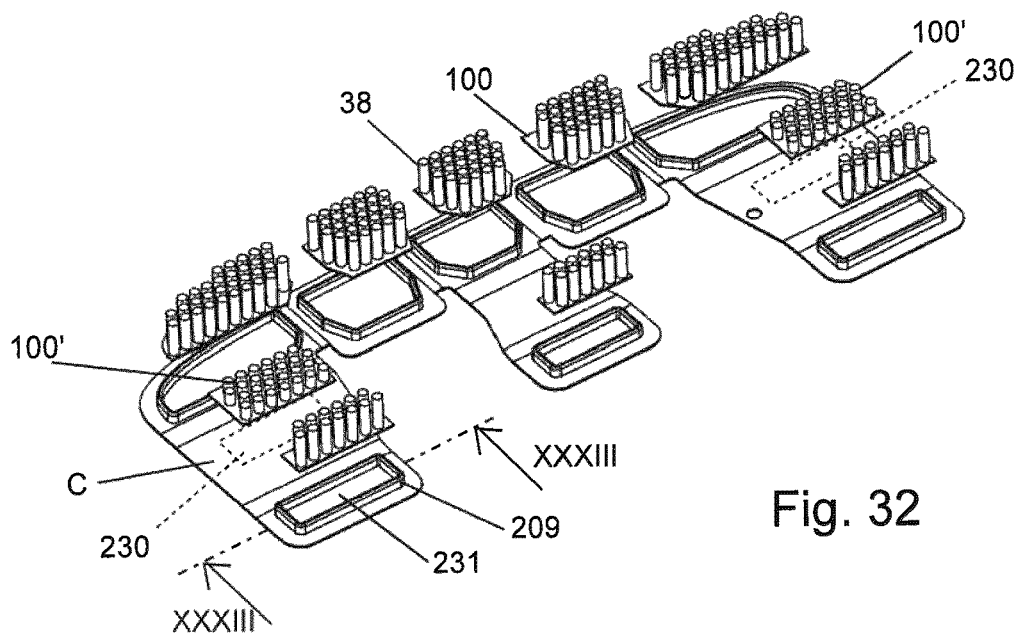
FIG. 32 schematically shows an exploded view in perspective of a flexible wall provided with bristles.
Figure 33:
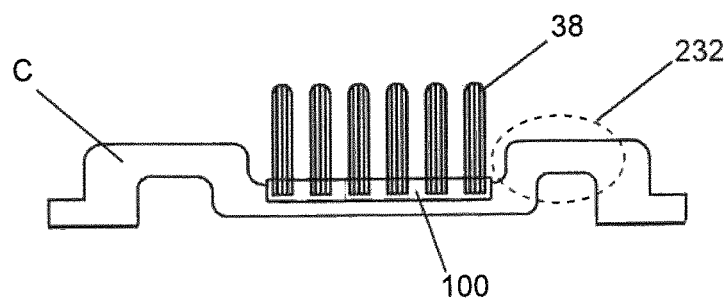
FIG. 33 schematically shows in cross-section a detail of FIG. 32.

FIGS. 28 to 31 illustrates several steps in the manufacturing of a first embodiment of a mouthpiece according to the method of the second invention. In FIGS. 28-31, the pressure chamber manufacturing step has however been omitted in order to avoid the drawing from becoming unclear due to many details. FIGS. 32-33 show schematically a flexible wall with bristles as has been omitted from FIGS. 28-32. Subsequently, FIGS. 34-35 show several steps in the manufacturing of the same first embodiment of the mouthpiece as in FIGS. 28-31, however now with incorporation of the pressure chamber manufacturing step. FIGS. 28-35 all relate to manufacturing the same first embodiment of the mouthpiece. Subsequently FIGS. 36-38 show a second, third and fourth embodiment of a mouthpiece which can be manufactures according to the second invention.

The mouthpiece manufactured as indicated in the FIGS. 28-35 corresponds to the mouthpiece as shown in FIG. 2. Therefore, for corresponding parts FIGS. 28-35 use the same references as have been used in FIG. 2.

Figure 28A:
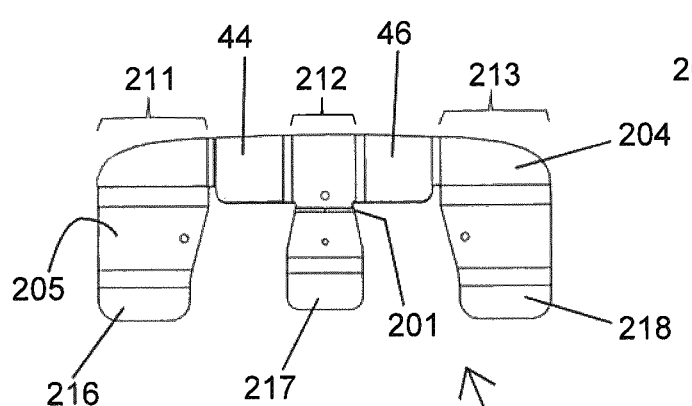
FIG. 28 visualizes the frame part providing step of the second invention, FIG. 28A showing the frame part provided a top view and FIG. 28B showing the frame part provided in perspective view.
Figure 28B:
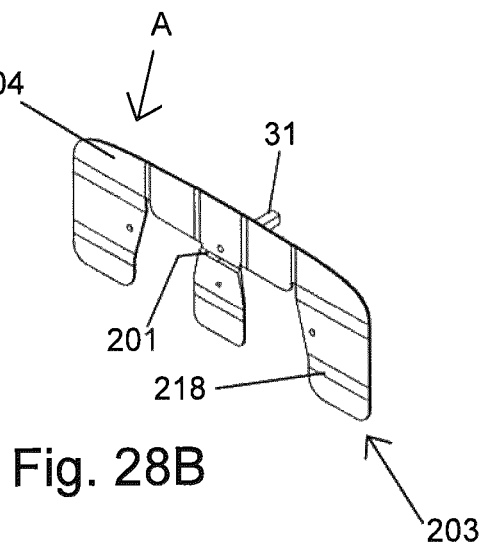

FIG. 28 represents the 'frame part providing step', in which FIG. 28A shows a top view and FIG. 28B shows a perspective view. As can be seen in FIGS. 28A, 28B a plate shaped part 203 is provided. This plate shaped frame part 203 is defined by an elongate member 204, which as at—in this embodiment-three spaced trough areas 211, 212 and 213 a set 216, 217, 218 of side members, projecting transverse from the elongate member. For clarity of illustration, the elongate member 204 has been colored grey in FIG. 28A, whilst the side members are colored white. The trough areas 211, 212 and 213 are spaced by links 44 and 46.

As can be seen in FIG. 28, the plate shaped frame part 203 is in FIG. 28 a sheet condition. The plate shaped frame part 203 is in FIG. 28 an essentially flat 2-dimensional part. In the example of FIG. 28 the plate shaped part 203 is essentially extending in a plane spanned by two straight perpendicular axes, however it is to be noted that the plate shaped part may, in sheet condition, also be curved or have a profiling, like a zig-zag profiling, as is the case in FIG. 28 at the transition 201 from the elongate part to the side part.

In the embodiment of FIGS. 28-35, the side members are single flaps attached all attached to the same longitudinal side of the elongate member 204.

Figure 51B:
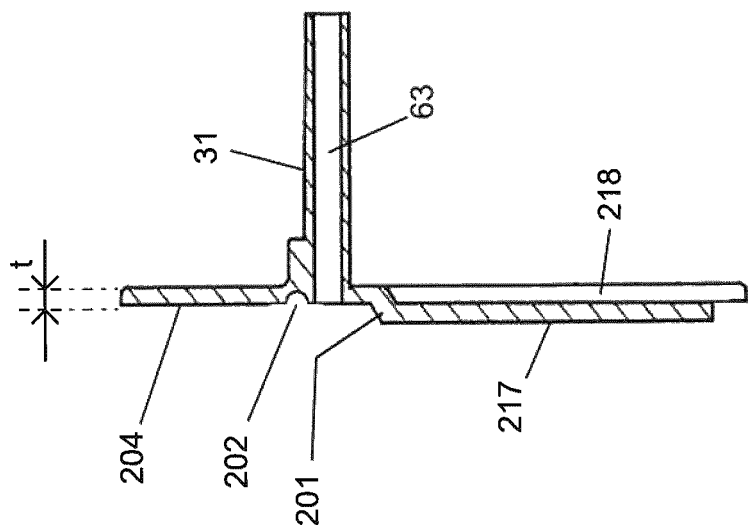
FIG. 51B is the cross section LI-LI as indicated with arrows and dashed line in FIG. 51A.
Figure 51A:
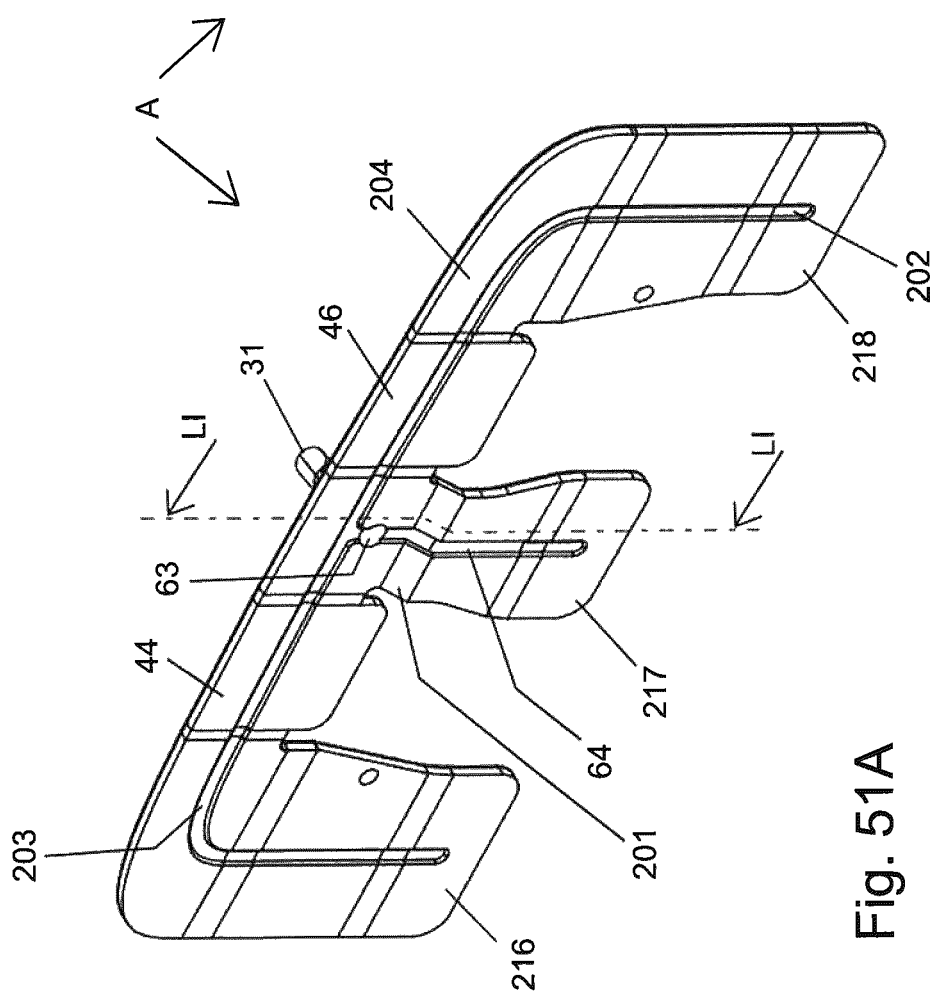
FIG. 51A is a perspective view similar to FIG. 28B.

Before continuing with explaining the folding step in relation to FIG. 29, as an intermediate thing reference is made to FIG. 51. FIG. 51A shows a perspective view similar to the one of FIG. 28B and FIG. 51B shows a cross-section in the direction of arrows LI of the part indicated with the dashed line indicated by the arrows LI. As can be seen better in FIG. 51 than in FIG. 28, the plate shaped part C may be profiled. For example the plate shaped part may have at the transition 201 a Z-shape to offset the side member 217 with respect to the side members 218 and 216. This offset is in FIG. 51 about the thickness t of the plate shaped part, but may also be less or more, for examples up to 2-3 times the thickness t. Further, as can be seen in FIG. 51, the plate shaped part may have grooves 64, 202 (or not shown ribs). The groove 64 is connected to the channel 63 in the handle coupling. Also the U-shaped groove 202 is connected to the channel 63 in the handle coupling. Once the pressure chamber is formed—i.e. once the wall part C is attached—to the frame part A (as explained further below in relation to FIGS. 32-34), the grooves 64, 202 serve as channels providing fluid communication between the channel 63 and the pressure cavities 60 of the pressure chambers 90.

Figure 29A:
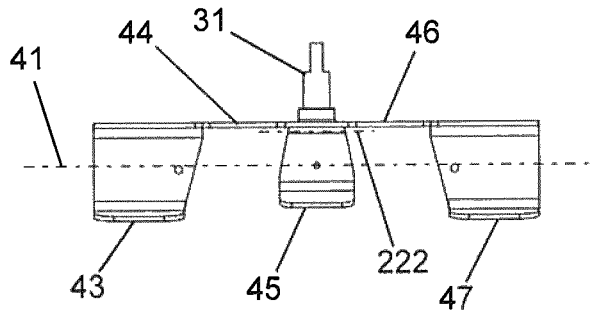
FIG. 29 visualizes the folding step of the second invention, FIG. 29A showing a top view, FIG. 29B showing a perspective view, and FIG. 29C showing a side view.
Figure 29B:
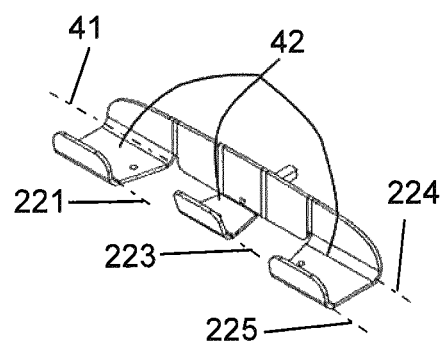
Figure 29C:
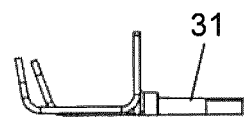

FIG. 29 represents the 'folding step'. In the folding step, the plate shaped frame part is folded from the sheet condition to a folded condition. FIG. 29A shows a top view of the plate shaped frame part in folded condition, FIG. 29B shows a perspective view on the plate shaped part in folded condition, and FIG. 29C shows a side view of the plate shaped frame part in folded condition.

In the folding step, the side members 216, 217 and 218 are folded around folding axes 220-225. These folding axes 220-225 are about parallel to the length direction of the elongate member 204. This length direction is viewed along the axis 41 as is shown in FIG. 29A. In this folding step each side member 216, 217, 218 is folded to a trough section 43, 45 and 47, respectively. The trough sections 216, 217 and 218 are aligned along the length axis 41 to define a trough system 42 of aligned trough sections 43-45.

The resulting trough system of FIG. 29 is essentially straight. This may be no problem in case the mouthpiece is relatively short and used for essentially the posterior teeth, but in case the mouthpiece is to be used for anterior teeth or posterior and anterior teeth, it is to be brought into a J-shaped or U-shaped configuration. To bring the mouthpiece into the J-shaped or U-shaped configuration, may be subjected to a 'bending step'.

This 'bending step' is represented in FIG. 30, in which FIG. 30A a shows a top view into the trough system 42 of bended upper part 40 of the mouthpiece, and in which FIG. 30B shows a perspective view onto the bended upper part of the mouthpiece.

In the bending step, the elongate member 204 is bended around one or more bending axes—FIG. 30B shows four of these bending axes—, which extend transverse to the length direction 41 of the elongate member 204 in a direction and which is about vertical when the mouthpiece is in use. This brings the elongate member 204, depending on the type of mouthpiece to be made, in a J-shaped or U-shaped condition. This bending may start from, viewed with respect to the length direction 41, a straight condition as is shown in FIG. 28, but it may also start from a slightly curved condition. The 'bending step' as represented in FIG. 30 may also take place before the 'folding step' as represented in FIG. 29.

In case a mouthpiece is desired for simultaneously treating upper teeth and lower teeth, the mouthpiece (part) 40 of FIG. 30 is to be combined with another similar mouthpiece part. This step is represented in FIG. 31, where an upper mouthpiece part 40 and lower mouthpiece part 50 are attached to each other to form a so called U-shaped full mouthpiece.

The hinge axes 210, used also in the bending step, may be permanent flexible to allow the mouthpiece 30 to flex in a horizontal plane with respect to the horizontal curved length axis 41, as is the subject of the third invention.

FIGS. 32-33 show schematically a flexible wall with bristles as has been omitted from FIGS. 28-32. FIG. 32 shows an exploded view in perspective, and FIG. 33 shows the cross-section as has been indicated in FIG. 32 with arrows XXXIII. Taking into account the resemblance with for examples FIGS. 7 and 16 in relation to the first invention, FIGS. 32-333 use for similar parts similar references as have been used in in relation to FIGS. 7-27.

FIG. 32 shows in exploded view a wall part C, such as a flexible wall part, on the one hand, and root sections 100, 100' provided with tufts of bristles 38, on the other hand. Although the root sections 100' are basically not different from the root sections 100, they have a slightly different reference because their pressure chambers 90 formed are slightly different. The difference being, that the two root sections 100' are attached in zones 231—similar as shown in FIGS. 8, 9, 10, 11, 14, 15, 17, 18 onto the wall part C and that the other root sections 100 are attached in bordered zones 231 onto the wall part, similar as in FIGS. 7 and 16. As explained in relation to FIGS. 7, 8, and 16, the 'border' around the zones 231 may be a profile 209 configured to unfold when the pressure cavity is pressurized, and (optionally) to fold up when the pressure cavity is depressurized. As explained in relation to FIGS. 7, 8 and 16, this profile may be obtained by injection moulding or thermoforming. The root sections 100' are located in the bottom parts of the trough sections to be formed. The root sections 100 are located on the side walls of the trough sections to be formed. The bend sections 232—see FIG. 33—provide the wall parts C some additional flexibility when being pressurized and depressurized for moving the bristles to and fro.

As can be seen in FIG. 32 the wall part C has essential the same shape and size as the frame part A shown in FIG. 28 and FIG. 51. Further it is noted that the attachment of the root sections 100, 100' to the wall part C can basically be accomplished in any manner, such as one of the manners already described or to be described in this application. The root sections may for example be attached to the wall part C by means of an adhesive, by fusing with the wall part C, by being embedded in the wall part C, etcetera.

Referring now to FIG. 34, it is noted that the root sections 100, 105 with tufts of bristles are not shown for clarity reasons.

Figure 34A:
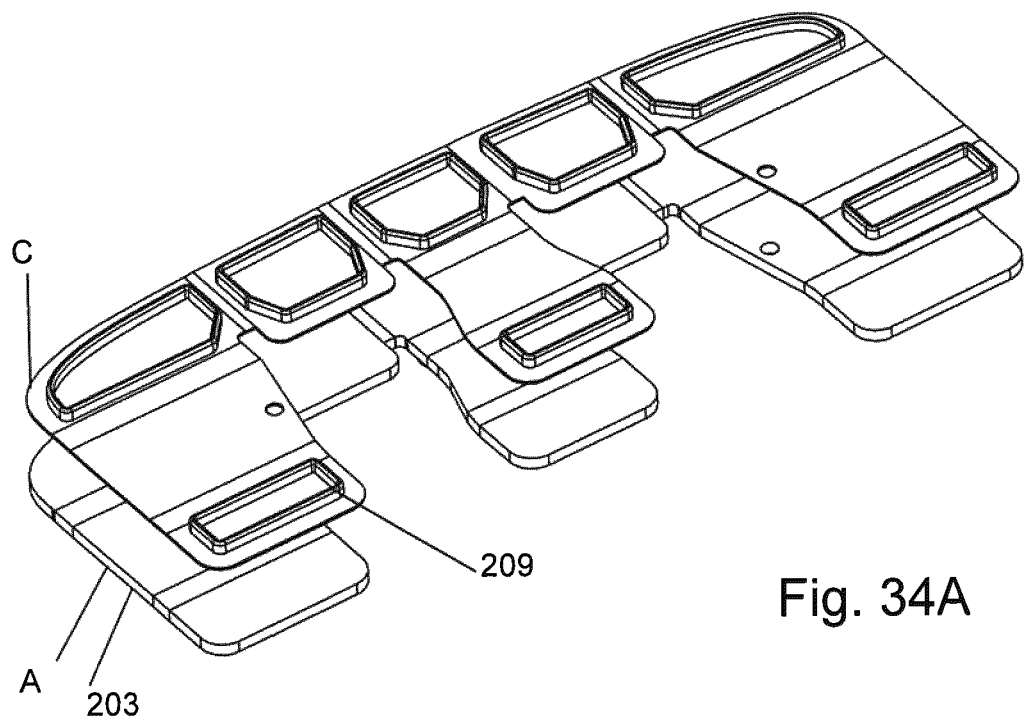
FIG. 34 visualizes the pressure chamber manufacturing step of the second invention, FIG. 34A showing the providing of the fame part and wall part, and FIG. 34B showing the frame part and wall part attached to each other, FIG. 34C visualizing the folding step, FIG. 34D visualizing the bending step, FIG. 34E visualizing the step of combining an upper mouthpiece part and lower mouthpiece part.
Figure 34B:
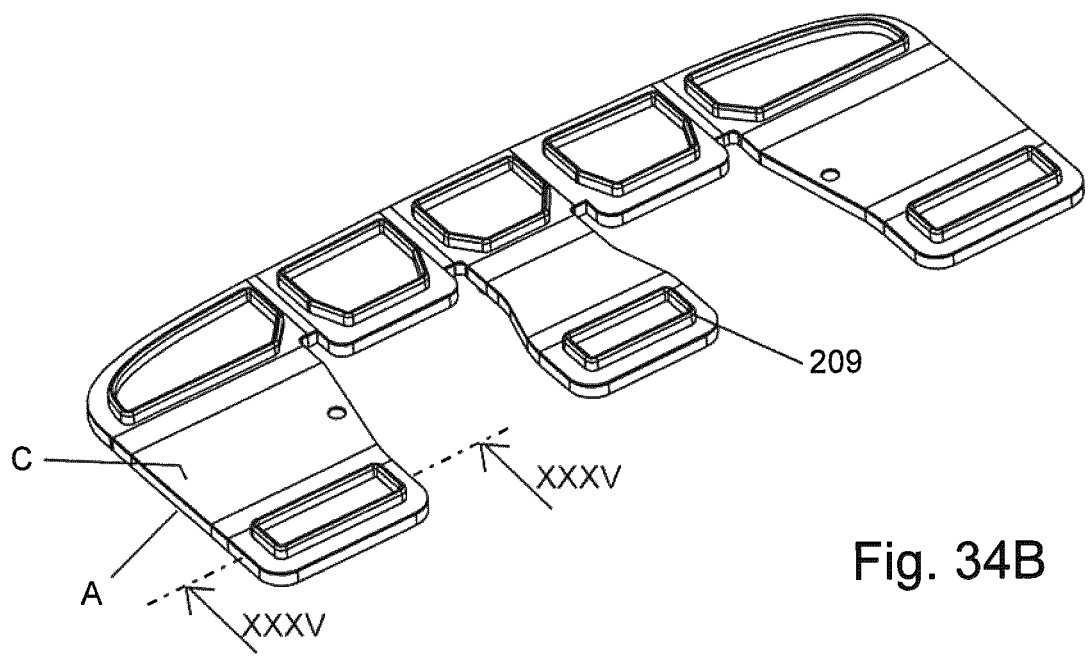
Figure 35:
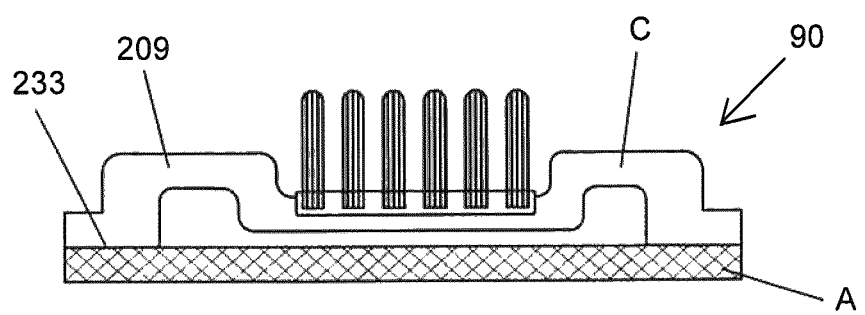
FIG. 35 schematically shows in cross-section a detail of FIG. 34B.
Figure 36:
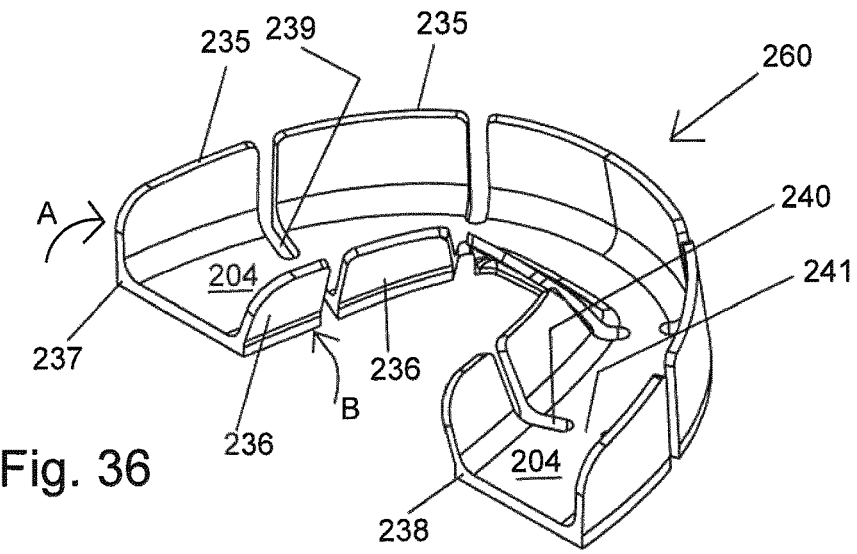
FIG. 36 schematically shows in perspective view a second embodiment of a mouthpiece obtainable with the method according to the second invention.

FIGS. 34A and 34B and FIG. 35 show the 'pressure chamber manufacturing step' of the method according to the second invention. As will be clear this 'pressure manufacturing step' can be done with any embodiment of the method according to the first invention, using an over-moulding step.

FIG. 34A shows the frame part C/plate shaped frame part 203, in a substantially flat sheet condition, with the—in this example profiled—wall part C a little above it. Although this suggest—as may very well the case—that the frame part A/203 and wall part C are both pre-fabricated parts, it is noted that FIG. 34A is primarily intended to visualize the steps of providing a frame part and providing a wall part as are part of the method according to the first invention. The frame part A or wall part C may very well be provided by over-moulding the one over the other, as has been described and elucidated in relation to the first invention. FIG. 34B shows the assembled unit of frame part A and wall part C. As said the frame part A and C may be attached to each other in any manner as has been described in relation to the first invention and FIGS. 7-27, but the frame part A and wall part C may also be pre-fabricated parts attached to each other by welding them in the contact zone 233, see the cross-section of FIG. 35, indicated by arrows XXXV in FIG. 34B. As explained in relation to FIG. 8, the profile 209 may also be obtained, for example by thermos forming, after the pressure chamber has been manufactured.

Figure 34C:
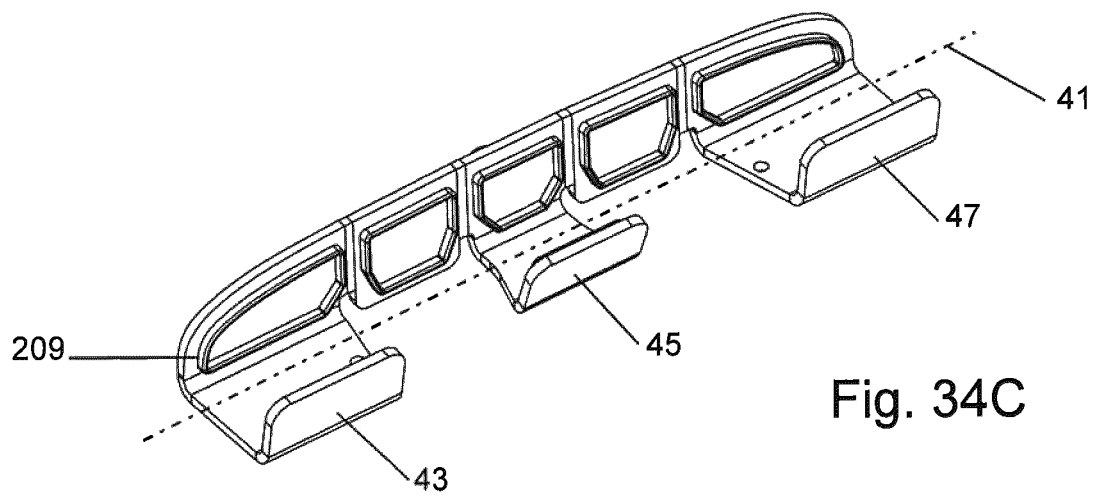
Figure 34D:
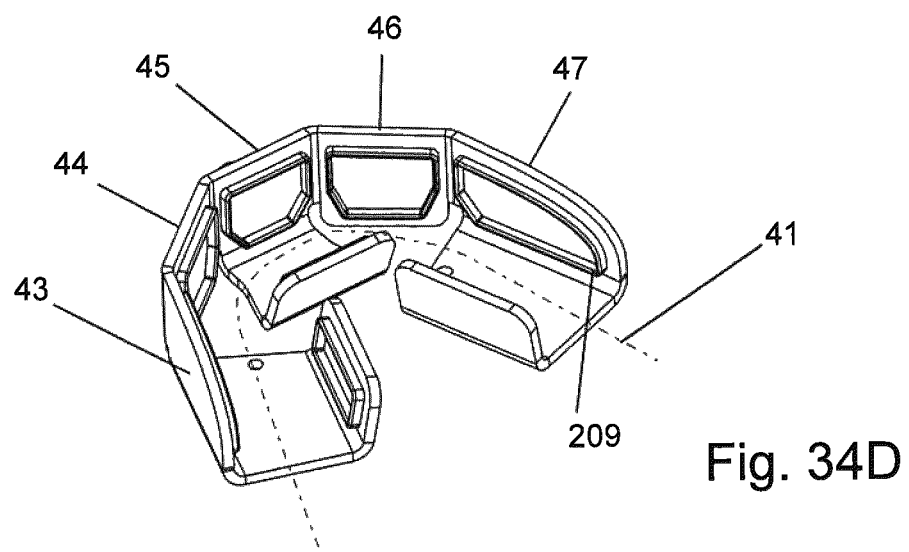
Figure 34E:
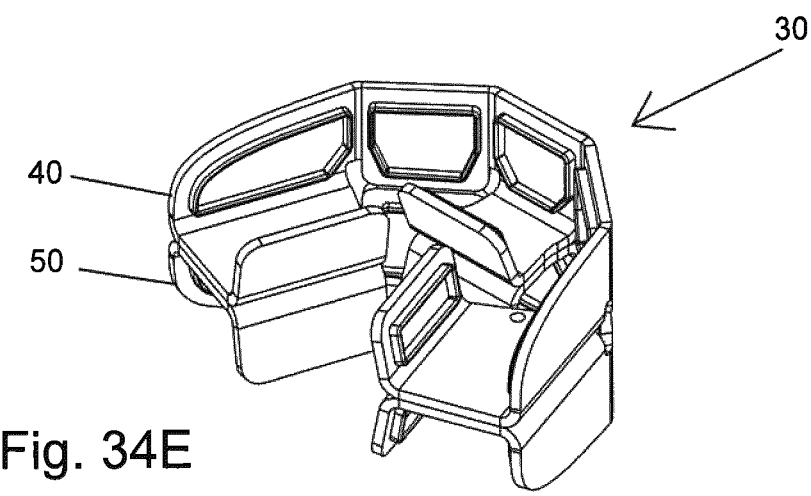

FIG. 34B is so to say the equivalent of FIG. 28, however now with pressure chambers. Similarly FIG. 34C is the equivalent of FIG. 29, FIG. 34D is the equivalent of FIG. 30, and FIG. 34E is the equivalent of FIG. 31.

FIG. 36 shows in perspective view, and, like in FIGS. 28-31, for clarity reasons without showing the pressure chambers and bristles, a second embodiment of a mouthpiece 260 obtainable with the method according to the second invention. In this embodiment the elongate member 204 is U-shaped (or J-shaped in case of a shorter mouthpiece), the five sets of side members each comprise a first side flap 235 attached to the first U-shaped (or J-shaped) longitudinal side 237 of the elongate member 204, and a second side flap 236 attached to the opposing second U-shaped (or J-shaped) longitudinal side 238 of the elongate member. The first side flaps 235 have been bended according to arrow A from a flat position to an upright position, and the second side flaps 235 have been bended according to arrow B from a flat position to an upright position. The elongate member 204 has between adjacent trough sections two incisions 239 and 240 from the first longitudinal side 237 respectively the second longitudinal side 240, which end at a distance from each other to leave in between the incisions 239, 240 a flexible link 241 allowing the mouthpiece 260 to flex in a horizontal plane relative to the horizontal, curved length axis 41, as is the subject of the third invention. In case both the upper teeth and lower teeth are to be treated simultaneously, two mouthpieces 260 may be combined as has been explained in relation to FIGS. 31 and 34E.

Figure 37A:
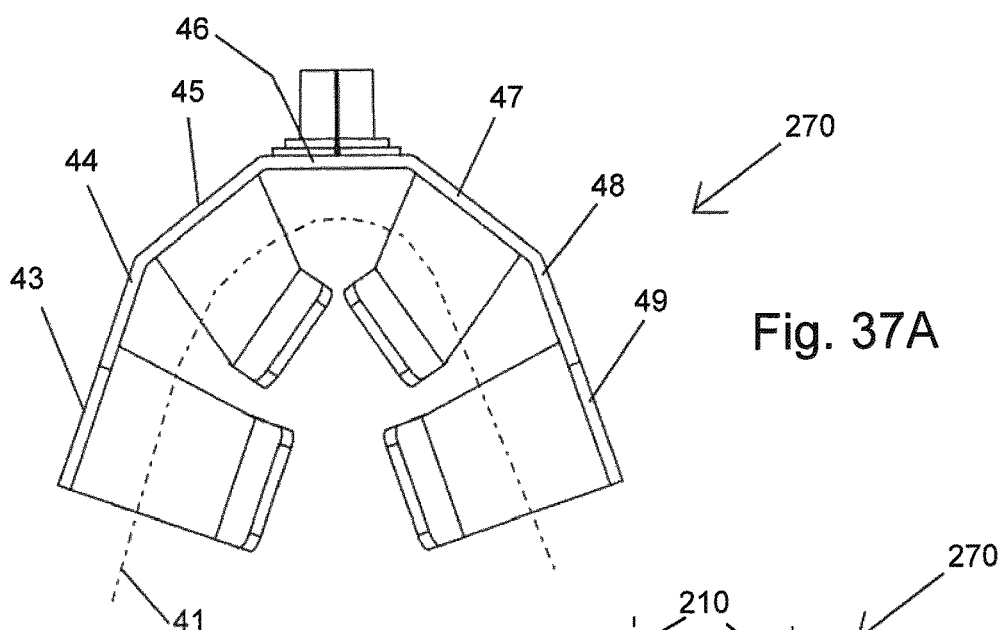
FIG. 37 schematically shows in perspective view a third embodiment of a mouthpiece obtainable with the method according to the second invention, FIG. 37A showing a top view, and FIG. 37B showing a perspective view.
Figure 37B:
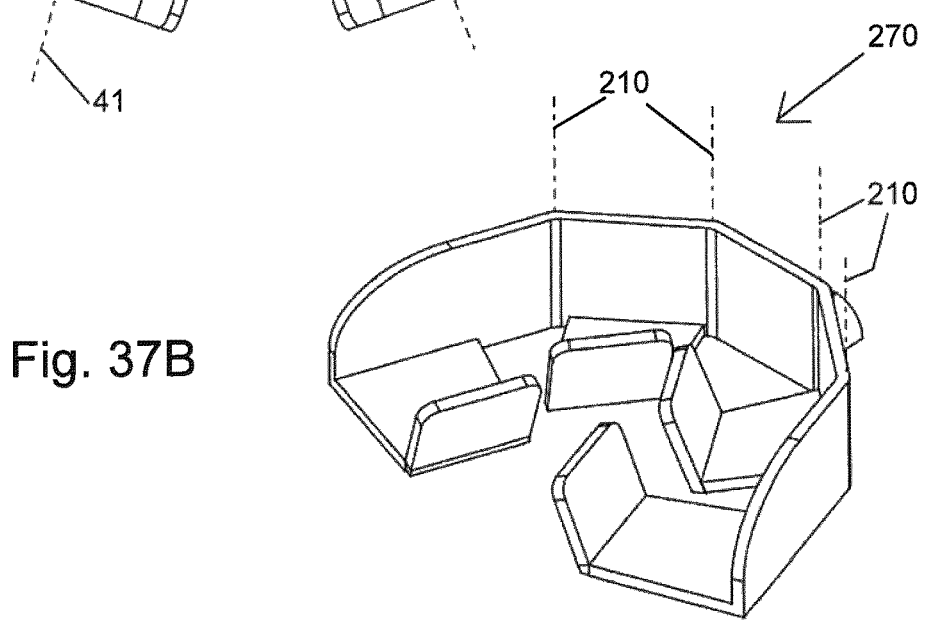

FIG. 37 shows in top view (FIG. 37A) and in perspective view (FIG. 37B) a third embodiment of a mouthpiece 270 obtainable with the method according to the second invention. Like in FIGS. 28-31 and FIG. 36, the pressure chambers and bristles are for clarity reasons not shown. This mouthpiece has four trough sections 43, 45, 47 and 49, connected by links 44, 46 and 48 in the lingual wall of the mouthpiece. By configuring the links 44, 46, 48 flexible with respect to an about vertical axis, such as for example by means of the hinges 210, this mouthpiece 270 is allowed to flex in a horizontal plane relative to the horizontal, curved length axis 41, as is the subject of the third invention. This mouthpiece may be manufactured from a plate shaped part with initially a sheet condition, similar as has been explained in relation to FIGS. 28-34. In case both the upper teeth and lower teeth are to be treated simultaneously, two mouthpieces 270 may be combined as has been explained in relation to FIGS. 31 and 34E.

Figure 38A:
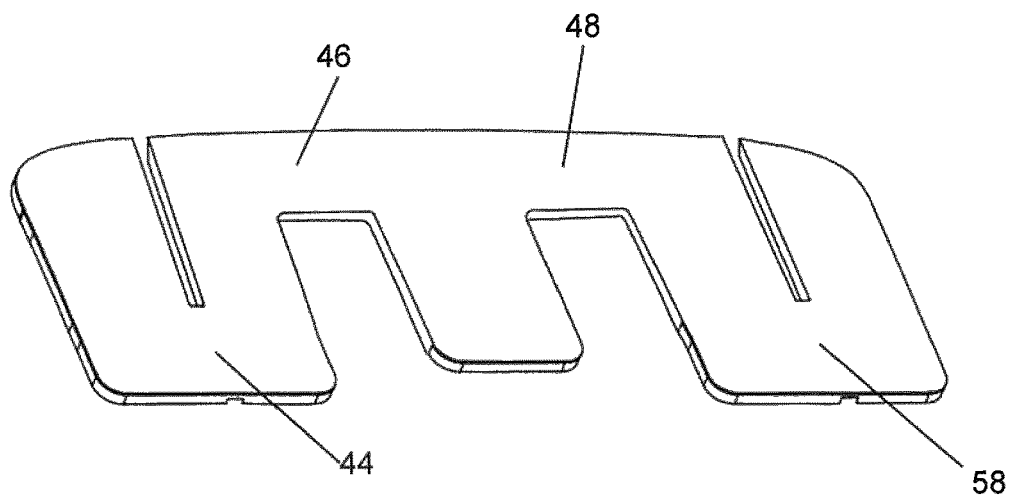
FIG. 38 schematically shows in perspective view a fourth embodiment of a mouthpiece obtainable with the method according to the second invention, FIG. 38A showing a plate shaped frame part in its sheet condition, FIG. 38B showing a top view of the mouthpiece, and FIG. 37C showing a perspective view of the mouthpiece.
Figure 38B:
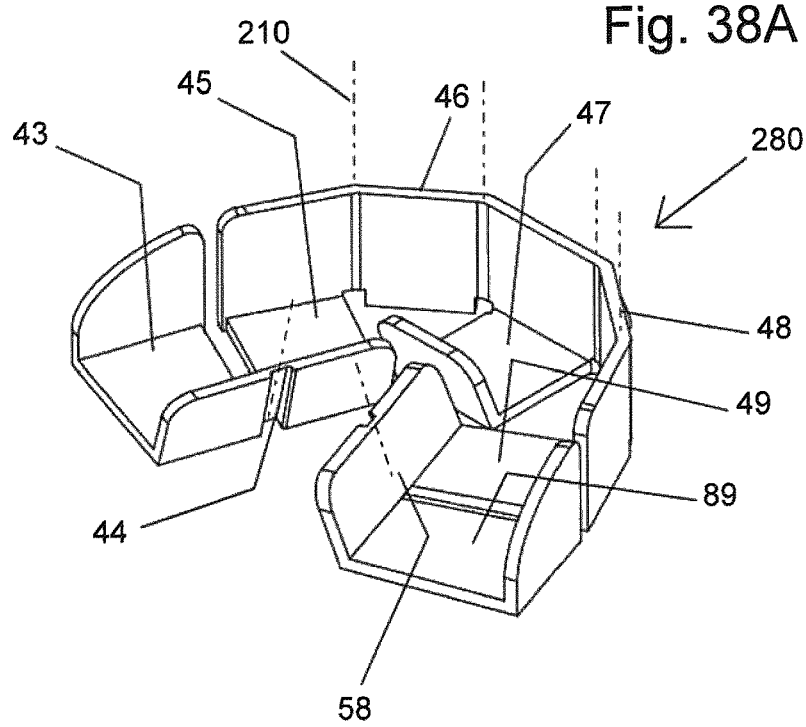
Figure 38C:
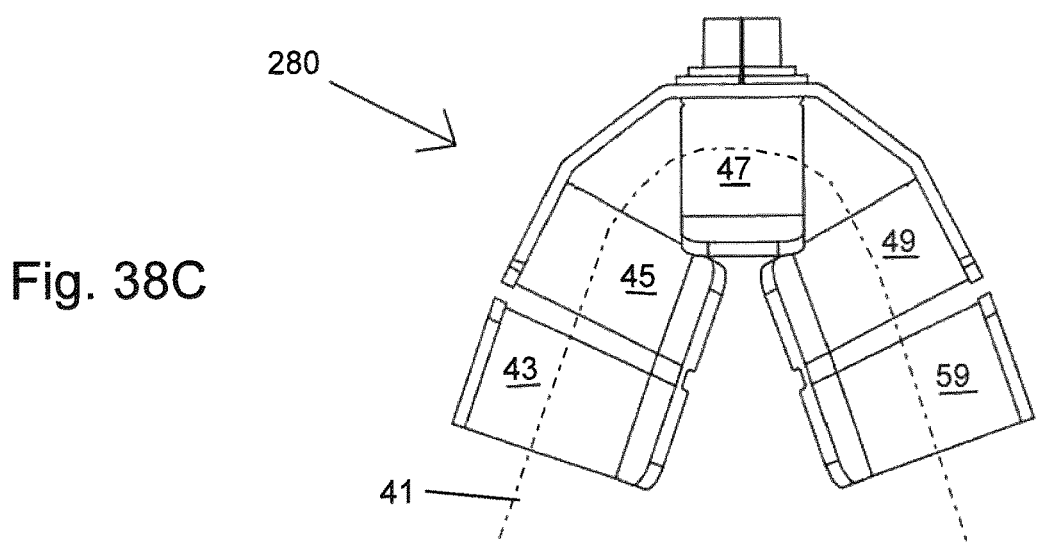

FIG. 38 shows a fourth embodiment of a mouthpiece 280 obtainable with the method according to the second invention. Like in FIGS. 28-31 and FIGS. 36-37, the pressure chambers and bristles are for clarity reasons not shown. FIG. 38A shows the plate shaped frame part in sheet condition. FIG. 38B shows the mouthpiece 280 in perspective view and FIG. 38C shows the mouthpiece 280 in top view.

This mouthpiece 280 has five trough sections 43, 45, 47, 49 and 89, connected by links 44, 46, 48 and 58. By configuring the links 44, 46, 48, 58 flexible with respect to an about vertical axis, such as for example by means of the six hinges 210—indicated with dashed lines—, this mouthpiece 280 is allowed to flex in a horizontal plane relative to the horizontal, curved length axis 41, as is the subject of the third invention. The links 44 and 58 are located in the lingual wall of the mouthpiece 280, between two posterior trough sections. The links 46 and 48 are located in the facial wall of the mouthpiece 280 between the anterior trough section 47 and the posterior trough sections 45 and 49. As can be seen in FIG. 38A, the plate shaped frame part has correspondingly an elongate member with zig-zag shape. This arrangement of links switching between the facial and lingual side wall of the trough system counteracts rotating from the lingual and facial side walls of the trough sections with respect to the curved length axis 41.

In case both the upper teeth and lower teeth are to be treated simultaneously, two mouthpieces 280 as shown in FIGS. 38A and 38B may be combined as has been explained in relation to FIGS. 31 and 34E.

Now turning to FIGS. 39 to 49, the flexible mouthpiece according to the third invention will be elucidated. Before doing so, it is noted that the mouthpiece according to the third invention may be manufactured with the method according to the second invention. Observing that the method according to the second invention folds an 'assembly of a plate-shaped frame part with one or more pressure chambers' into a through system of mutually aligned trough sections and—optionally—bends the trough system into a J-shaped or U-shaped trough system, it will be clear that the mouthpiece according to the third invention may also be manufactured with another method. For example the frame part may have been pre-fabricated, for example by injection moulding, directly into its final form with a J-/U-shaped trough system making the 'folding step' and optional 'bending step' superfluous. Further, provided the trough sections are joined by flexible links, a mouthpiece according to the third invention may have more or less trough sections per trough system than has been described in relation to the second (and first) invention. The one or—in case of simultaneously treating the upper and lower teeth—two trough systems may, in an mouthpiece according to the third invention, for example consist of a trough system having a trough wall which, viewed transverse to the curved length direction of the mouthpiece, is in cross-section U-shaped, and which extends—with this U-shaped cross-section—continuously from one posterior end of the mouthpiece to the other posterior end of the mouthpiece.

With reference to FIG. 39, the basics of the mouthpiece according to the invention will be explained with a very schematically shown mouthpiece according to the invention, in which the trough system may be imagined as having one said continuously extending trough wall of U-shaped cross-section or may have a multiple of three, four, five spaced trough wall section with per spaced trough wall section a U-shaped cross-section, as will be shown in FIGS. 40, 41 and 42.

Like in the other figures, the mouthpiece is in FIG. 39 indicated with reference 30. Further, like in other figures, reference 31 is used to indicate the handle coupling, reference 32 indicates the anterior part of the mouthpiece, references 33 and 34 indicate the posterior parts of the mouthpiece, references 36, 37 are used to indicate the posterior (outer) ends of the mouthpiece, reference 35 is used to indicate the anterior end of the mouthpiece, and references 3U and 18U are used to indicate wisdom teeth.

Figure 39A:
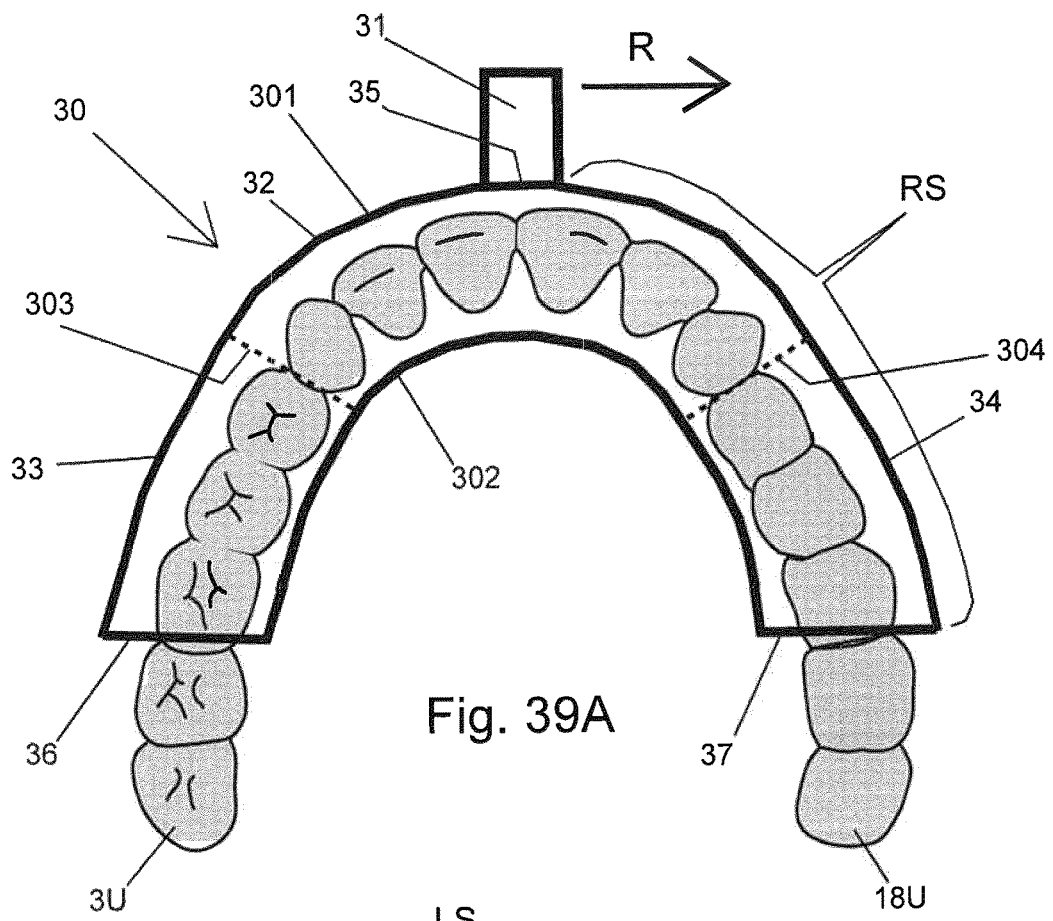
FIG. 39 schematically shows the basics of a mouthpiece according to the third invention, FIG. 39A showing the mouthpiece in neutral position, FIG. 39B showing the mouthpiece in a first extreme position, FIG. 39C showing the mouthpiece (again) in neutral position, and FIG. 39D showing the mouthpiece in a second extreme position.
Figure 39B:
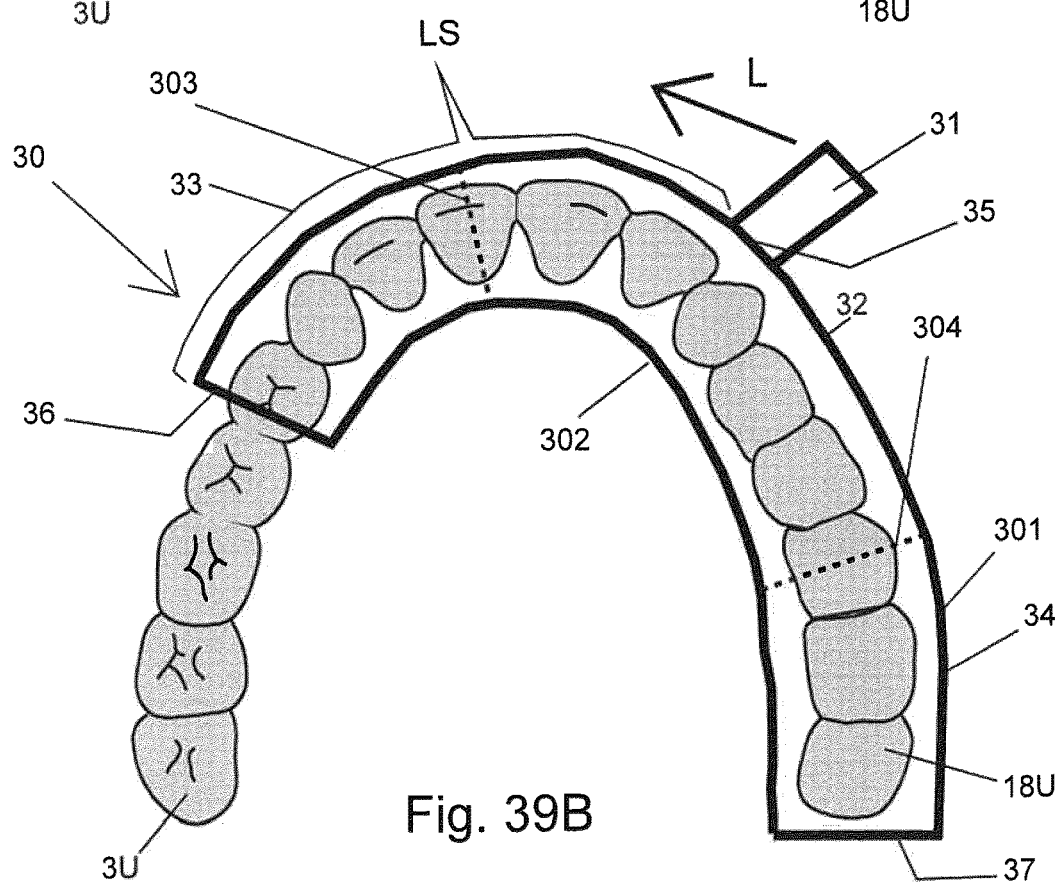
Figure 39C:
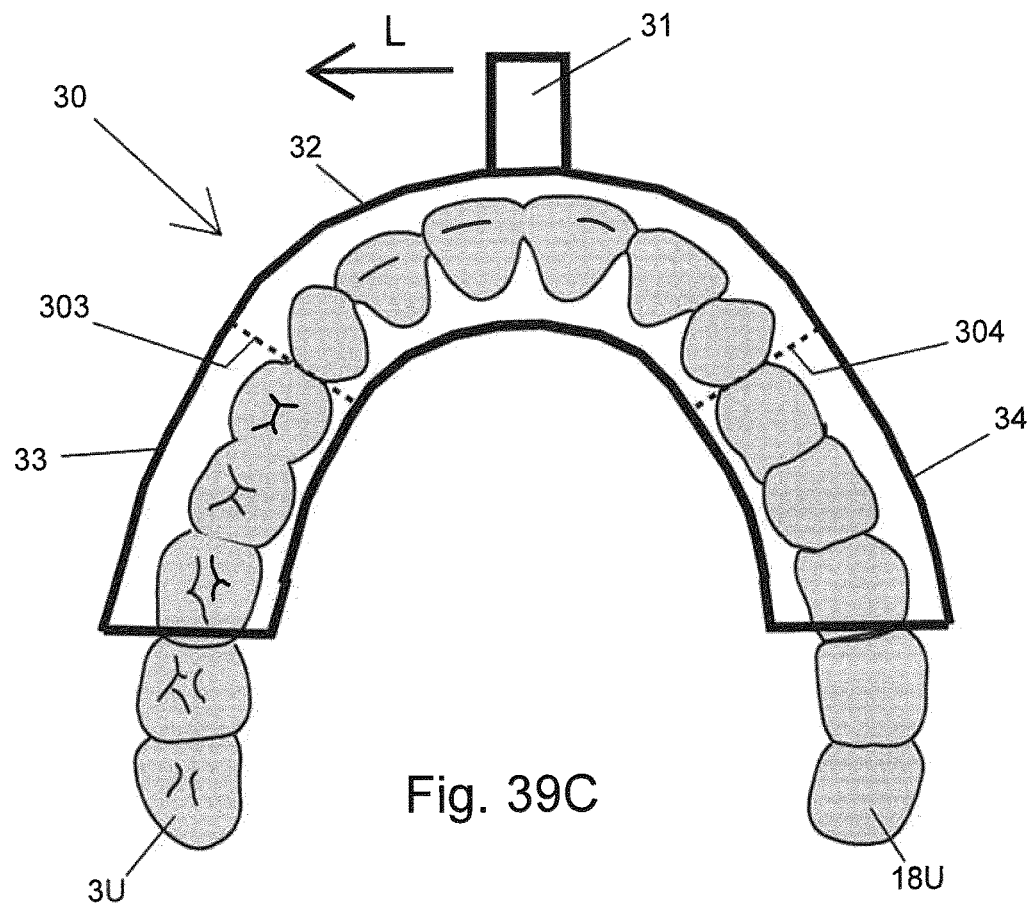
Figure 39D:
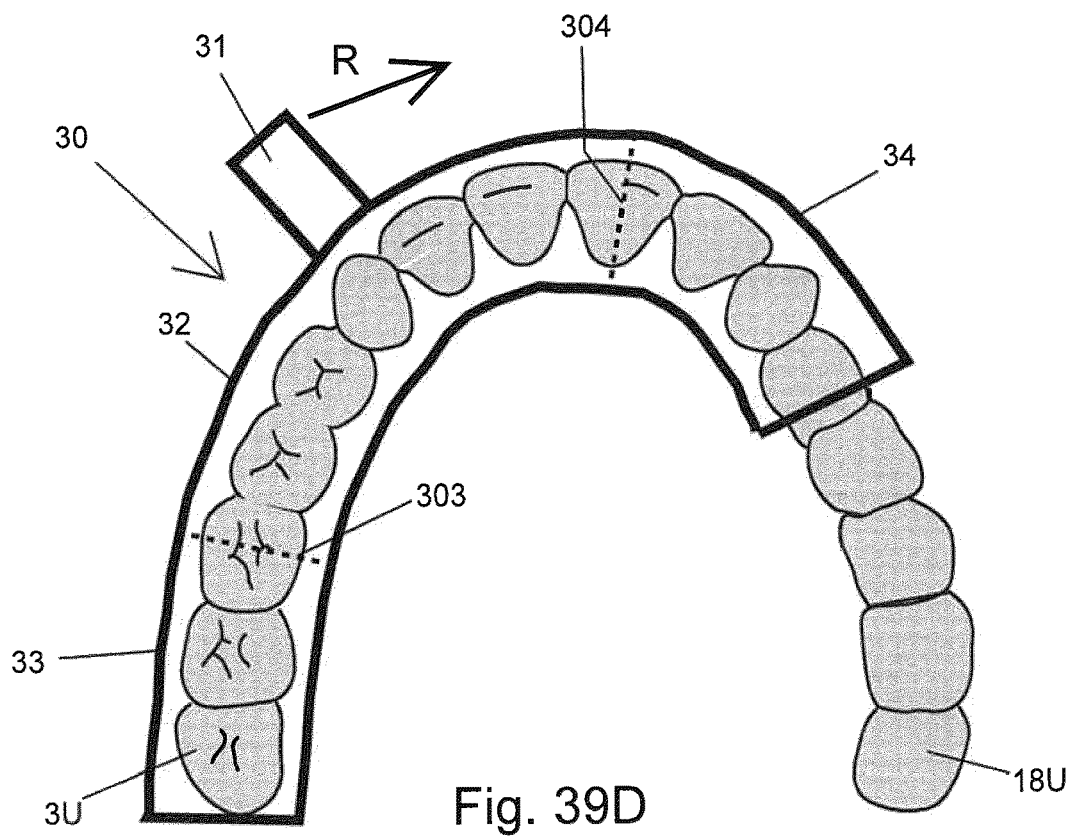

FIGS. 39A-39D show four successive positions of the mouthpiece when riding the mouthpiece from the neutral position of FIG. 39A to a first extreme position—see FIG. 39B—in which the mouthpiece encompasses the left wisdom tooth 18U, and from the first extreme position of FIG. 39B, via the neutral position of FIG. 39C to the second extreme position of FIG. 39D in which the mouthpiece encompasses the right wisdom tooth 18U.

The mouthpiece according to the third invention has an anterior mouthpiece part 32 and two posterior mouthpiece parts 33 and 34. The posterior part 33 extends from the posterior end 36 up to the dotted border line 303, the anterior part extends from the dotted border line 303 up to the dotted border line 304, and the posterior part 34 extends from the dotted border line 304 up to the posterior end 37. As can be seen in FIGS. 39A and 39C, in neutral position of the mouthpiece the anterior part 32 overlaps with all the anterior teeth, whilst the posterior parts 33 and 34 overlap with only part of the posterior teeth. As can be seen in FIG. 39, the length of the mouthpiece 30 according to the third invention, is viewed along the curved length direction of the mouthpiece, shorter than the length of the dental arch. Referring to FIGS. 39B and 39D, which show opposing extreme shifted positions of the mouthpiece according to the third invention, it can be seen that when the mouthpiece rides along the dental arch, the border lines 303 and 304 (as part of the mouthpiece) also move relative to the dental arch. In shifted position, the anterior part 32 of the mouthpiece will overlap with part of the anterior teeth and part of the posterior teeth, one posterior part 34 (or 33) will only overlap with part of the posterior teeth (at its associated side of the dental arch), and the other posterior part 33 (or 34) will overlap with part of the posterior teeth (at its associated side of the dental arch) and part of the anterior teeth.

In all positions of the mouthpiece relative to the dental arch the mouthpiece will overlap with all anterior teeth. However, taking into account that the mouthpiece can—as shown in FIGS. 40-43 be composed of a multiple of mutually spaced trough compartments—in this document in general called trough sections—, this does not mean that in each position all anterior teeth are at the same time encompassed in a trough compartment.

Now turning to specifically the third invention, in the mouthpiece according to the third invention, the handle coupling is attached to the mouthpiece at the anterior end of the mouthpiece. According to the third invention the handle coupling engages the mouthpiece exclusively at the anterior end of the mouthpiece.

In use, the handle coupling 31 will be fixed in or to a coupling end 75 of a handle 71, see FIG. 6. Preferably the handle coupling 31 will be fixed to the coupling end 75 in a removable manner to allow for example replacement of one mouthpiece 30 by another mouthpiece 30 or replacement of one handle 71 by another handle 71. The handle 71 allows the user i) to move the mouthpiece 30 into and out of the mouth, as well as ii) to apply a riding force onto the handle coupling 31 and/or mouthpiece 30 for moving the mouthpiece to the right and left relative to the dental arch in order to ride the mouthpiece 30—like a mono rail train—over the dental arch. In FIGS. 39A-39B the arrows R indicates a riding force to the right of the respective figure, and the arrows L indicate a riding force to the left of the figure. Further, the sector RS in the FIGS. 39A-39D indicates the (right) sector of the mouthpiece on the right side of the handle coupling 31 and the sector LS in the FIGS. 39A-39D indicates the (left) sector of the mouth piece on the left side of the handle coupling 31 (left and right being here in relation to the drawing as depicted).

The handle coupling 31 is-according to the third invention-attached, more specifically exclusively attached, to the anterior end 35 of mouthpiece 30 and is-according to the third invention-further configured to—see FIG. 39—transfer the riding force R (or L), applied onto the handle coupling 31 (by the handle 70), to the aligned trough sections such that all trough sections, viewed in the riding direction, in front of the handle coupling—i.e. in the right sector RS (or left sector LS in case of riding force L)—are advanced by pushing of the handle coupling, while all trough sections, viewed in the riding direction, behind the handle coupling—i.e. in the left sector LS (or right sector RS in case of riding force L) are advanced by pulling action of the handle coupling.

FIGS. 40-43 show some examples of mouthpieces 30 according to the invention, which may all have been manufactured with the method according to the second invention, but may also have been manufactured in different manner as mentioned above. Further, these mouthpieces 30 are all shown in simplified manner. Brushing elements, like bristles or tufts of bristles, are not shown and also details of pressure chambers or other means for moving brushing elements to and fro with respect to the trough system/trough sections are not shown.

Figure 40A:
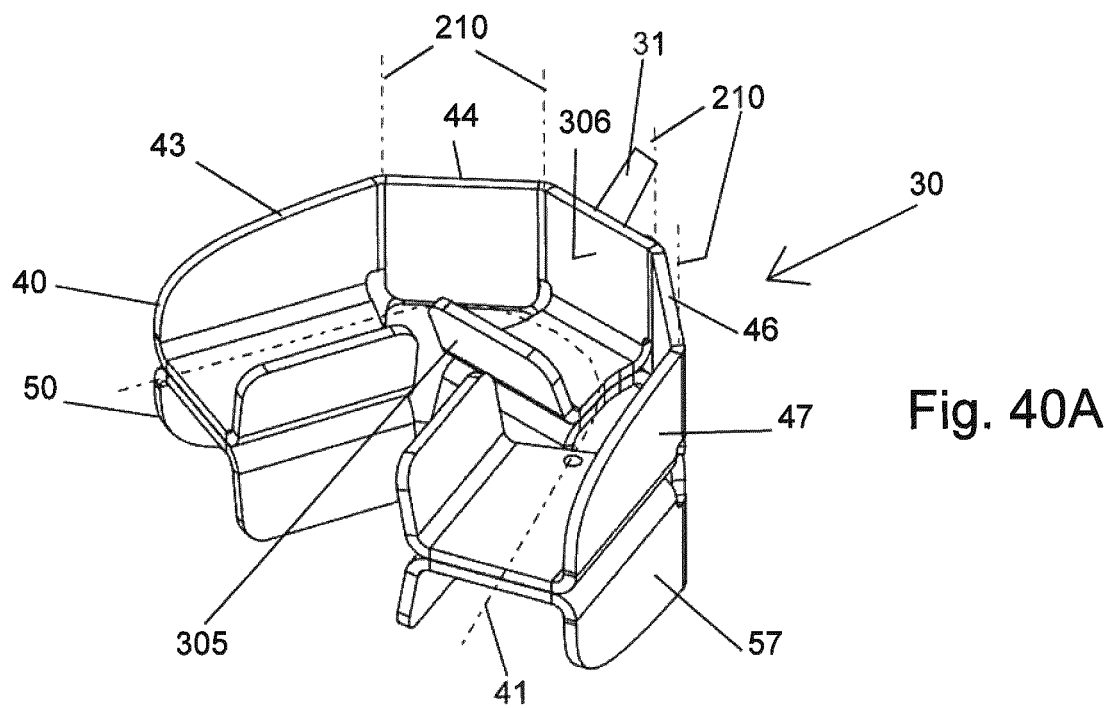
FIG. 40 schematically shows a first example of a mouthpiece according to the third invention, FIG. 40A being a perspective view, and FIG. 40B being a top view in neutral position superposed onto a dental arch.

The mouthpiece 30 of FIG. 40 is similar to the mouthpiece 30 as shown in FIGS. 2, 6, 30, 31, and 34. Correspondingly similar references have been used to indicate similar parts. FIG. 40A shows a perspective view and FIG. 14B shows a top view of the mouthpiece in neutral position and projected onto a dental arch. Noting that the mouthpiece 30 of FIG. 41 may have been manufactured in a manner different from the method according to the second invention, the remainder set forth in relation to explicitly and implicitly the embodiments of FIGS. 2, 6, 30 and 34 applies mutatis mutandis to the mouthpiece of FIG. 41.

The mouthpiece of FIG. 40 has two trough systems, an upper trough system 42 and lower trough system 52. Each of these trough systems has three trough sections, which are, relative to each other, spaced along and aligned on the U-shaped curved length axis 41 and 51 (see FIG. 2) of the upper part 40 respectively lower part 50 of the mouthpiece 30. These trough sections are connected by flexible links 44, 46, 54, 56 allowing the mouthpiece to ride along the dental arch as explained in relation to FIG. 39. The flexible links allow 44, 46, 54, 56 the trough sections to move relative to each other around so to say an axis extending in about the direction of the bending axes 210. The flexibility of the links may be due to hinges, like living hinges, provided at these bending axes 210, but may in addition or alternatively also be due to the links 44, 46, 54 and 56 being configured to allow curving/bending of this links around an axis extending in about the direction of the bending axes 210.

As can be seen in the embodiment of FIG. 40, the links 44, 46, 54 and 56 are all provided at the facial side of the mouthpiece, resulting in that the trough systems 42 and 52, have in this embodiment, along the facial side a continuously extending wall. This prevents tissue at the facial side, like from the inner side of the cheeks or lips of the user, from being caught or clamped between part of the mouthpiece when the mouthpiece conforms its shape during riding along the dental arch.

Figure 40B:
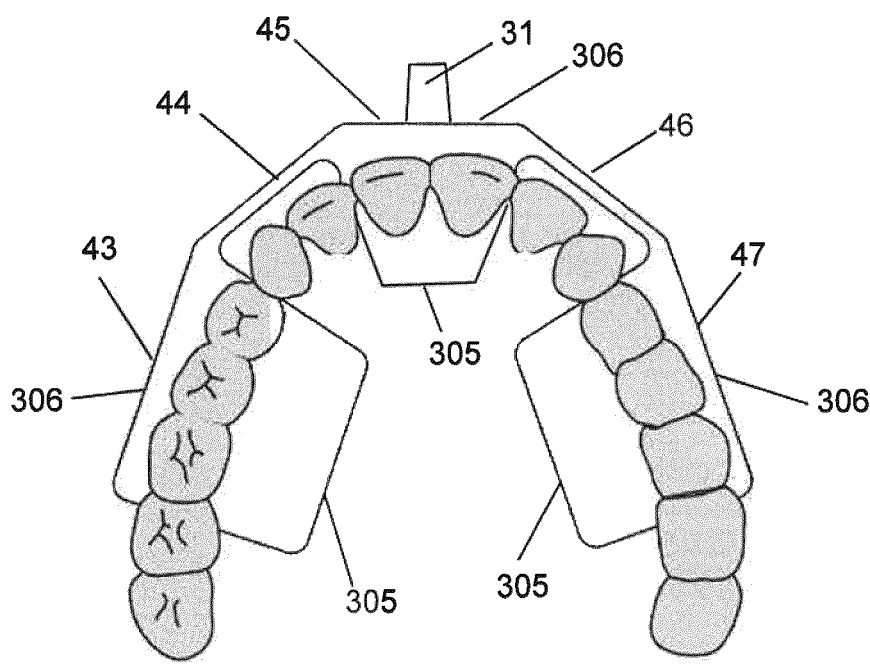

Further FIG. 40B shoes that the inner/lingual wall 305 of the anterior trough section 45 has, viewed along the curved length axis 41, which is shorter than, viewed along the curved length axis 41, the length of the outer/facial wall 306 of the anterior trough section. This facilitates the mouthpiece in riding along the dental arch, as it prevents the right and left sides of the inner wall 305 of the trough section 45 from getting stuck between adjacent teeth. In similar manner, the inner walls 305 of the trough sections 43, 53, 47, 57 may in addition or alternatively be shorter than the outer walls 306 of these trough sections. This concept of the inner walls of trough sections being shorter than the outer walls, can be applied in any embodiment of the invention, also in embodiments discussed further below where this may not be repeated and also in case it cannot be seen from the figures.

Figure 41:
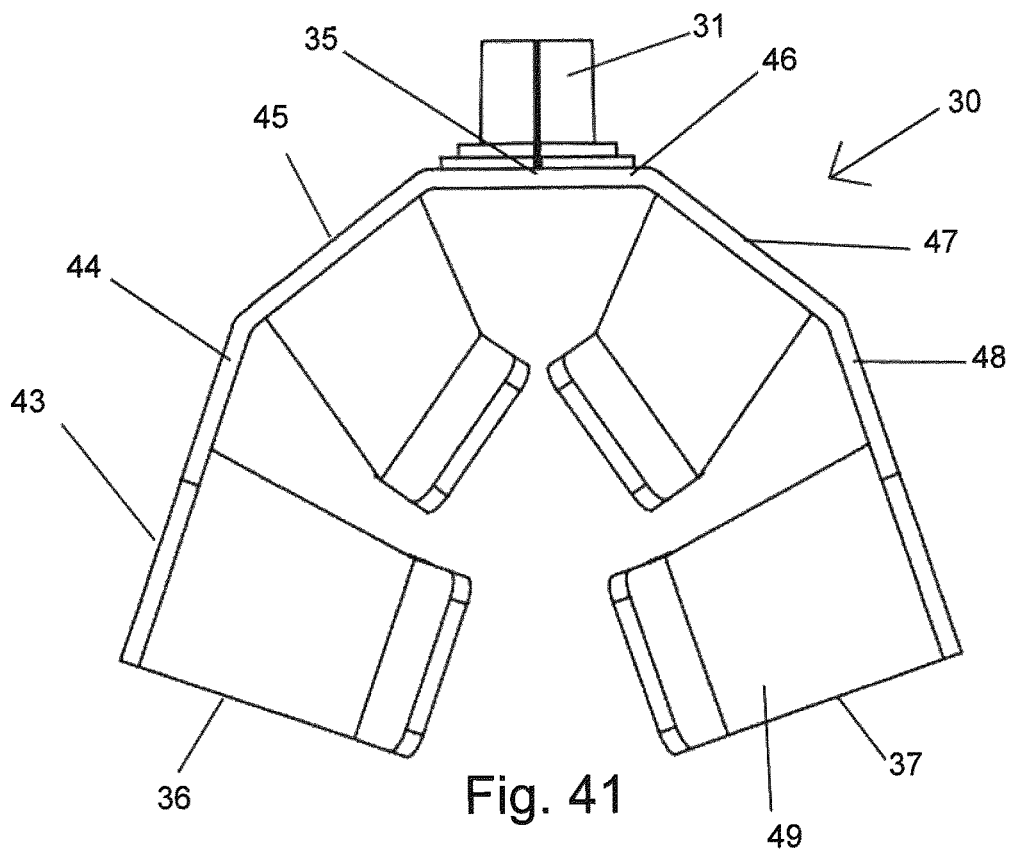
FIG. 41 schematically shows in top view a second example of a mouthpiece according to the third invention.

FIG. 41 shows in top view a mouthpiece 30 similar to the mouthpiece 30 as shown in FIG. 37. Noting that the mouthpiece 30 of FIG. 41 may have been manufactured in a manner different from the method according to the second invention, the remainder set forth in relation to explicitly and implicitly the embodiment of FIG. 37 applies mutatis mutandis to the mouthpiece of FIG. 41. Further, all has been set forth in relation to FIG. 40—such as in relation to the links, flexibility and length of the trough section walls—also applies mutatis mutandis to the mouthpiece of FIG. 41. Correspondingly similar references have been used to indicate similar parts. Although FIG. 41 shows a top view of only one part of the mouthpiece, it will be clear that similar as shown in FIG. 40A, two similar of these mouthpiece parts may be attached in mirror fashion to each other to obtain a mouthpiece for simultaneously treating upper and lower teeth.

Figure 42:
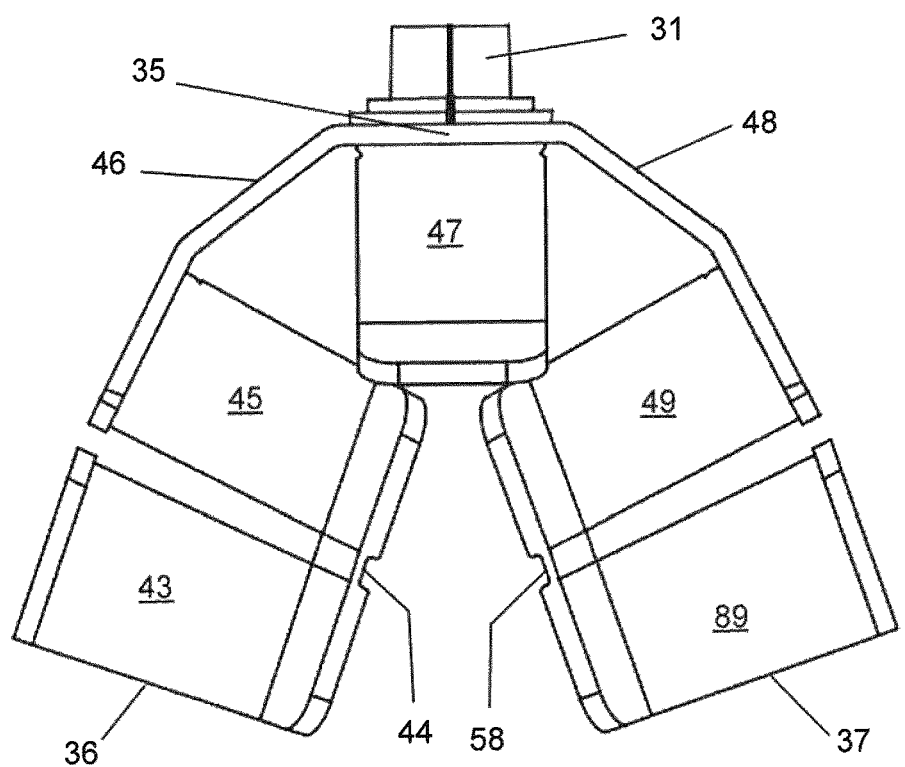
FIG. 42 schematically shows in top view a third example of a mouthpiece according to the third invention.

FIG. 42 shows in top view a mouthpiece 30 similar to the mouthpiece 30 as shown in FIG. 38. Noting that the mouthpiece 30 of FIG. 42 may have been manufactured in a manner different from the method according to the second invention, the remainder set forth in relation to explicitly and implicitly the embodiment of FIG. 38 applies mutatis mutandis to the mouthpiece of FIG. 42. Further, all has been set forth in relation to FIG. 40—such as in relation to the links, flexibility and length of the trough section walls—also applies mutatis mutandis to the mouthpiece of FIG. 42. Correspondingly similar references have been used to indicate similar parts. Although FIG. 42 shows a top view of only one part of the mouthpiece, it will be clear that similar as shown in FIG. 40A, two similar of these mouthpiece parts may be attached in mirror fashion to each other to obtain a mouthpiece for simultaneously treating upper and lower teeth. As will be further visualized in FIG. 48, the arrangement of links switching between the facial and lingual side wall of the trough system counteracts rotating from the lingual and facial side walls of the trough sections with respect to the curved length axis 41.

Figure 43:
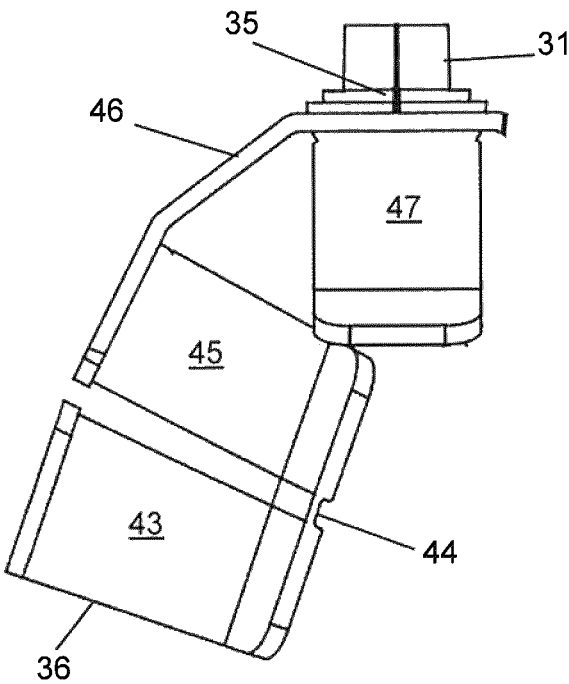
FIG. 43 schematically shows in top view a fourth example of a mouthpiece according to the third invention.

FIG. 43 shows in top view a mouthpiece 30 similar to the mouthpiece 30 as shown in FIGS. 3 and 42. FIG. 43 is a) a J-shaped mouthpiece and b) a half version of the mouthpiece of FIG. 42. Also the mouthpiece of FIG. 43 has links switching between the facial and lingual wall side. Noting that the mouthpiece 30 of FIG. 43 may have been manufactured in a manner different from the method according to the second invention, the remainder set forth in relation to explicitly and implicitly the embodiment of FIGS. 3 and 42 applies mutatis mutandis to the mouthpiece of FIG. 43. Further, all has been set forth in relation to FIG. 40—such as in relation to the links, flexibility and length of the trough section walls—also applies mutatis mutandis to the mouthpiece of FIG. 43. Correspondingly similar references have been used to indicate similar parts. Although FIG. 43 shows a top view of only one part of the mouthpiece, it will be clear that similar as shown in FIG. 40A, two similar of these mouthpiece parts may be attached in mirror fashion to each other to obtain a mouthpiece for simultaneously treating upper and lower teeth.

Figure 47A:
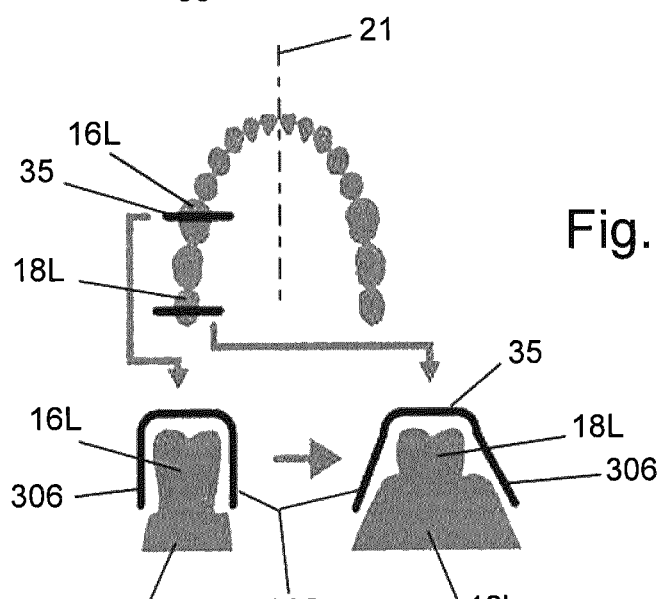
FIG. 47 schematically shows the posterior ends of the side walls of a trough section of a mouthpiece according to the invention being flexible, FIG. 47A schematically showing the origin of a problem and its solution, FIG. 47B showing as a detail an example of the posterior end of a most posterior trough section.
Figure 47B:
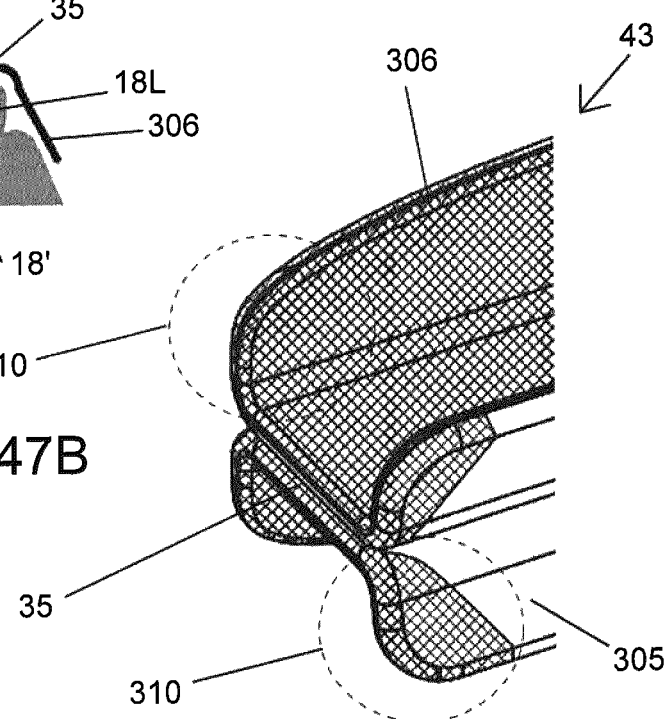

FIG. 47A schematically shows a lower dental arch 2 and cross-sections—transverse to the (curved) length direction of the dental arch 2—at the dental positions 18 and 16 of the wisdom tooth 18 and first molar 16, respectively. As can be seen, the base 18' of the dental position 18 is considerably wider than the base 16' of the dental position 16. This is due to widening of the bone of the jaw and/or gum in the area of the wisdom tooth. In practice, this widening usually starts at the second molar, and sometimes earlier. The amount of widening and location of widening may differ from person to person. This may cause discomfort in case the posterior end 35 of the most posterior trough section 43 at the posterior end of the mouthpiece contacts the widening base. Therefore, in practice the trough system of mouthpieces in practice have a width which towards the posterior end widens. In case of a mouthpiece riding along the dental arch, this results in decrease of the brushing action when the posterior end 35 of the mouthpiece passes along the second molar, first molar and possibly the second pre-molar and first pre-molar. According to a further embodiment of the third invention—which may be applied to any embodiment whether or not described and shown in this application—this is counteracted by—see the detail in FIG. 47B—configuring the side walls 305, 306 of the most posterior trough section (s) at the posterior end of the mouthpiece more flexible than the rest of the side wall of the trough sections. This flexibility—in so to say the areas 310 as indicated in FIG. 47B—allows the posterior ends 35 of the side walls of the most posterior trough section(s) to deform in order to conform to the widening of the base. Doing so, the width, viewed in the horizontal plane and transverse to the length direction of the dental arch, of the most posterior trough section 46 (as well as of other trough sections) can, at locations distant from the posterior end 35 be kept small for good brushing action at these locations, whilst at the posterior end 35 of the mouthpiece the width of the trough section 46 can locally adjust or conform itself to the widening of the base so that discomfort for the user is avoided. In order to improve the brushing action when the posterior end of the mouthpiece is encompassing for example a molar distant from a wisdom tooth, such as the second or first molar, the flexibility of the posterior ends 35 of the side walls 305, 306 of the most posterior trough section 46 is, according to a further embodiment of this embodiment according to the third invention, an elastic flexibility or deformability. The elasticity allows the flexible posterior ends 35 of the side walls 305, 306 of the most posterior trough section 46 to flex back towards each other to narrow the width of the trough section 46 when passing parts of the dental arch where the width of the base is smaller. As overall the base of the dental arch has a tendency to widen in the direction from the central incisor towards a wisdom tooth, this principle may be applied not only to the most posterior trough sections 46, but to other trough sections as well. So more in general, the posterior ends of the side walls 305, 306 of the trough sections 43, 53, 45, 55, 47, 57, 49, 89, may be configured more flexible, such as elastically flexible, than the rest of the side walls 305, 306 of the trough sections 43, 53, 45, 55, 47, 57, 49, 89. In case of a central (or anterior) trough section, which lies in neutral position centered with respect to the center axis 21 of the dental arch both the ends of the side walls of the trough section may be configured more flexible, such as elastically flexible, than the rest of the side walls of the central trough section.

FIG. 44 is a visualization of what happens in case the mouthpiece with trough sections joined by flexible links is too flexible (FIG. 44A), in case the mouthpiece with trough sections joined by flexible links is too stiff (FIG. 44B), and in case the mouthpiece with trough sections joined by flexible links has precisely the flexibility it should have (FIG. 44C).

The ideal situation is shown in FIG. 44C. When a train of trough sections 43-47 is pushed from the neutral position— shown in solid lines—to a shifted position—shown in dashed lines—the length of displacement shown by arrow V1 of the anterior trough section 47 measured along the dental arch should ideally be identical to the length of displacement W1 of the posterior trough section 43. Then the arrows V1 and W1 have, measured along the dental arch the same length. Of course this is the ideal situation. In practice there will be difference without decreasing the functioning of the mouthpiece significantly or causing discomfort for the user. Applicant found that in practice the length of arrow W1 may be about 70% of the length of arrow V1 or about 80% of the length of arrow V1. This may depend from the compressibility of material used for the mouthpiece and other factors.

Applicant also found that the flexibility of mouthpiece as a whole and/or the links, may—taken into account the relative low forces desired for riding the mouthpiece to and fro along the dental arch—easily be too large or too low. The bandwidth is relatively small.

When the flexibility is too large, the train of trough sections and links may so to say crinkle or zig-zag as has been shown exaggerated with dashed line 320 in FIG. 44A. This will cause the length of arrow W3 becoming substantially less than the length of arrow V1, it may also cause the posterior trough section to rotate around an axis perpendicular to the plane of FIG. 44A, and it may cause the anterior trough section 47 to rotate as well around an axis perpendicular to the plane of drawing of FIG. 44A due to the train not giving the user resistance against applying the pushing force non-parallel to the dental arch. Misalignment of the trough sections with respect to the dental arch, may cause the end edges of the trough section being pressed against the gum or between inter spaces between adjacent teeth, resulting in discomfort and possibly the train getting stuck.

When the flexibility is too small, the train of trough sections and links may so to say tend to take a wide curve resulting in outwardly bending of the length axis of the train as has been shown exaggerated with dashed line 325 in FIG. 44B. This may have the same effects as when the flexibility is too high. It will cause the length of arrow W2 becoming substantially less than the length of arrow V1, it may also cause the posterior trough section to rotate around an axis perpendicular to the plane of FIG. 44A, and it may cause the anterior trough section 47 to rotate as well around an axis perpendicular to the plane of drawing of FIG. 44A due to the train being too stiff. Misalignment of the trough sections with respect to the dental arch, may cause the end edges of the trough section being pressed against the gum or between inter spaces between adjacent teeth, resulting in discomfort and possibly the train getting stuck.

Now referring to FIGS. 45 and 46. It is known that the upper and lower dental arch of one person are in practice not identical. The overall curvatures may differ, and also locally, at places along the dental arches, misalignment of teeth with respect to the overall curvature of the dental arch may occur.

In case of a mouthpiece riding along the dental arch, differences incurvature overall or locally between the upper and lower dental arch, may result in that the lower dental arch tends to conform the mouthpiece, overall and/or locally, different than the upper dental arch does. This may result in decrease in the brushing action and/or discomfort for the user. According to a further embodiment of the third invention, this may be counteracted by configuring the mouthpiece 30 to allow, when riding to-and-fro along the dental arch, the upper mouthpiece part 40 to undergo a first conformation to the upper dental arch and allowing the lower mouthpiece part 50 to undergo a second conformation to the lower dental arch, which is different than the first conformation. According to the third invention there are several alternative or supplemental manners to achieve this:

as shown in FIGS. 45A and 45 B, on the right half of these figures, one or more posterior trough sections—i.e. trough sections which encompass in neutral position posterior teeth or only posterior teeth—may be left unconnected so that they can freely move with respect to each other in a horizontal direction transverse to the curved length direction of the dental arch; this may also allow trough sections of the upper and lower mouthpart to move relative to each other in a direction transverse to the plane spanned by the curved dental axis. This may be applied to all or some of the vertically adjacent trough sections of any embodiment of the third invention, irrespective of whether or not this embodiment has been described or shown in this application; and/or as shown in FIGS. 45A and 45 B, on the right half of these figures, one or more posterior trough sections may be connected to vertically adjacent posterior trough sections by a flexible connection allowing the connected trough sections to move with respect to each other in a horizontal direction transverse to the dental arch. Vertically adjacent trough sections may then be prevented from moving with respect to each other in a direction transverse to the plane spanned by the curved length axis of the dental arch. This may be applied to all or some of the vertically adjacent trough sections of any embodiment of the third invention, irrespective of whether or not this embodiment has been described or shown in this application. Referring to the left sides of FIGS. 45A and 45B and to the right side of FIG. 45 C, this can be achieved for example by means of a slit 330 and pin 335 which together form a pin-slit-connection. The slit 330, formed in one of the vertically adjacent trough sections, may extend about horizontally, transverse to the curved length direction of the dental arch, and the pin 335, attached to and projecting from the other one of the vertically adjacent trough sections into the slit 330, may extend essentially vertically; and/or as schematically shown in FIG. 46, the upper and lower part of the mouthpiece may be attached to each other by a flexible attachment 340 at, viewed in the neutral position of the mouthpiece, the center axis of the dental arch. This flexible attachment 340 may be arranged at the lingual side of the mouthpiece, at the facial side as is shown in FIG. 46, at any location in between the facial and lingual side, or may extend from the lingual up to the facial side of the mouthpiece. In order to ensure efficient transfer of riding force from the handle coupling 31 to the upper frame part 40 and lower frame part 50, the flexible attachment 340 may be configured to prevent the upper 40 and lower 50 part of the mouthpiece from translational movement with respect to each other at the anterior end 35 of the mouthpiece. In order to allow effective flexibility of the upper part and lower part with respect to each other during riding to-and-fro along the dental arch, the flexible attachment 340 may in addition or alternatively be configured to allow the upper 40 and lower 50 part of the mouthpiece to rotate with respect to each other around an axis transverse to the plane spanned by the curved length axis of the mouthpiece.

Figure 48A:
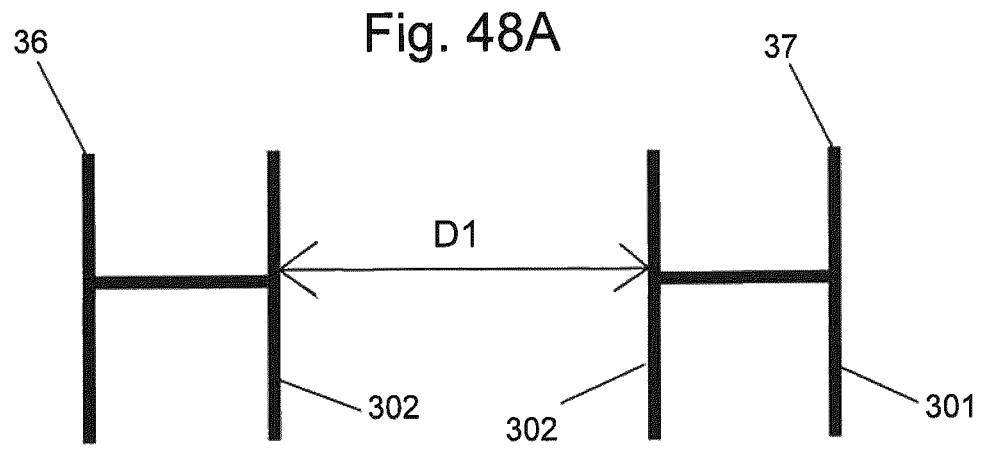
FIG. 48 schematically visualizes the problems associated with torsion flexibility, FIG. 48A showing a neutral position, and FIG. 48B showing a deformed condition.
Figure 48B:
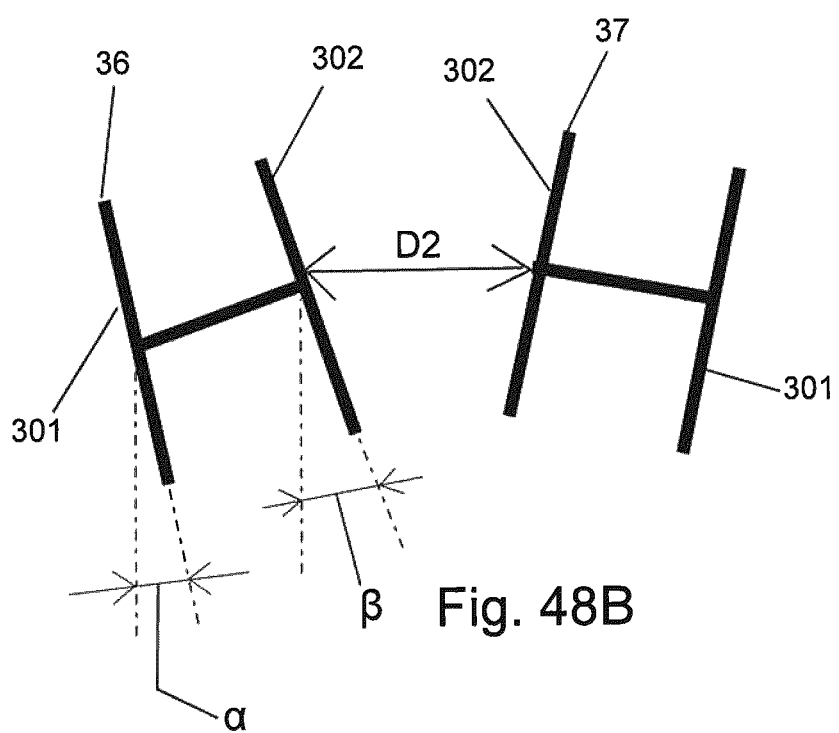

FIG. 48 illustrates schematically a flexibility of mouthpieces which is according to a further embodiment of the third invention to be counteracted or limited. This concerns a torsional flexibility of the mouthpiece. When a U-shaped mouthpiece with upper and lower trough system is in neutral position, with at the posterior ends a horizontal distance D1—see FIG. 48A—between the legs of the U-shape, the H-shaped cross-sections at the posterior ends may have the initial (non-deformed) condition as shown in FIG. 48A. By subsequently squeezing the legs of the U-shaped mouthpiece together to a smaller distance—see FIG. 48B, the most posterior trough section as well as other trough sections deform, as can be seen in FIG. 48B. The lingual side wall 302 and facial side wall 301 of the trough system rotate with respect to the curved length axis of the mouthpiece. A similar effect occurs when the mouthpiece rides to-and-fro along the dental arch due to changes in the curvature which are accommodated during riding to-and-fro. This may cause discomfort due to increased pressure on the gum and/or teeth and it may cause the mouthpiece becoming stuck with respect to the dental arch, decreasing the brushing action. This may according to the invention be prevented by configuring the links between adjacent trough sections sufficiently flexible to prevent the angle α of the facial side wall 301 and the angle β of the lingual side wall 302, in the region of the second pre-molars, from changing more than 15°, preferably at most 10° or at most 5°, with respect to the corresponding angle in neutral position, when riding the mouthpiece over 1 cm along the dental arch starting from the neutral position. In the example of FIG. 48, both side walls 301 and 302 extend in the neutral position vertically, but this may in other embodiments be different.

A manner of expressing the flexibility of a mouthpiece according to the invention, may be found in measuring the resistance against widening and/or narrowing of the mouthpiece in accordance with an experimental set up as shown in FIG. 49. In the experimental set op the handle coupling 31 is unmovably fixed in a clamp. Then at a distance K of 30 mm from the anterior end 35 of the mouthpiece, an outwardly directed force N and an inwardly directed force M is applied in a direction transverse to the direction of the central axis 350, which coincides with the center axis of the dental arch.

After having designed and made a small (see FIG. 49A), a medium (see FIG. 49B) and large (see FIG. 49*c*) mouthpiece meeting the criteria of being not to flexible but also sufficiently flexible, i.e. which ride well along the dental arch. These three mouthpieces were U-shaped mouthpieces with an upper and lower mouthpiece part as for example shown in FIG. 2. Whether or not the mouthpiece meets the criteria of flexibility has been teste on a so called basic AG-3 model with 32 teeth) of frasaco GmbH, which is one of the, if not the, company making dental models for training, education and research in the dental field. After having determined whether or not a mouthpiece meets applicant's criteria of flexibility, and having found the best design, applicant made according to this design the above mentioned small, medium and large mouthpiece. Applicant subjected each of these 'optimal or best' mouthpieces to widening forces N and determined at which force N the point Q, at which the force N engages, is displaced over a distance of 10 mm transverse to the central axis 350. This resulted in the following measured resistances $F_{AW}$ against widening, see table 1 below. Applicant also subjected the small, medium and large mouthpiece to narrowing forces M and determined at which force M the point P, at which the force M engages, is displaced over a distance of 10 mm transverse to the central axis 350. This resulted in the following measured resistances $F_{AN}$ against narrowing, see table 1 below. This was all done with a mouthpiece having in plate shaped frame (part) of PP with a wall thickness of 1.5 mm, which seems to be the most optimal one.

TABLE 1

|   |   | Small mouthpiece (FIG. 49A) | Medium mouthpiece (FIG. 49B) | Large mouthpiece (FIG. 49C) |
| --- | --- | --- | --- | --- |
| M | $F_{AN}$ (in Newton) | 3 | 2.6 | 3.1 |
| N | $F_{AW}$ (in Newton) | 1.5 | 1.8 | 2 |

Subsequently applicant made design variations, by varying the wall thickness of the PP frame part, and using frame parts of different material. Applicant than found that with PP of 1 mm thickness the frame became too or about too flexible (too weak) and that with PP of 2 mm thickness the frame became insufficiently flexible or about insufficiently flexible (too stiff). With this information, applicant determined the ranges for resistances $F_{AN}$ against narrowing and resistances $F_{AW}$ against widening as mentioned in the claims and elsewhere in the description.

Applicant further noted, that when the tests resulting in the results of the above table 1, were repeated with a J-shaped mouthpieces, like shown in FIG. 3—which J-shaped mouthpieces were otherwise the same as the U-shaped mouthpieces used for the tests resulting in the values of table 1—essentially the same results are obtained as depicted in table 1. This is not really surprising.

Applicant further noted, that when the tests resulting in the results of the above table 1, were repeated with a half U-shaped mouthpieces—i.e. ones with only having the upper or lower mouthpiece part 40, 50 of for example FIG. 2 but otherwise the same as the U-shaped mouthpieces used for the tests resulting in the values of table 1—the resulting values are basically half of the values of table 1, resulting in the below table 2.

TABLE 2

|   |   | Small mouthpiece (FIG. 49A) | Medium mouthpiece (FIG. 49B) | Large mouthpiece (FIG. 49C) |
|---|---|---|---|---|
| M | $F_{AN}$ (in Newton) | 1.5 | 1.3 | 1.6 |
| N | $F_{AW}$ (in Newton) | 0.7 | 0.9 | 1 |

Referring to FIG. 50 a detail of a further embodiment of a mouthpiece according to the third invention is shown. FIG. 50A shows, in a first position, in perspective the posterior end of the most posterior trough sections 43, 53 of a mouthpiece. FIG. 50B shows the same perspective view as in FIG. 50A, but now in a second position. FIG. 50C shows, in side view the bottom part of the upper trough section in the first position in relation to the posterior end of a dental arch. FIG. 50D shows, in side view the bottom part of the upper trough section in the second position in relation to the posterior end of a dental arch.

In a mouthpiece which does not ride along the dental arch, the posterior end of the mouthpiece may be adapted to have longer bristles or bristles on a posterior end wall projecting vertically from the bottom of the trough. In a mouthpiece riding along the dental arch, this would cause a decreased brushing action, because the longer bristles when underneath an occlusal side of a tooth will cause the shorter other bristles to have less contact with the occlusal surface of the teeth, and in case of a vertically projecting end wall of the trough system the same will occur when this vertically projecting end wall is underneath an occlusal face of a tooth.

Figure 50A:
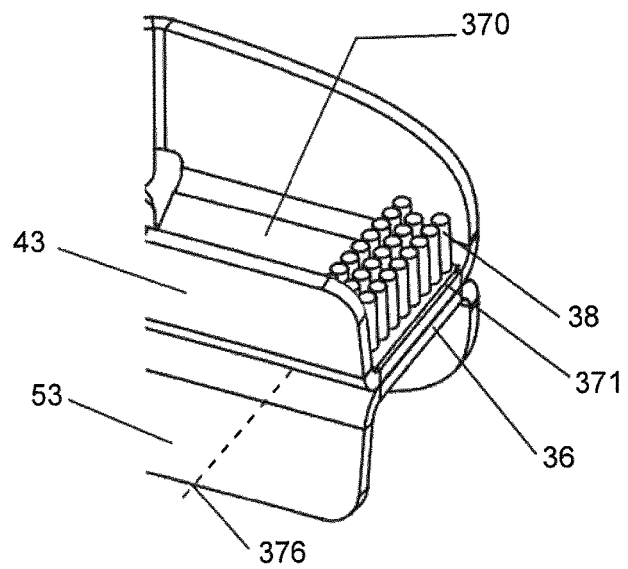
FIG. 50 schematically shows a detail of a further embodiment of the mouthpiece according to the third invention, FIG. 50A showing a perspective view of the posterior end of a trough system in a first condition, FIG. 50B showing a perspective view of the posterior end of a trough system in a second condition, FIG. 50C showing a schematic side view of FIG. 50A in relation to a dental arch, and FIG. 50D showing a schematic side view of FIG. 50B in relation to a dental arch.
Figure 50B:
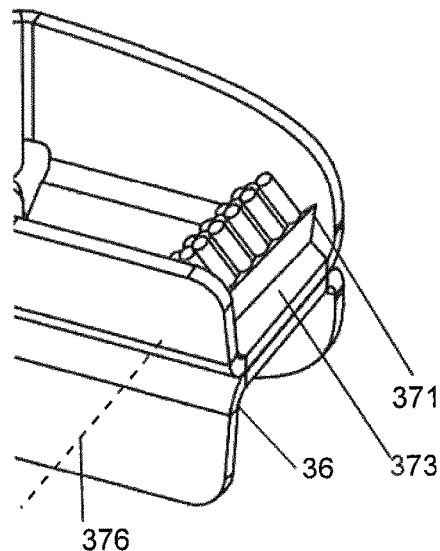
Figure 50C:
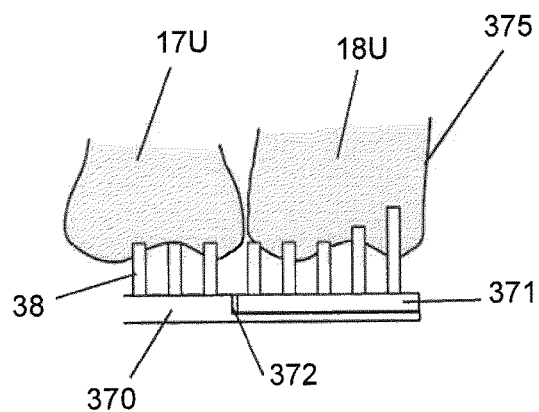
Figure 50D:
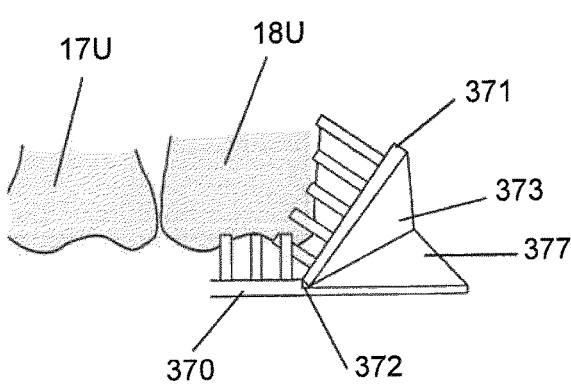

In order to allow the backside 375 of a most posterior tooth of a dental arch, to be treated or brushed, the most posterior trough sections may according to the third invention be provided, at the posterior end of the bottom 370 of said most posterior trough sections with a movable bottom part 371 having bristles which project transverse to the movable bottom part, wherein the movable bottom part 371 is moveable around a rotation axis 376, extending in a horizontal direction transverse to the (curved) length direction of the mouthpiece, from a retracted position (FIGS. 50A and 50C) to a slanting erected position (FIGS. 50B and 50D). The rotation axis is arranged at the anterior side 372 of the movable bottom part. In order to allow the movable bottom part to erect when passing beyond the posterior end of the most posterior tooth and to retract when moving back under the occlusal surface of a tooth, the mouthpiece is configured to bias the movable wall part, at least during use, towards the erected position. For this biasing a pressure chamber 373 may be used. In a further embodiment this pressure chamber may at its backside have a zig-zag wall part 377, which facilitates erecting and retracting of the movable wall part with bristles when passing underneath the posterior end of the most posterior tooth.

Although FIG. 50 shows the movable bottom part only in relation to the upper mouthpiece part and does not show other details—like bristles, pressure chambers etcetera—not relating to this feature of the movable wall part, it will be clear that such a movable wall or a similar movable wall part may be applied in any embodiment of the third invention—whether or not described in this application—as well as to other dental mouthpieces riding along a dental arch.

Embodiments of the first invention, second invention and third invention may also be worded as reflected in the following clauses:

1) Method of manufacturing a pressure chamber of a mouthpiece for simultaneously treating a plurality of dental positions by increasing and decreasing a pressure in the pressure chamber, wherein the method comprises:
   a step b) of providing a frame part of a frame of the mouthpiece in an injection mould,
   a step c) of providing a wall part of a flexible wall of the mouthpiece in the injection mould,
   a step f) of over-moulding, in which a first over-moulding material is injected into the injection mould to attach the wall part and frame part to each other along an attachment loop such that the attachment loop, a part of the wall part surrounded by the attachment loop, and a part of the frame part surrounded by the attachment loop delimit a composed pressure chamber, and
   a step g) of allowing the composed pressure chamber to solidify and removing it from the injection mould, resulting in the pressure chamber to be manufactured having a frame part and flexible wall part.
2) Method according to clause 1, wherein the wall part is stretchable, such as elastically stretchable.
3) Method according to clause 1 or clause 2, wherein the method further comprises a step of arranging the frame part and wall part in a layered manner along each other to obtain a layered structure with a frame part layer and a wall part layer parallel to each other.
4) Method according to clause 3, wherein the method further comprises a step of introducing a pressurized medium into the area between the frame part layer and wall part layer, which area is surrounded by the attachment loop, to separate the frame part layer and wall part layer.
5) Method according to one of the clauses 3-4, wherein the method further comprise a step a) of providing an intermediate member; wherein one of the steps b) and c) take place before step f) resulting in a provided part; wherein the method further comprise a step d) of combining the provided part and intermediate member to obtain a combined part, in which combined part the intermediate member is a positive or negative predefining a location of the attachment loop to be obtained, after step d), in the step f); and wherein the other of the steps b) and c) takes place in the step f) to provide the other of the wall part respectively frame part by moulding it onto the combined part to obtain the layered structure and the attachment loop.

6) Method according to clause 5, wherein, in the step d), the intermediate member is attached to the provided part.

7) Method according to one of clauses 5-6, wherein the step b) takes place before the step f) resulting in the provided part being the frame part, and wherein step c) takes place in the step f).

8) Method according to clause 7, wherein the method further comprises, before the step f), a step e) of preparing the injection mould such that it has a die cavity delimited by a first cavity wall and a second cavity wall opposite and spaced from the first cavity wall, wherein the step e) comprises:
providing a said first cavity wall with bores, which bores:
have bore ends which open into the die cavity, and
are filled with bristles having a root section lying at the bore ends; and
placing the combined part as an insert into the die cavity spaced from the first cavity wall and with the frame part against the second cavity wall; and
wherein the first over-moulding material is a wall material (C) for forming the wall part and is, in step f), injected into the die cavity such that the root section of the bristles becomes integral with the wall part (C).

9) Method according to one of clauses 5-6, wherein the step c) takes place before the step f) resulting in the provided part being the wall part; wherein the method further comprises, before the step f), a step e) of preparing the injection mould such that it has a die cavity delimited by a first cavity wall and a second cavity wall opposite and spaced from the first cavity wall; wherein the step e) comprises:
providing a said first cavity wall with bores, which bores:
have bore ends which open into the die cavity, and
are filled with bristles having a root section lying at the bore ends; and
placing the combined part as an insert into the die cavity spaced from the second cavity wall and with the wall part contacting the root section(s); and
wherein the first over-moulding material is a frame material (A) for forming the frame part and is, in step f), injected into the die cavity.

10) Method according to one of the clauses 5-9, wherein the step a) takes place before the steps b) and c).

11) Method according to one of the clauses 5-10, wherein the step d) comprises a first further over-moulding step in which the intermediate member and provided part are combined by over-moulding.

12) Method according to clause 11, wherein the intermediate member fuses with the provided part during the first further over-moulding step.

13) Method according to one of the clause 5-11, wherein, in the step d), the intermediate member is attached to the provided part by an adhesive.

14) Method according to one of the clauses 5-13, wherein, in the step d), the intermediate member is mechanically attached to the provided part.

15) Method according to one of the clauses 3-14, wherein the intermediate member comprises a 3-dimensional male or female configuration mating with a corresponding 3-dimensional female respectively male configuration of at least part of the provided part such that the intermediate member and provided part fit in a male-female manner into each other.

16) Method according to one of the clauses 5-11, wherein, in the step a), the intermediate member is provided by spraying, such as by spraying the intermediate member onto the provided part.

17) Method according to one of clauses clause 5-16, wherein the frame part and wall part are fusible with each other when over-moulded onto each other; wherein the intermediate member is an intermediate layer; wherein, in the combined part resulting from the step d), the provided part is covered with the intermediate layer whilst leaving a fusing loop on the provided part exposed; wherein, in the step f), said other of the wall part respectively frame part is obtained by moulding a layer onto the intermediate layer and onto the fusing loop resulting in:
a layered structure with the intermediate layer in between the frame part layer and the wall part layer, and
the attachment loop by fusing of the frame part layer and wall part layer at the fusing loop; and
wherein the intermediate layer (B) is configured to provide a separation layer along which the wall part layer separates from the frame part layer when introducing a pressurized medium between the wall part layer and frame part layer.

18) Method according to clause 17, wherein the intermediate layer has a first outer surface which faces the provided part and fuses with the provided part in the step f) or is attached to the provided part, and wherein the laminate has a second outer surface facing away from the provided part, which second outer surface is configured to resist fusing with the first over-moulding material injected in the step f).

19) Method according to clause 18, depending from at least clause 7, wherein the intermediate layer comprises or is made of a polyamide (PA) or a polyethylene (PE), wherein the frame part (A) comprises or is made of a polypropylene (PP), and wherein the wall part (C) comprises or is made of a thermoplastic polymer (TPE), such as a styrene-ethylene/butylene-styrene (SEBS).

20) Method according to clause 17, wherein the intermediate layer is a laminate comprising a first surface bonding to the wall part layer, a second surface bonding to the frame part layer, and, in between the first and second surface a weakened area, to provide the separation layer such that the wall part layer separates from the frame part layer by delamination when said pressurized medium is introduced between the wall part layer and frame part layer.

21) Method according to one of clauses 17-19, wherein the intermediate layer covering the provided part has an exposed surface facing away from the provided part, which exposed surface is configured to resist fusing with the first over-moulding material which is injected in the step f).

22) Method according to clause 21, wherein the intermediate layer covering the provided part has, opposite the exposed surface, an opposing surface facing the provided part, which opposing surface is configured to fuse with the provided part due to the heat of the first over-moulding material injected in the step f).

23) Method according to clause 21 or 22, depending from at least clause 7, wherein the intermediate layer (B) comprises or is made of a polyamide (PA), wherein the wall part (C) comprises or is made of a thermoplastic polymer (TPE), such a styrene-ethylene/butylene-styrene (SEBS), and wherein the frame part (A) comprises or is made of a thermoplastic polymer capable of bonding with a polyamide (TPE-PA).
24) Method according to clause 17, wherein the intermediate layer covering the provided part has an exposed surface facing away from the provided part, which exposed surface is configured to fuse with the first over-moulding material which is injected in the step f).
25) Method according to clause 24, wherein the intermediate layer covering the provided part has, opposite the exposed surface, an opposing surface facing the provided part, which opposing surface is of a material configured to resist fusing with the provided part due to the heat of the first over-moulding material which is injected in the step f).
26) Method according to clause 25, depending from at least clause 7, wherein the intermediate layer (B) comprises or is made of a polyamide (PA), wherein the wall part (C) comprises or is made of a thermoplastic polymer (TPE), such a styrene-ethylene/butylene-styrene (SEBS), and wherein the frame part (A) comprises or is made of a polypropylene (PP).
27) Method according to one of clauses 5-8, wherein the frame part and wall part are made of materials resisting or configured to resist fusing with each other when over-moulded onto each other; wherein the intermediate member is a bead loop which is configured to fuse, in the step f), with the first over-moulding material injected in the step f); wherein, in the step d), the bead loop is placed against the provided part whilst leaving inside the bead loop an exposed area of the provided part; wherein the first over-moulding material injected in the step f) is moulded onto the bead loop and onto the exposed area resulting in:
a layered structure with the frame part layer and the wall part layer lying against each other, and
the attachment loop by fusing of the first over-moulding material in the step f) with the bead loop.
28) Method according to clause 27, wherein the bead loop is configured to fuse with the provided part due to the heat of the first over-moulding material injected in the step f) or due to the heat of the bead loop itself in case the bead loop is provided onto the provided part by a second further over-moulding step.
29) Method according to one of the clauses 1-4, wherein in the step b) a pre-fabricated frame part is provided; wherein in the step c) a pre-fabricated wall part is provided; wherein the method further comprises, before the step f), a step e) of preparing the injection mould; wherein the step e) comprises placing the pre-fabricated frame part and the pre-fabricated wall part as an insert into the injection mould with the frame part and wall part pressed against each other along a circumferential edge of the pre-fabricated wall part; and wherein the first over-moulding material injected in the step f) fuses, in the step f), with the circumferential edge of the wall part such that the circumferential edge of the wall part becomes fixed relative to the frame part to provide the attachment loop.
30) Method according to clause 29, wherein the insert of the pre-fabricated frame part and pre-fabricated wall part is a layered structure in which the part of the wall part layer inside the circumferential edge pressed into contact with the frame part layer lies loose against the frame part layer.
31) Method according to clause 29 or 30, wherein the pre-fabricated wall part is along at least part of the circumferential edge provided with a slitted female part configured to receive a mating male edge of the pre-fabricated frame part.
32) Method according one of the clauses 29-31, wherein an opposite side of the frame part, which faces away from the pressure chamber is covered with the first over-moulding material (B) injected in the step f) such that the injected first over-moulding material (B) connects opposing sides of the circumferential edge along a shortest line between the opposing sides of the circumferential edge.
33) Method according to clause 32, wherein the opposite side of the frame part is covered with the material (B) injected for at least 80%, such as at least 90% or 100%.
34) Method according to one of the clauses 29-33, wherein the first over-moulding material (B) is configured to fuse, in step f), with the frame part.
35) Pressure chamber manufactured with the method according to one of the clauses 1-34.
36) Pressure chamber according to clause 35, wherein the wall part is provided with bristles projecting from the wall part in a direction away from the frame part.
37) Mouthpiece for simultaneously treating a plurality of dental positions by increasing and decreasing pressure in one or more pressure chambers, comprising at least one pressure chamber manufactured with the method according to one of the clauses 1-36.
38) Mouthpiece according to clause 37, wherein the mouthpiece has one or more troughs configured with a J-shaped or U-shaped curved length direction for encompassing a multiple of teeth of a dental arch.
39) Mouthpiece according to clause 38, wherein the wall part defines a wall of the trough.
40) Mouthpiece according to clause 38 or 39, wherein the trough comprises trough sections aligned on the curved length direction.
41) Mouthpiece according to one of the clauses 37-40, wherein the wall part is provided with bristles projecting from the wall part in a direction away from the frame part.
42) Mouthpiece according to one of the clauses 37-41, wherein the mouthpiece is provided with a pressure medium connector in fluid connection with the pressure chamber(s).
43) Mouthpiece according to one of the clauses 37-42, wherein the mouthpiece is provided with a handle connector.
44) System comprising a mouthpiece according to one of the clauses 37-43, and a handle configured for detachable attachment to the mouthpiece, such as to the handle connector of the mouthpiece.
45) System according to clause 44, wherein the handle comprises a drive configured for alternatingly pressurizing and depressurizing the pressure chamber or pressure chambers to move the bristles to-and-fro.
46) Method of manufacturing a mouthpiece with a trough system for simultaneously treating a plurality of dental positions by increasing and decreasing a pressure in one or more pressure chambers; wherein the method comprises:
a frame part providing step, in which a plate-shaped frame part is provided, the plate shaped frame part being defined by an elongate member having, at two or more spaced trough areas, a set of side members projecting transverse from the elongate member;

a pressure chamber manufacturing step, which comprises, whilst the plate-shaped frame part is in a sheet condition:
providing, on one face of the plate-shaped frame part at the trough areas, a flexible wall part, and
attaching the flexible wall part, in the trough areas, along one or more attachment loops to the plate-shaped frame part to provide the trough areas with one or more pressure chambers bounded between each attachment loop, the frame part and wall part;

a folding step, in which the plate-shaped frame part provided with the one or more pressure chambers is folded to a folded condition in which, at each trough area, the associated set of side members is folded around folding axes, which are about parallel to a length direction of the elongate member, to a trough section with the one or more pressure chambers on the hollow side of the trough section and with the trough sections aligned to define a trough system.

47) Method according to clause 46, wherein the plate shaped frame part provided in the frame part providing step has two, three, four or five trough areas where a said set of side members is provided.

48) Method according to one of the clauses 46-47, wherein the pressure chamber manufacturing step comprises the method according to one of the clauses 1-34.

49) Method according to one of the clauses 46-48, wherein the method further comprises a bending step, in which the elongate member is bended, around bending axes, which extend transverse to the length direction of the elongate member, to the J-shaped or U-shaped configuration.

50) Method according to clause 49, wherein the bending step takes place before the folding step, simultaneously with the folding step, or after the folding step.

51) Method according to one of the clauses 49-50, wherein each set of side members of the plate shaped part provided in the frame part providing step comprises a single flap attached to a side of the elongate member which is about parallel to the length direction of the elongate member;
wherein, in the folding step:
a first said folding axis is provided at and along the border between the elongate member and each said single flap, and
a further said folding axis is provided in each said single flap, which further folding axis is arranged at a distance from the first folding axis and extends in the same direction as the first folding axis.

52) Method according to clause 51, wherein the single flaps are provided on the same side of the elongate member.

53) Method according to clause 52, wherein the trough sections of the mouthpiece obtained are arranged at a lingual side of the elongate member.

54) Method according to clause 51, wherein the plate shaped part presents, in its sheet condition, one or more zig-zags resulting in that the folding axes are alternatingly provided on one side of the elongate member and on the other side of the elongate member and in that the mouthpiece as manufactured has an intermediate trough section having at both sides an adjacent trough section connected to the intermediate trough section by a respective link, which links are, viewed with respect to a curved length axis of the J-/U-shaped configuration, arranged at different sides of the curved length axis.

55) Method according to one of the clauses 49-54, wherein the bends provided in the bending step comprise living hinges configured for providing a permanent flexible hinge allowing adapting the curvature of the J-shaped or U-shaped configuration to the shape of the dental arch of a user and/or allowing the J-shaped or U-shaped configuration to conform to the dental arch of a user when moving to-and-fro along the dental arch of the user.

56) Method according to one of the clauses 46-48, wherein the elongate member of the plate-shaped part provided in the frame part providing step has a J-shaped or U-shaped length direction, a first longitudinal side and a second longitudinal side; wherein each set of side members of the plate shaped frame part provided in the frame part providing step comprises:
a first side flap attached to the first longitudinal side, and
a second side flap attached to the second longitudinal side;
wherein, in the folding step:
a first said folding axis is provided at and along the border between the elongate member and each said first side flap, and
a second said folding axis is provided at and along the border between the elongate member and each said second side flap.

57) Method according to clause 56, wherein the first longitudinal side of the elongate member of the plate-shaped part provided in the frame part providing step is provided with first cut outs; wherein the second longitudinal side of the elongate member of the plate-shaped part provided in the frame part providing step is provided with second cut outs opposite the first cut outs, and wherein the first cut outs and second cut outs are configured to provide living hinges between each pair of first cut out and opposing second cut out to provide permanent flexible hinges allowing adapting the curvature of the J-shaped or U-shaped length direction to the shape of the dental arch of a user.

58) Method according to one of the clauses 49-57, wherein the frame part providing step provides two said plate-shaped frame parts, and wherein the said plate-shaped frame parts are, after being subjected to:
the pressure chamber manufacturing step,
the folding step, and
the bending step attached to each other.

59]) Method according to one of the clauses 46-58, wherein the flexible wall part is provided with bristles projecting from the flexible wall in a direction away from the frame part.

60) Method according to any of the clauses 1-34 or 46-59, wherein the plate shaped part and/or the wall part comprise a plastic or are made of a plastic.

61) Method according to claim one of the clauses 46-60, wherein the flexible wall part is profiled with a profile configured to unfold when pressurizing the pressure chamber.

62) Method according to clause 61, wherein the profile is further configured to fold up when depressurizing the pressure chamber.

63) Method according to one of the clauses 61-62, wherein the profile is provided before, during, or after the pressure chamber manufacturing step.

64) Mouthpiece obtained with the method according to one of the clauses 46-63.
65) System comprising a mouthpiece according to clause 64 and a drive configured for alternatingly pressurizing and depressurizing the pressure chamber (/s) to move the treating elements, such as bristles, to-and-fro.
66) J-shaped or U-shaped mouthpiece for simultaneously brushing a plurality of dental positions when riding the mouthpiece to-and-fro along the dental arch of a user between a neutral position and a shifted position; wherein, defined in the neutral position, the mouthpiece has an anterior end located at the central incisors of the dental arch of a user and a posterior end located at the posterior teeth of the dental arch of a user; wherein the mouthpiece comprises:
  a set of a multiple of trough sections comprising brushing elements, which set of trough sections:
    is arranged along a J-shaped respectively U-shaped curved length direction of the mouthpiece, and
    is configured for simultaneously receiving and brushing a plurality of both anterior and posterior dental positions of an upper or lower dental arch of a user;
  flexible links joining the trough sections of the set to a train of trough sections and configured to:
    allow the mouthpiece to ride to-and-fro along the dental arch between the neutral position and shifted position, and
    to conform the mouthpiece to the dental arch when riding to and fro along the dental arch between the neutral and shifted position;
  and
  a handle coupling attached to the mouthpiece and configured for attaching a handle to ride the train of trough sections to-and-fro along the dental arch by applying a riding force onto the handle;
  wherein the handle coupling is provided at the anterior end of the mouthpiece and configured to transfer the riding force, applied onto the handle coupling, to the train of trough sections such that all trough sections, viewed in the riding direction, in front of the handle coupling are advanced by pushing of the handle coupling while all trough sections, viewed in the riding direction, behind the handle coupling are advanced by pulling of the handle coupling.
67) Mouthpiece according to clause 66, wherein the flexible links are configured to provide a monorail-train of trough sections moveable to-and-fro along a monorail formed by the dental arch.
68) Mouthpiece according to one of the clauses 66-67, wherein the mouthpiece is made of one or more plastic materials.
69) Mouthpiece according to one of the clauses 66-68, wherein the mouthpiece and/or flexible links are configured to prevent trough sections, when being pushed by the handle coupling along a dental arch, from buckling, around a vertical axis, with respect to each other.
70) Mouthpiece according to one of the clauses 66-69, wherein each said trough sections has a lingual side wall and a facial side wall; and wherein the flexible links between adjacent trough sections are configured such that, when the posterior end of the mouthpiece is moved from the neutral position 1 cm towards the centre axis of the dental arch whilst the anterior end of the mouthpiece is kept in place, the change of the angle of the lingual and facial side walls with respect a vertical is, in the region of the second pre-molars, at most 15°, such as at most 10°.
71) Mouthpiece according to one of the clauses 66-70, wherein the mouthpiece and/or flexible links are configured such that, when the handle coupling is moved from the neutral position over a distance of X cm along the dental arch, the one or two posterior ends move, in the same direction as the handle coupling, over a distance of at least Y cm along the dental arch; wherein Y is at least 70% of X, such as at least 80% of X or at least 90% of X, and wherein X is in the range of 1 to 2 cm, such as about 1 cm.
72) Mouthpiece according to one of the clauses 66-71, wherein the mouthpiece comprises two said sets of a multiple of trough sections, a first set for the upper dental arch and a second set for the lower dental arch.
73) Mouthpiece according to one of the clauses 72, wherein the mouthpiece is a U-shaped mouthpiece; wherein the mouthpiece has a resistance $F_{AW}$ against widening of a curve of the curved length direction, which resistance $F_{AW}$ is at least 0.6 N, such as at least 1.2 N; wherein resistance $F_{AW}$ is defined as a force acting:
  parallel to the tangent of the curved length direction at the anterior end of the mouthpiece,
  at a point Q which is, viewed transverse to said tangent, at 30 mm from the anterior end of the mouthpiece, and
  in outward direction of the mouthpiece,
in order to displace the point Q over 10 mm parallel to said tangent when the handle coupling is kept immovable.
74) Mouthpiece according to one of the clauses 72-73, wherein the mouthpiece is a U-shaped mouthpiece; wherein the mouthpiece has a resistance $F_{AN}$ against narrowing of a curve of the curved length direction, which resistance $F_{AN}$ is at least 2 N, such as at least 2.4 N; wherein the resistance $F_{AN}$ is defined as a force acting:
  parallel to the tangent of the curved length direction at the anterior end of the mouthpiece,
  at a point P which is, viewed transverse to said tangent, at 30 mm from the anterior end of the mouthpiece, and
  in inward direction of the mouthpiece,
in order to displace the point P over 10 mm parallel to said tangent when the handle coupling is kept immovable.
75) Mouthpiece according to one of the clauses 66-74, wherein the mouthpiece and/or flexible links are configured such that, when the trough sections are in a shifted position 1 cm to the right or left of the neutral position, the brushing pressure exerted by the mouthpiece on the molars is, without any activation of the brushing elements, at most 3 Newton/cm$^2$, such as at most 2 Newton/cm$^2$.
76) Mouthpiece according to one of the clauses 72-75, wherein the mouthpiece is a U-shaped mouthpiece; wherein the mouthpiece has a resistance $F_{AW}$ against widening of a curve of the curved length direction, which resistance $F_{AW}$ is at most 3 N, such as at most 2.2 N; wherein the resistance $F_{AW}$ is defined as a force acting:
  parallel to the tangent of the curved length direction at the anterior end of the mouthpiece,
  at a point Q which is, viewed transverse to said tangent, at 30 mm from the anterior end of the mouthpiece, and in outward direction of the mouthpiece, in order to displace the point Q over 10 mm parallel to said tangent when the handle coupling is kept immovable.

77) Mouthpiece according to one of the clauses 72-76, wherein the mouthpiece is a U-shaped mouthpiece; wherein the mouthpiece has a resistance $F_{AN}$ against narrowing of a curve of the curved length direction, which resistance $F_{AN}$ is at most 4 N, such as at most 3.3 N; wherein the resistance $F_{AN}$ is defined as a force acting:

parallel to the tangent of the curved length direction at the anterior end of the mouthpiece, at a point P which is, viewed transverse to said tangent, at 30 mm from the anterior end of the mouthpiece, and in inward direction of the mouthpiece, in order to displace the point P over 10 mm parallel to said tangent when the handle coupling is kept immovable.

78) Mouthpiece according to one of the clauses 72-77, wherein the mouthpiece is a U-shaped mouthpiece which only encompasses lower teeth of a basic AG-3 dental model (with 32 teeth) from frasaco GmbH; wherein, when this mouthpiece is placed between the upper and lower model halves of the AG-3 model and these model halves are pressed together with a force of 5 N, the force:

applied on the handle coupling in a direction perpendicular to the centre axis of the dental arch of the AG-3 model, and required to move the mouthpiece from the neutral position 1 cm along the dental arch of the AG-3 model is at most 20 Newton, such as at most 17.5 Newton or at most 15 Newton.

79) Mouthpiece according to one of the clauses 66-78, wherein, viewed along the dental arch, the length of the mouthpiece is such that the second molar (/s) is (/are), in the neutral position, outside the mouthpiece; and wherein the mouthpiece is configured to ride to-and-fro along the dental arch from the neutral position up to (and including) the position of a wisdom tooth.

80) Mouthpiece according to one of the clauses 66-79, wherein, viewed along the dental arch, the length of the mouthpiece is such that the first molar(s) is (/are), in the neutral position, outside the mouthpiece; and wherein the mouthpiece is configured to ride to-and-fro along the dental arch from the neutral position up to (and including) the position of a wisdom tooth.

81) Mouthpiece according to one of the clauses 66-80, wherein, viewed along the dental arch, the length of the mouthpiece is such that the first molar (/s) is (/are), in the neutral position, outside the mouthpiece; and wherein the mouthpiece is configured to ride to-and-fro along the dental arch from the neutral position up to (and including) the position of a second molar.

82) Mouthpiece according to one of the clauses 66-81, wherein a said trough section, which in neutral position lies at least partly in the anterior part, has a receiving trough configured for encompassing at least one tooth and delimited by a facial wall part and a lingual wall part; and wherein, viewed in the curved length direction, the length of the lingual wall part is shorter than the length of the facial wall part.

83) Mouthpiece according to clause 82, wherein, viewed in the curved length direction, the length of the lingual wall part is at most 75% of the length of the facial wall part.

81) Mouthpiece according to one of the clauses 63-80 in dependency from clause 74, wherein the first set and second set are attached to each other; and wherein the mouthpiece is configured to allow, when riding to-and-fro along the dental arch, the first set to undergo a first conformation to the upper arch and the second set to undergo a second conformation to the lower dental arch, which second conformation may be different from the first conformation.

85) Mouthpiece according to clause 84, wherein at least one trough section of the first set is connected to a, viewed in vertical direction, adjacent trough section of the second set by a flexible connection, such as a pin-slit-connection, configured to allow the sections connected by the flexible connection to move with respect to each other in a horizontal direction transverse to the dental arch.

86) Mouthpiece according to clause 85, wherein the trough sections connected by said connection are, in the neutral position, arranged in the posterior part of the mouthpiece.

87) Mouthpiece according to one of clauses 84-86, wherein an attachment attaches the first set to the central section of the second set at the anterior end.

88) Mouthpiece according to clause 87, wherein the attachment is a flexible attachment configured to allow the first set and second set to rotate with respect to each other around a vertical axis at the attachment.

89) Mouthpiece according to clause 87 or 88, wherein the attachment is configured to prevent the first set and second set from translational movement with respect to each other at the attachment.

90) Mouthpiece according to one of the clauses 66-89, wherein each said trough section has a receiving trough delimited along its length by a facial wall part at the facial side of the curved length direction and by a lingual wall part at the lingual side of the curved length direction, and bristles projecting from the facial wall part and lingual wall part into the trough.

91) Mouthpiece according to clause 90, wherein the facial wall part and the lingual wall part comprise a pressure chamber configured to move the bristles of the facial and lingual wall part to-and-fro in the receiving trough by alternatingly pressurizing and depressurizing the pressure chamber.

92) Mouthpiece according to clause 91, wherein the pressure chamber of the facial wall part and the lingual wall part has been manufactured with the method according to one of the clauses 1-34.

93) Mouthpiece according to one of the clauses 66-92, wherein the multiple of trough sections of a said set comprises at least two trough sections, such as three, four or five trough sections.

94) Mouthpiece according to one of the clauses 66-93, wherein the flexible links define a vertical rotational axis around which adjacent trough sections joined by a said respective link are rotatable with respect to each other.

95) Mouthpiece according to one of the clauses 66-94, wherein the flexible links are provided at the facial side of the curved length axis, such as at the facial side of the trough sections.

96) Mouthpiece according to one of the clauses 66-95, wherein the flexible link on, viewed along the curved length direction, one end of a said trough section is arranged at the facial side of the curved length direction, whilst the flexible link on the end opposite the one end is arranged at the lingual side of the curved length direction.
97) Mouthpiece according to one of the clauses 66-96, wherein the side walls of the trough section (/s) at the posterior end of the mouthpiece are, at the posterior end of the mouthpiece, configured flexible relative to the rest of the side walls of the trough sections to allow spreading of the ends of these sidewalls to conform to widening of the jawbone at the wisdom teeth.
98) Mouthpiece according to one of the clauses 66-97, wherein the mouthpiece is a U-shaped mouthpiece.
99) Mouthpiece according to one of the clauses 66-98, wherein the mouthpiece is a mouthpiece according to one of the clauses 37-43.
100) Mouthpiece according to one of the clauses 66-99, wherein the mouthpiece has been manufactured with the method according to one of the clauses 46-63.
101) Mouthpiece according to one of the clauses 66-100, wherein the mouthpiece is a mouthpiece according to clause 64.
102) Mouthpiece according to one of the clauses 66-101, wherein the trough sections each have a receiving trough configured to encompass at least one or at least two teeth.
103) Mouthpiece according to clause 102, wherein the trough sections have bristles projecting into the trough for brushing teeth.
104) Mouthpiece according to one of the clauses 66-103, wherein a most posterior trough section has a trough bottom, which is provided with a movable bottom part at the posterior end of the mouthpiece, wherein the movable bottom part is provided with brushing elements-like bristles-projecting transverse from the bottom part into the trough of the most posterior trough section, wherein the movable bottom part is rotatable around a rotational axis between a retracted position, in which the movable bottom part lies along the trough bottom, and an erected position, in which the movable bottom part slants with respect to the trough bottom.
105) J- or U-shaped mouthpiece comprising an upper and/or lower trough system having a trough bottom; wherein the J-/U-shaped mouthpiece is flexible to allow the mouthpiece to ride along a dental arch whilst teeth are encompassed by the upper and/or lower trough system; wherein the trough bottom is provided with a movable bottom part arranged at a posterior end of the mouthpiece; wherein the movable bottom part is provided with brushing elements-like bristles-projecting transverse from the bottom part into the trough; wherein the movable bottom part is rotatable around a rotational axis between a retracted position, in which the movable bottom part lies along the trough bottom, and an erected position, in which the movable bottom part slants with respect to the trough bottom.
106) Mouthpiece according to clause 104 or 105, wherein the mouthpiece is provided with a tensioning system configured for biasing the movable bottom part, during use of the mouthpiece, from the retracted position towards the erected position.
107) System comprising: a mouthpiece according to one of the clauses 66-106, and a handle configured for detachable attachment to the handle coupling.
108) System according to clause 107, wherein the handle comprises a drive configured for driving the bristles in the troughs of the trough sections to move to-and-fro in the trough.
109) System according to clause 108, wherein the drive comprises a pump and is configured for alternatingly pressurizing and depressurizing the pressure chamber or pressure chambers.

The invention claimed is:
1. A method of manufacturing a pressure chamber of a mouthpiece for simultaneously treating a plurality of dental positions by increasing and decreasing a pressure in the pressure chamber, wherein the method comprises:
a step b) of providing a frame part of a frame of the mouthpiece in an injection mould,
a step c) of providing a wall part of a flexible wall of the mouthpiece in the injection mould,
a step f) of over-moulding, in which a first over-moulding material is injected into the injection mould to attach the wall part and frame part to each other along an attachment loop such that the attachment loop, a part of the wall part surrounded by the attachment loop, and a part of the frame part surrounded by the attachment loop delimit a composed pressure chamber, and
a step g) of allowing the composed pressure chamber to solidify and removing it from the injection mould, resulting in the pressure chamber to be manufactured having a frame part and flexible wall part.
2. The method according to claim 1, wherein the wall part is stretchable, such as elastically stretchable.
3. The method according to claim 1, wherein the method further comprises a step of arranging the frame part and wall part in a layered manner along each other to obtain a layered structure with a frame part layer and a wall part layer parallel to each other;
wherein the method further comprises a step of introducing a pressurized medium into the area between the frame part layer and wall part layer, which area is surrounded by the attachment loop, to separate the frame part layer and wall part layer.
4. The method according to claim 3, wherein the method further comprises a step a) of providing an intermediate member;
wherein one of the steps b) and c) take place before step f) resulting in a provided part;
wherein the method further comprises a step d) of combining the provided part and intermediate member to obtain a combined part, in which combined part the intermediate member is a positive or negative predefining a location of the attachment loop to be obtained, after step d), in the step f); and
wherein the other of the steps b) and c) takes place in the step f) to provide the other of the wall part respectively frame part by moulding it onto the combined part to obtain the layered structure and the attachment loop.
5. The method according to claim 4, wherein, in the step d), the intermediate member is attached to the provided part.
6. The method according to claim 4, wherein the step b) takes place before the step f) resulting in the provided part being the frame part, and
wherein step c) takes place in the step f);
wherein the method further comprises, before the step f), a step e) of preparing the injection mould such that it has a die cavity delimited by a first cavity wall and a second cavity wall opposite and spaced from the first cavity wall, wherein the step e) comprises:
providing a said first cavity wall with bores, which bores:
have bore ends which open into the die cavity, and
are filled with bristles having a root section lying at the bore ends; and
placing the combined part as an insert into the die cavity spaced from the first cavity wall and with the frame part against the second cavity wall;
wherein the first over-moulding material is a wall material (C) for forming the wall part and is, in step f), injected into the die cavity such that the root section of the bristles becomes integral with the wall part (C).

7. The method according to claim 4, wherein the step c) takes place before the step f) resulting in the provided part being the wall part;
wherein the method further comprises, before the step f), a step e) of preparing the injection mould such that it has a die cavity delimited by a first cavity wall and a second cavity wall opposite and spaced from the first cavity wall;
wherein the step e) comprises:
providing a said first cavity wall with bores, which bores:
have bore ends which open into the die cavity, and
are filled with bristles having a root section lying at the bore ends; and
placing the combined part as an insert into the die cavity spaced from the second cavity wall and with the wall part contacting the root section(s);
wherein the first over-moulding material is a frame material (A) for forming the frame part and is, in step f), injected into the die cavity.

8. The method according to claim 4, wherein the frame part and wall part are fusible with each other when over-moulded onto each other;
wherein the intermediate member is an intermediate layer;
wherein, in the combined part resulting from the step d), the provided part is covered with the intermediate layer whilst leaving a fusing loop on the provided part exposed, and
wherein, in the step f), said other of the wall part respectively frame part is obtained by moulding a layer onto the intermediate layer and onto the fusing loop resulting in:
a layered structure with the intermediate layer in between the frame part layer and the wall part layer, and
the attachment loop by fusing of the frame part layer and wall part layer at the fusing loop; and
wherein the intermediate layer (B) is configured to provide a separation layer along which the wall part layer separates from the frame part layer when introducing a pressurized medium between the wall part layer and frame part layer.

9. The method according to claim 8, wherein the intermediate layer has a first outer surface which faces the provided part and fuses with the provided part in the step f) or is attached to the provided part, and wherein the laminate has a second outer surface facing away from the provided part, which second outer surface is configured to resist fusing with the first over-moulding material injected in the step f).

10. The method according to claim 8, wherein the intermediate layer is a laminate comprising a first surface bonding to the wall part layer, a second surface bonding to the frame part layer, and, in between the first and second surface a weakened area, to provide the separation layer such that the wall part layer separates from the frame part layer by delamination when said pressurized medium is introduced between the wall part layer and frame part layer.

11. The method according to claim 8, wherein the intermediate layer covering the provided part has an exposed surface facing away from the provided part, which exposed surface is configured to resist fusing with the first over-moulding material which is injected in the step f).

12. The method according to claim 4, wherein the frame part and wall part are made of materials resisting or configured to resist fusing with each other when over-moulded onto each other;
wherein the intermediate member is a bead loop which is configured to fuse, in the step f), with the first over-moulding material injected in the step f);
wherein, in the step d), the bead loop is placed against the provided part whilst leaving inside the bead loop an exposed area of the provided part,
wherein the first over-moulding material injected in the step f) is moulded onto the bead loop and onto the exposed area resulting in:
a layered structure with the frame part layer and the wall part layer lying against each other, and
the attachment loop by fusing of the first over-moulding material in the step f) with the bead loop.

13. The method according to claim 3, wherein the method further comprises a step a) of providing an intermediate member, and wherein the intermediate member comprises a 3-dimensional male or female configuration mating with a corresponding 3-dimensional female respectively male configuration of at least part of the provided part such that the intermediate member and provided part fit in a male-female manner into each other.

14. The method according to claim 1, wherein in the step b) a pre-fabricated frame part is provided;
wherein in the step c) a pre-fabricated wall part is provided;
wherein the method further comprises, before the step f), a step e) of preparing the injection mould,
wherein the step e) comprises placing the pre-fabricated frame part and the pre-fabricated wall part as an insert into the injection mould with the frame part and wall part pressed against each other along a circumferential edge of the pre-fabricated wall part; and
wherein the first over-moulding material injected in the step f) fuses, in the step f), with the circumferential edge of the wall part such that the circumferential edge of the wall part becomes fixed relative to the frame part to provide the attachment loop.

15. A pressure chamber manufactured with the method according to claim 1.

16. A mouthpiece for simultaneously treating a plurality of dental positions by increasing and decreasing pressure in one or more pressure chambers, comprising at least one pressure chamber manufactured with the method according to claim 1.

17. The mouthpiece according to claim 16, wherein the wall part is provided with bristles projecting from the wall part in a direction away from the frame part.

18. The mouthpiece according to claim 16, wherein the mouthpiece is provided with a pressure medium connector in fluid connection with the pressure chamber(s).

19. A system comprising a mouthpiece according to claim 16, and a handle configured for detachable attachment to the mouthpiece, such as to the handle connector of the mouthpiece, wherein the handle comprises a drive configured for alternatingly pressurizing and depressurizing the pressure chamber or pressure chambers to move the bristles to-and-fro.

20. A method of manufacturing a mouthpiece with a trough system for simultaneously treating a plurality of dental positions by increasing and decreasing a pressure in one or more pressure chambers,
   wherein the method comprises:
      a frame part providing step, in which a plate-shaped frame part is provided, the plate shaped frame part being defined by an elongate member having, at two or more spaced trough areas, a set of side members projecting transverse from the elongate member;
      a pressure chamber manufacturing step, which comprises, whilst the plate-shaped frame part is in a sheet condition:
         providing, on one face of the plate-shaped frame part at the trough areas, a flexible wall part, and
         attaching the flexible wall part, in the trough areas, along one or more attachment loops to the plate-shaped frame part to provide the trough areas with one or more pressure chambers bounded between each attachment loop, the frame part and wall part;
      a folding step, in which the plate-shaped frame part provided with the one or more pressure chambers is folded to a folded condition in which, at each trough area, the associated set of side members is folded around folding axes, which are about parallel to a length direction of the elongate member, to a trough section with the one or more pressure chambers on the hollow side of the trough section and with the trough sections aligned to define a trough system.

* * * * *